United States Patent
Davila et al.

(10) Patent No.: US 9,713,342 B2
(45) Date of Patent: Jul. 25, 2017

(54) ONLINE DECORATING SYSTEM FOR EDIBLE PRODUCTS

(75) Inventors: Carlos A. Davila, Maple Grove, MN (US); John R. Anderson, Lino Lakes, MN (US); Andy Schnoebelen, Escondido, CA (US); Kent D. Whitten, Escondido, CA (US)

(73) Assignee: Decopac, Inc., Anoka, MN (US)

(*) Notice: Subject to any disclaimer, the term of this patent is extended or adjusted under 35 U.S.C. 154(b) by 792 days.

(21) Appl. No.: 13/287,023

(22) Filed: Nov. 1, 2011

(65) Prior Publication Data

US 2012/0064204 A1 Mar. 15, 2012

Related U.S. Application Data

(63) Continuation of application No. 12/852,988, filed on Aug. 9, 2010, now abandoned.

(51) Int. Cl.
| | |
|---|---|
| A23G 3/28 | (2006.01) |
| A23G 3/34 | (2006.01) |
| G06F 3/12 | (2006.01) |
| A23P 1/08 | (2006.01) |
| G06Q 30/00 | (2012.01) |
| H04N 1/00 | (2006.01) |
| A21C 15/00 | (2006.01) |
| G06K 15/02 | (2006.01) |

(Continued)

(52) U.S. Cl.
CPC ........... *A23P 1/085* (2013.01); *A21C 15/002* (2013.01); *A21D 13/47* (2017.01); *A23G 3/0097* (2013.01); *A23G 3/28* (2013.01); *A23P 20/15* (2016.08); *G06F 3/126* (2013.01); *G06F 3/1285* (2013.01); *G06K 15/1894* (2013.01); *G06K 15/4045* (2013.01); *G06Q 30/00* (2013.01); *H04N 1/0019* (2013.01); *H04N 1/00145* (2013.01); *H04N 1/00164* (2013.01); *H04N 1/00167* (2013.01); *H04N 1/00188* (2013.01); *A23P 2020/253* (2016.08)

(58) Field of Classification Search
CPC ...... A23G 3/28; A23G 3/0097; H04N 1/0019; G06F 21/10; G06F 3/1239; G06F 3/1238; A23P 20/25; A23P 2020/253
USPC ..................... 358/1.1, 1.15, 1.14; 705/51, 59
See application file for complete search history.

(56) References Cited

U.S. PATENT DOCUMENTS

| | | | |
|---|---|---|---|
| 5,505,775 A | 4/1996 | Kitos | |
| 5,835,242 A * | 11/1998 | Itoh | H04N 1/6094 |
| | | | 358/515 |

(Continued)

OTHER PUBLICATIONS

International Search Report and Written Opinion issued Jan. 5, 2012 in Application No. PCT/US 11/47096.

(Continued)

*Primary Examiner* — Eric A Rust
(74) *Attorney, Agent, or Firm* — Gardella Grace P.A.

(57) ABSTRACT

A web-enabled standalone application may, in selected implementations, prevent received license-controlled image data from unauthorized re-use, editing, or distribution, and permits image processing, such as applying the International Color Consortium's color correction process, at the local control device. The web-enabled standalone application may further generate a printer specific byte stream based on post-image processed data, providing a color managed workflow independent of local control device operating system print drivers.

20 Claims, 42 Drawing Sheets

(51) Int. Cl.
*G06K 15/00* (2006.01)
*A23P 20/15* (2016.01)
*A21D 13/47* (2017.01)
*A23P 20/25* (2016.01)

(56) References Cited

U.S. PATENT DOCUMENTS

| | | | | |
|---|---|---|---|---|
| 6,154,172 | A  * | 11/2000 | Piccionelli et al. | 342/357.4 |
| 6,536,345 | B1 * | 3/2003 | Young | 101/485 |
| 6,623,553 | B2 | 9/2003 | Russell et al. | |
| 7,161,710 | B1 | 1/2007 | MacLeod | |
| 7,286,258 | B2 | 10/2007 | Schnoebelen et al. | |
| 8,219,494 | B1 * | 7/2012 | Pride | G06F 21/10 705/39 |
| 2002/0095231 | A1 * | 7/2002 | Yu et al. | 700/97 |
| 2003/0007191 | A1 * | 1/2003 | Herbert | B41F 7/18 358/462 |
| 2003/0198719 | A1 | 10/2003 | Stewart | |
| 2004/0172149 | A1 * | 9/2004 | Eto | 700/95 |
| 2005/0088693 | A1 | 4/2005 | Schnoebelen et al. | |
| 2005/0254073 | A1 * | 11/2005 | Braun et al. | 358/1.9 |
| 2006/0279771 | A1 * | 12/2006 | Ludwig et al. | 358/1.15 |
| 2008/0174676 | A1 | 7/2008 | Squilla et al. | |
| 2008/0209509 | A1 * | 8/2008 | Koike | G06F 21/10 726/2 |
| 2010/0017491 | A1 | 1/2010 | Johns et al. | |
| 2010/0185529 | A1 | 7/2010 | Chesnut et al. | |

OTHER PUBLICATIONS

U.S. Appl. No. 14/492,620, filed Sep. 22, 2014, Anderson, et al.

Genometri: Canvas, Retrieved from the Internet at: http://www.genometri.com/canvas.htm, Aug. 4, 2010, 1 page.

Ferguson Plarre Bakehouses, Birthday cakes, wedding cakes, corporate cakes online & more!, Retrieved from the Internet at: https://www.fergusonplarre.com.au/designacake/, Aug. 3, 2010, 7 pages.

* cited by examiner

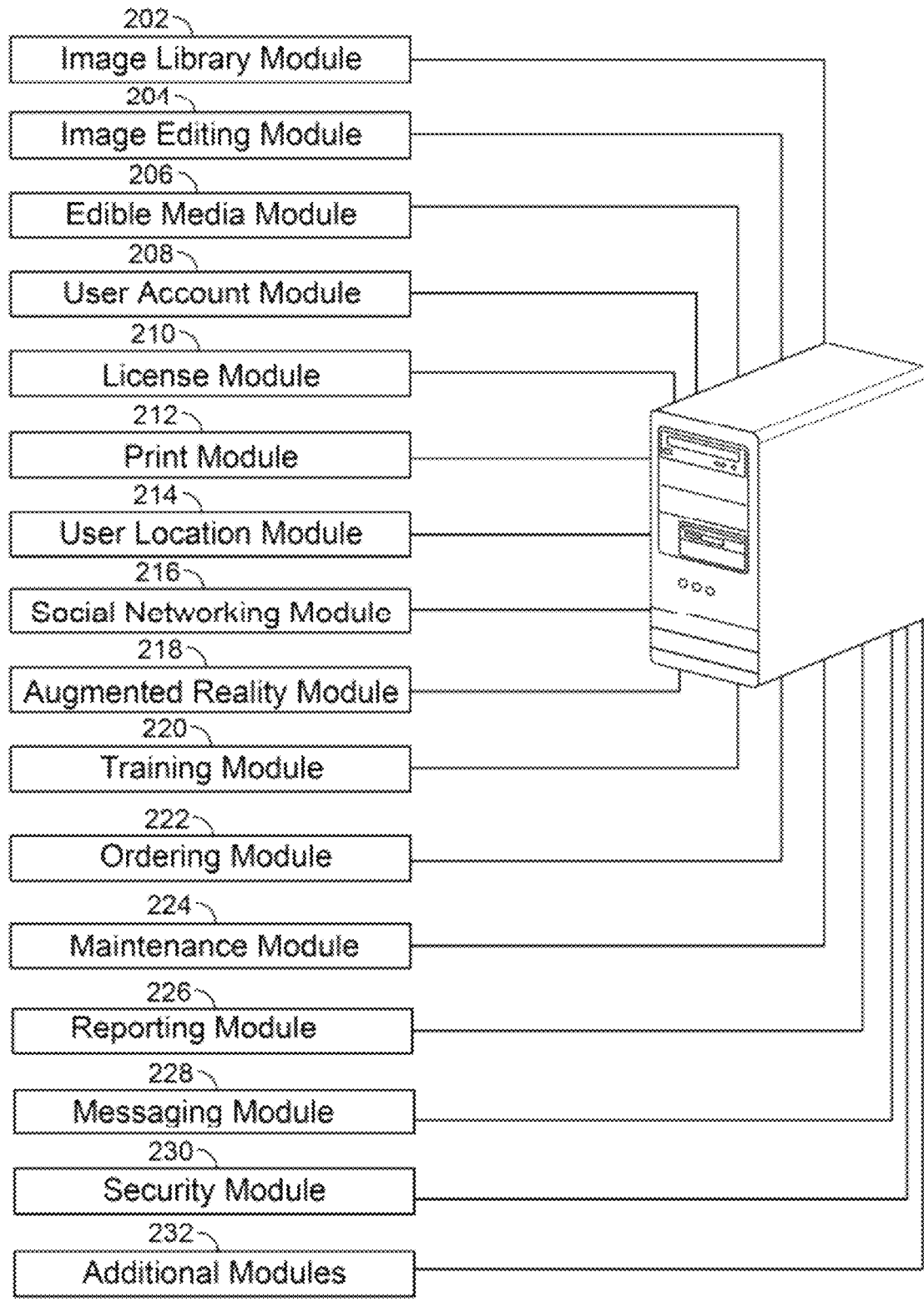

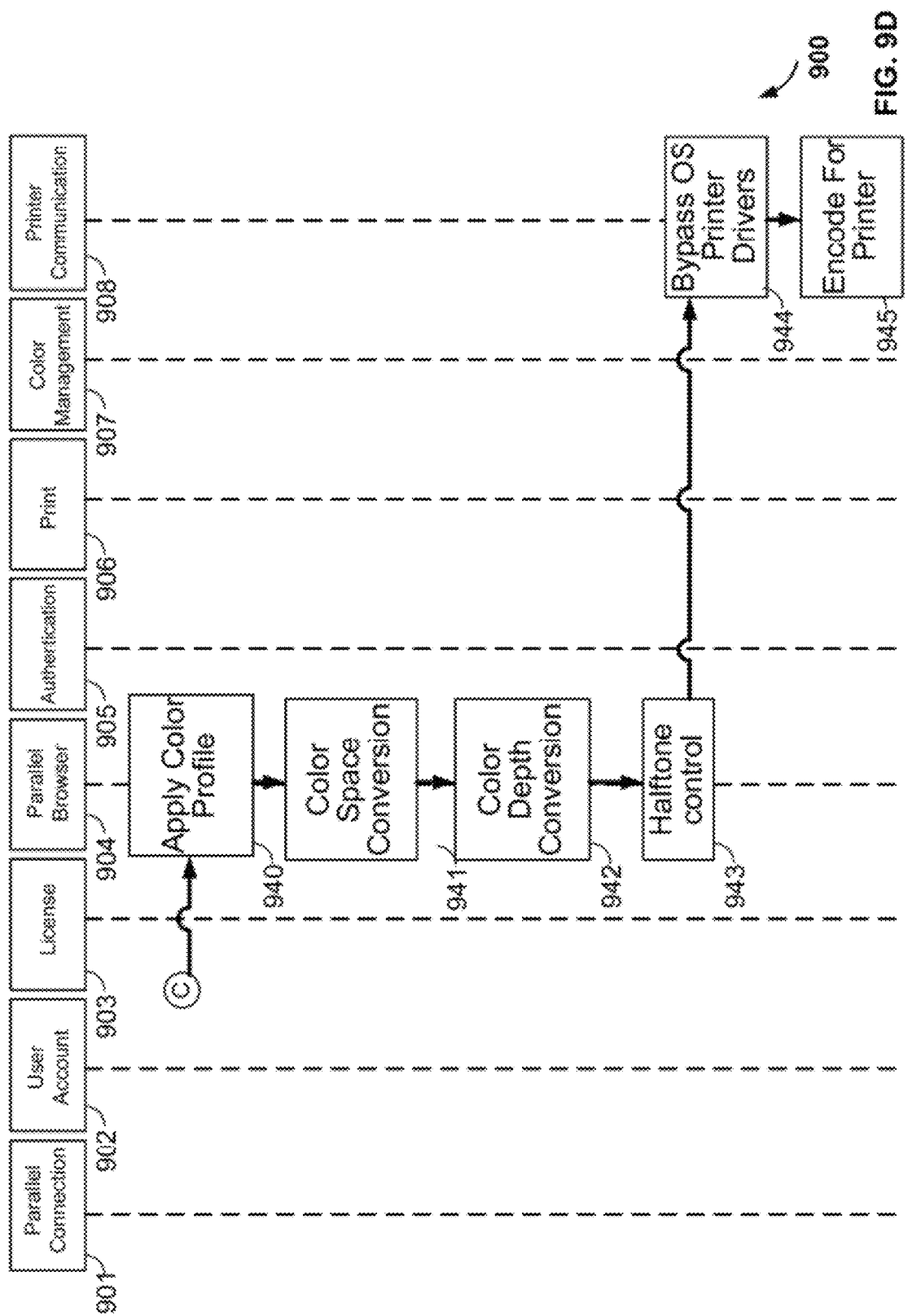

ONLINE DECORATING SYSTEM FOR EDIBLE PRODUCTS

CROSS-REFERENCE TO RELATED APPLICATION

This application is a continuation-in-part of U.S. application Ser. No. 12/852,988, filed on Aug. 9, 2010, which is incorporated herein by reference. This application is also related to U.S. application Ser. No. 10/925,459, filed on Aug. 25, 2004, now U.S. Pat. No. 7,012,712, which is also incorporated herein by reference.

BACKGROUND OF ILLUSTRATIVE EMBODIMENTS

Decorative food products, such as cakes, are popular items, particularly for special occasions, such as birthdays, holidays, weddings, anniversaries and other celebratory events. These items are typically purchased from bakeries since the items generally require some skill and/or apparatus to create. Previously, these items were created from colored frostings applied manually by trained bakery chefs. For example, pre-made decorative items can be placed on a food product. These pre-made items are generally produced in bulk in a factory and inventoried until use. The use of such pre-made decorative items precludes uniquely decorated and/or personalized decorations. Also, these pre-made decorative items are generally pre-ordered, which requires a long lead time, or stored in inventory at the risk of under-ordering or over-ordering, as well as the cost of such inventory.

Another alternative has been to utilize an automated system for decorating cakes. One such system is disclosed in U.S. Pat. No. 5,505,775, issued to Kitos. This system utilizes an integrated work surface controlled with a computer system. An image is scanned into the computer system. The computer system then uses a motion control system to manipulate a drop on demand colorant expulsion system over a cake carried on the work surface to reproduce the scanned image. This system produces the decorations and images directly onto the food product.

An automated system for printing images onto edible media, that can then be applied to a food product or consumed as is, is disclosed in U.S. Pat. No. 7,286,258, issued to Schnoebelen et al., which is incorporated by reference herein. This system discloses a local processing unit and a number of image sources, including a scanner and a database of digital images stored on a local computer memory system. The user selects an image from one of the image sources and prints the image onto an edible media.

A decorating system for edible items is disclosed in U.S. Pat. No. 7,012,712, issued to Spurgeon et al., which is incorporated herein by reference. This system discloses creating a decorative edible item from a selected image. The system includes at least one image source, such as a scanner and/or a library of stored images, a controller unit and a printer for creating a high-quality pictorial rendition of the image. The printed edible media can then be applied onto a product, shipped to a separate location or eaten as is.

Various websites exist for allowing users to customize decorations. One such online website is www.genometri.com which allows users to decorate and purchase customized decorated cakes. Users can choose from pre-designed decorative templates or can choose to customize their cake decoration. Users can upload personal photographs to use in the cake decoration and can add text and clip art to the cake decoration. When the user is finished decorating the cake, the user purchases a cake decorated with the customized decoration. The purchase transaction is processed through the website.

SUMMARY OF THE ILLUSTRATIVE EMBODIMENTS

Disclosed herein are methods and systems for decorating edible media. In certain embodiments, at least one local control device and a Graphical User Interface (GUI) can be used for selecting an image, receiving and/or transmitting the selected image via the Internet to and/or from a central control device containing a website with at least one image database, and printing licensed digital images at the local control device upon an edible medium using edible inks. In certain configurations, a principal user authorizes a secondary user to search and print specific, pre-authorized images from the central control device's image database. In certain implementations, the user purchases edible media via the Internet.

In selected implementations, the user decorates an edible media with images from multiple image sources. The image sources may include local image sources, such as a scanner or a digital camera, or remote image sources, such as an image library in an Internet website. The image sources may contain proportionate two dimensional images, as well as disproportionate two dimensional images that can be manipulated by a user.

In various embodiments, the user may print licensed digital images within a print environment provided internally by a software web browser used to navigate the website with at least one image database. In other implementations, a user may print licensed digital images in an external printing environment provided separately from the software web browser used to navigate the website with at least one image database. For example, the external printing environment could be a web-enabled standalone application on a local control device that accesses an image repository on a central control device through a secure connection originally authenticated via login procedures in a separate software web browser application. The web-enabled standalone application may, in selected implementations, prevent received license-controlled image data from unauthorized re-use, editing, or distribution, and permits image processing, such as applying the International Color Consortium's color correction process, at the local control device. The web-enabled standalone application may further generate a printer specific byte stream based on post-image processed data, providing a color managed workflow independent of local control device operating system print drivers.

The details of one or more implementations are set forth in the accompanying drawings and description below. Other features, objects, and advantages will be apparent from the description and drawings, and from the claims.

DESCRIPTION OF DRAWINGS

FIG. 2A is an example computer system containing software modules in a central control device in a system for decorating edible media.

FIGS. 9A-9D depict an example swim lane diagram of a process for printing edible media using a parallel browser module.

DETAILED DESCRIPTION OF ILLUSTRATIVE IMPLEMENTATIONS

Figure 1:
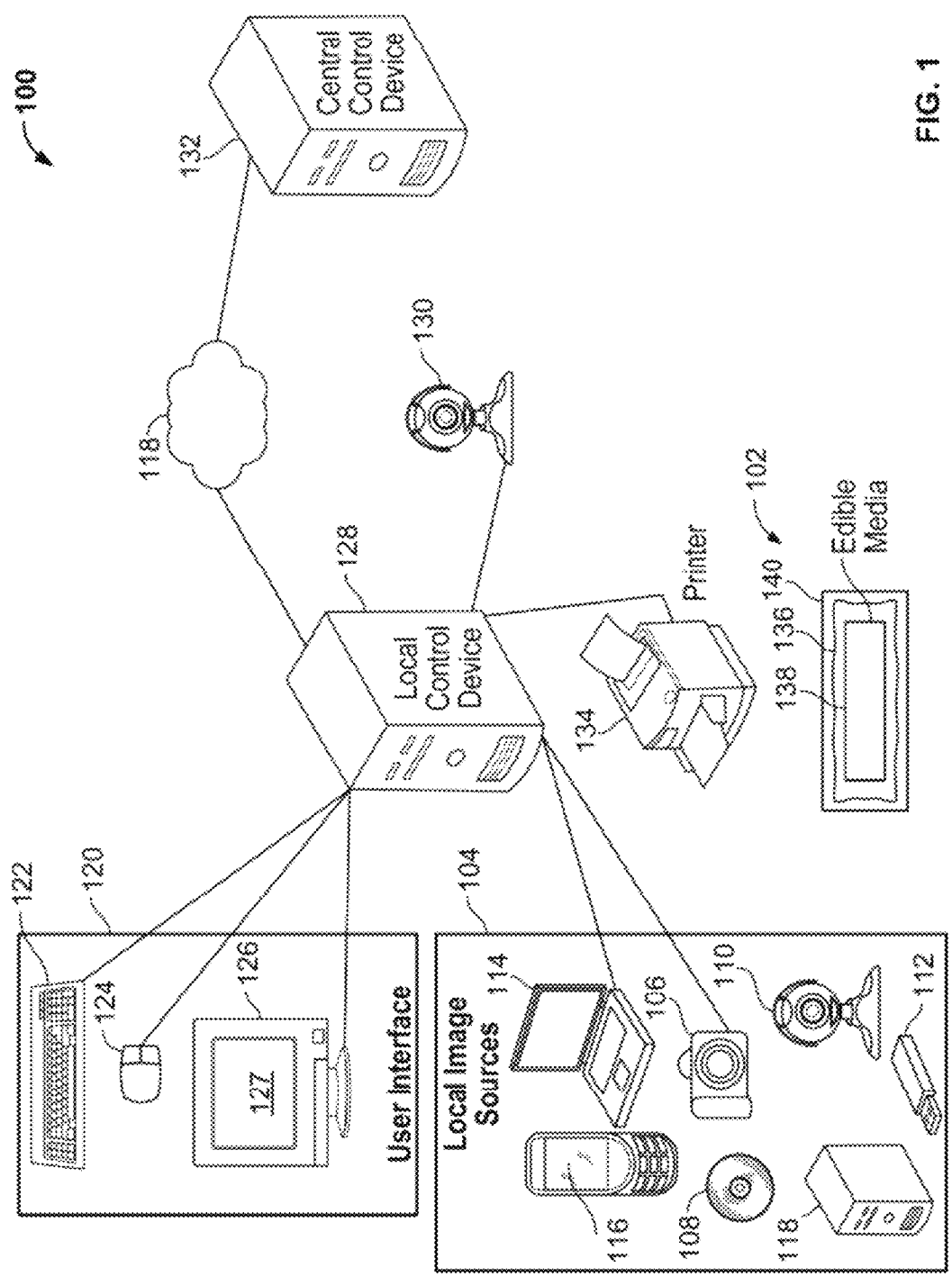
FIG. 1 is an example system for decorating edible media.

FIG. 1 is an example system 100 for decorating an edible media 102. The system 100 provides an online environment for decorating edible media. The online environment includes one or more website applications with which the user can interact to print edible content on edible substrates or edible media. The system 100 provides a mechanism to perform online or local searching of images and customization of images. The system 100 is operated by a user to print and/or customize images including both licensed and non-licensed digital images. The system 100 additionally provides digital rights management, print monitoring functions, user account management, and messaging functions.

The system 100 manages both licensed and non-licensed images for purposes of obeying licensing laws when printing the images on an edible medium. Licensed digital images, such as copyrighted images including logos, characters, illustrations, or photographs having licensing terms and conditions for usage can be purchased from one or more online sources. Non-licensed digital images such as personal photographs, illustrations, clip art, or other non-copyright protected images can be uploaded locally to the system 100. Both licensed and non-licensed digital images are retrieved from an external device or the Internet, stored locally, and uploaded to the system 100. In some embodiments, a combination of licensed and non-licensed digital images are retrieved either locally or online and printed in combination on a single edible medium.

Users generally access the online environment in system 100 to search, select, edit, and purchase images. The purchased images can be printed onto the edible media 102 using edible inks. For example, a user of system 100 accesses the online environment to search for a particular image. The user selects the image, purchases and/or edits the image, and directs the system 100 to print the purchased image onto the edible media 102. The images available to system 100 can be retrieved from any number of sources including local, online, or remote storage repositories. For example, images can be retrieved from local image sources 104 which are communicably connectable to system 100. The local sources can include, but are not limited to a digital camera 106, a CD-ROM OR DVD 108, a video device 110, a flash drive 112, a scanner 114, a mobile device 116, a computer available on a local network 118, an external hard drive, a netbook, a laptop, a wireless device (e.g., Wi-Fi enabled, Bluetooth enabled, or other wirelessly enabled device), or a handheld device (not shown).

Images can also be retrieved via the network 118 from any number of websites containing digital images or libraries of digital images. Images can additionally be retrieved from other networked or remote storage repositories (not shown). Upon retrieving images, the system 100 provides access to additional features for handling retrieved images, such as photograph editing, social networking content insertion, or augmented reality content insertion.

Users can purchase edible media using one or more e-commerce sites. For example, users can purchase an edible sheet from an e-commerce site incorporated into system 100. E-commerce sites associated with system 100, for example, provide a number of selectable options for obtaining edible media. The user can choose standard "off-the-shelf" edible media items or custom edible media items.

In some configurations, the user is provided the option to purchase edible media locally using the system 100. For example, the user may be offered several sizes of edible media for decorating. The user can select a desired decoration size and choose an edible media (e.g., an edible sheet of paper) size comparable to the desired decoration size. The selected edible media (e.g., edible media 102) can be purchased through the system 100 by entering an appropriate edible media code or by simply selecting the desired edible media onscreen. The edible media code can, in effect, function as a part number for ordering a specific edible media sheet size. In some implementations, the edible media code is requested by the system 100 to prompt a user to select an edible medium available locally in a bakery, for example. The selected edible medium can be loaded into the system 100 and images can be printed upon the edible medium.

In certain embodiments, the system 100 requests that the user enter a unique code. The unique code may be sent to the user with edible media prior to accessing system 100. The unique code can be entered once by the user to enable printing of images a specific number of times. For example, the user can enter a code and receive up to twenty-four print sessions for selected images. In operation, once the user enters the code, the system verifies that the code is valid and has not been used before.

Once the edible media has traveled through the printer and the image printed thereon with the edible inks, the printed edible media is removed from the printer. The printed edible media is then placed on a food product at the point of printing and transported to a separate location for application. In some configurations, the edible media is relatively thin and sturdy allowing for convenient transport and thus minimization of damage to the decorations. In certain embodiments, the edible media may also include an optional release sheet having a silicon coating functioning as a backing material, for example.

In some implementations, the system 100 includes an image uploading device. The image uploading device may be a wired or wireless storage device operable to upload licensed and non-licensed digital images. The image uploading device may be coupled to any number of alternate image sources for uploading additional images. For example, the image uploading device may represent a scanner, while the alternate image source represents a network drive accessed over the Internet. In another example, the image uploading device represents a mobile phone device while the alternate image source represents a USB fob.

User Interface

In the system 100, User Interface controls 120 are connected to the local control device 128. The User Interface controls 120 include a keyboard 122, a mouse 124, and a display device 126. Other implementations may use other devices, such as a touch screen device, a joy stick, or a voice command system. The User Interface controls 120 allow the user to operate the system 100 to decorate edible media 102 or to display edible media-related content on the display device 126.

The user is displayed a variety of navigation screens and menus on the display device 126. The user selects desired options from the navigation screens and menus using the keyboard 122, the mouse 124, or other input mechanism. The User Interface controls 120 relay signals from the user to a local control device 128, thereby operating the system 100.

The display device 126 is operable to display a Graphical User Interface GUI 127 for interacting with the hardware and software components of system 100. The GUI 127 can, for example, include application screens, website content, software controls, and other Graphical User Interface content. The GUI 127 is operable to receive user input for accessing one or more licensed or non-licensed digital images. The GUI 127 can, for example, include graphical elements provided in one or more applications. Users can interact with one or more graphical elements to control the behavior and output of system 100 components.

The GUI 127 is operable to control the local control device 128 and communicate with the central control device 132 over a network to retrieve at least one licensed digital image from the central control device. The GUI 127 is also operable to cause to be printed at least one licensed digital image onto an edible medium. The GUI is also operable to switch between multiple software applications, including a software web browser and non-web browser software. In some configurations, the GUI 127 is operable to retrieve non-licensed images.

The GUI 127 can be presented within a software web browser. In certain implementations, a user may print licensed digital images within a print environment provided internally by a web browser used to navigate a website with at least one image database. In other embodiments, a user may print licensed digital images in an external printing environment provided separately from the software web browser.

Local Image Sources

The system 100 includes one or more devices which can be communicably coupled to system 100 as local image sources 104. In this example, a variety of local image sources 104 are connected to the local control device 128. One such local image source 104 is the scanner 114. The scanner 114 can be a flatbed scanner, or any other type of scanner such as a drum scanner or a through feed scanner. The scanner 114 allows an image to be rendered from personal photographs, drawings, books, magazines, etc. In certain embodiments, system 100 can evaluate acquired images for copyright indicators. Based on the detection of copyright indicators, the user may be alerted to potential copyright limitations, or usage of the acquired image may be automatically denied.

Other local image sources 104 include the digital camera 106, the CD-ROM OR DVD 108, the video device 110, the flash drive 112, and the mobile device 116; however, other sources of digital image storage or repositories can be used in the system 100. In operation, when a particular local image source is connected to the local control device 128, a user can retrieve images from the connected local image source to use in the system 100 for decorating (e.g., printing on) the edible media 102.

Images retrieved from local image sources are uploaded to system 100 and stored. For example, scanned images retrieved from scanner 114 are uploaded into system 100, stored locally on system 100 and provided for use in the system. The stored images can be retrieved by users for editing, printing, and so on.

Local Video Device

The system 100 includes one or more local video devices 130. Any device that is capable of capturing and communicating a digital video signal can be used. In certain embodiments, the local video device 130 is a web camera. The local video device 130 is generally connected to the local control device 128 by a wireless or wireline means. The user uses the local video device 130 to send a digital video signal to the local control device 128. The local control device 128 transmits the digital video signal to a central control device 132 via the network 118. In certain embodiments, a single frame can be extracted from the digital video signal for printing. In other embodiments, a single image for printing can be generated based on a montage of image frames extracted from the digital video signal.

Local Control Device

The local control device 128, in this example, is coupled to the User Interface controls 120, the local image sources 104, the local video device 130, and a printer 134. Local image sources 104 contains at least one local digital image. In certain embodiments, local digital images are selectively uploaded from the local control device 128 to the central control device 132 for storage, permitting printing of the local digital image onto the edible medium at a later time.

In some configurations, the local control device 128 is coupled to a printer 134 and an image uploading device for purposes of retrieving and transmitting a digital image from the image uploading device to the printer. The retrieval and transmission is typically in response to the user selection. For example, the user uses a scanner to upload an image to the local control device 128. The uploaded image is transferred to the printer 134 for printing.

The local control device 128 is operated by the user using the User Interface controls 120. For example, the user operates the local control device 128 to search, select, and purchase an image. The local control device 128 is operable to print the purchased image onto the edible media 102, for example. The local control device 128 includes a software web browser that allows the local control device 128 to communicate with the central control device 132 via network 118. In some implementations, the central control device 132 is a web server capable of communicating using standard Internet protocols.

In this example, the local control device 128 is depicted as a computer system. However, any processing unit which can digitally process signals from local image sources 104 or other sources can be used.

Central Control Device

The central control device 132 is connected via the network 118 to the local control device 128. The central control device 132 includes a plurality of licensed digital images for decorating edible media by authorized users. The licensed digital images are protected from unauthorized usage and unauthorized user access. The central control device 132 provides a tracking mechanism to authorize or de-authorize usage of licensed digital images. For example, the central control device 132 authorizes the use of particular licensed digital images according to user credentials. The user credentials can be stored in system 100, or externally. The user credentials typically include payment information, location information, and system usage data. The central control device 132 verifies whether specific users should be provided access to particular licensed images.

The central control device 132 may include a software web server which allows the local control device 128 to communicate with a website on the central control device 132. The web server can be any web server capable of communicating using standard network protocols compatible with local control device 128 using a variety of Internet connection types and operating systems. The web server may run on a variety of operating platforms, for example Windows, Linux, MAC OS, or UNIX.

The website (not shown) hosted on the central control device 132 includes a number of software modules. The software modules may include, but are not limited to, image library modules, user account modules, edible media modules, photograph editing modules, user location recognition modules, training modules, print modules, licensing restriction modules, social networking modules, augmented reality content modules, security modules, and/or messaging modules. Other modules are possible. The described software modules can be selectively combined to form a multifunctional software module, or split into multiple software modules.

The user can access the website and accompanying software modules on the central control device 132 using the local control device 128, for example. The user can search images, purchase images, edit images, print images, order edible media, view training content, and access social networking features and augmented reality content stored on the central control device 132. Example software modules will be discussed below in reference to FIG. 2A.

Central control device 132 may include media servers, for example, a FLASH multimedia server, and the local control device 128 may include corresponding media players, for example, a FLASH player. FLASH players may be implemented either as a plug-in to the software web browser, or as a stand-alone application.

Printing Device

The system 100 includes the printer 134 operable to receive and print images upon edible media 102 using edible inks. The printer 134 may include a feed path through which the edible media 102 is inserted and conveyed past one or more printheads. The printhead technology can be any type of printhead technology which can be controlled by digital signals including, for example, inkjet, thermal inkjet, piezo inkjet, continuous inkjet, valve jet, electrostatic inkjet, and airbrush technology.

In some printing systems, the edible inks described above are generally fed from a cartridge reservoir. Such cartridge reservoirs may be refilled as need. In some embodiments, images are printed onto a transfer layer, which in turn is applied onto the edible media 102.

Edible Media

The system 100 includes edible media 102 on which images are printed. The edible media 102, in this example, includes at least one edible layer 136 and an edible coating 138. The edible medium may be a single layer of edible material. For example, the edible medium may be a single layer of sugar paper, sugar paste, starch paper, fondant, or some other edible form. Examples of options for edible material include but are not limited to standard media with sizes of ½, ¼, and ⅛ sheet, or precut media of sizes 8 inch round, 3 inch round, or 2 inch round, or Designer Prints.

One embodiment of the edible layer 136 of the edible media 102 includes a mixture of a sugar paste of varying thickness. The edible layer 136 is typically formulated for several key features. First, the edible layer 136 is mixed to depict high-quality pictorial images from particular edible inks disclosed herein. Second, the edible layer 136 travels through a printer (e.g., printer 134) without damaging the edible media 102, the edible layer 136, or the printer. For example, the edible layer 136 is mixed to ensure sufficient strength to be bent and manipulated through the conveying path of the printer 134, withstand the heat of the printing process, and still maintain suitable textural integrity as to not jam in the printer mechanism of printer 134. Third, the edible layer 136 is mixed to ensure there is no detraction from the taste of the food product on which it is to be applied. In some configurations, the edible layer 136 is formed from sugar, sorbitol, hydrogenated palm kernel oil, xanthan gum, locust bean gum, gum tragacanth, dried glucose syrup, glaze, and water. Other variations of edible layers and edible media may be used as well.

In some implementations, the edible layer 136 is formulated for use in decorating pizza or deli type items. For example, the edible layer 136 may be formed from tapioca starch, corn starch, corn syrup, microcrystalline cellulose, sugar, water, canola oil, glycerin, titanium oxide, polyglycerol esters, salt, maltodextrin, silicon dioxide, medium chain triglycerides, algin, citric acid, coconut oil, soy lecithin, locust bean gum, FD&C blue #1 lake, red #40 lake, yellow #5 lake, and yellow #6 lake.

Other examples of edible layers 136 are described in U.S. Pat. No. 5,017,394, assigned to the Lucks Company, and incorporated herein by reference. This type of edible layer 136 is formed from a flour and/or starch base as opposed to the sugar base of a fondant. Another example of an edible layer 136 is disclosed in U.S. Pat. No. 5,334,404, issued to Garcia et al. and incorporated herein by reference. Other types of edible layers 136 can be used including, but not limited to rice paper, wafer paper, and other edible substrates on which an image may be printed.

The edible coating 138 enables the edible media 102 to render a high quality pictorial image on the surface of the edible layer 136. Without this coating 138, the inks tend to run or bead or form an imperfect image. In one example, the coating 138 is a very thin layer of calcium carbonate. This thin layer allows the inks to properly perform to render a high-quality pictorial image. Other coatings may be used in system 100.

In some embodiments, the edible media 102 may also include an optional release sheet 140 having a silicon coating functioning as a backing material, for example. In some implementations, the edible media 102 is a standard size or shape. Example sizes can include 8.5 inches by 11 inches, 9-inch round, and 8-inch round. The size can be a precut size or a selectable size. In some configurations, frosting layers, edible material and/or fondant layers can be malleable and/or stretchable to various sizes and shapes.

Edible Inks

The edible inks used in the system 100 are typically formulated from food grade colors and ingredients to enable high quality, near-photographic images to be printed onto the edible media 102. These inks are edible and have precise color-matching properties, but additionally function in a manner similar to other commercially available inks in printers. Edible inks may include natural inks manufactured from a food grade base.

The edible inks are specifically formulated for use in a particular printer. The user selects to print the image using different color models, according to the requirements of the printer. Providing selectable color models improves the precision of the printed image by enabling adherence to particular color matching systems. The edible inks may be inks designed to be used for decorating numerous different types of food products, including, for example, cookies, cakes, pizza, cupcakes, candy bars, edible tattoos, temporary tattoos, cereal boxes, waffles, and pancakes.

The edible inks are additionally formulated to faithfully render images in accordance with the appropriate color model. Possible color models include, but are not limited to, the Cyan, Magenta, Yellow and Black (CMYK) color model, as well as the RGB, LAB, HSB, Pantone, Hexachrome, and other color models. In some embodiments, the edible inks are formulated to render images in accordance with the CMYK color model. In some examples, the compositions of the edible inks could include (1) Cyan: water, isopropyl alcohol, sodium lauryl sulphate, FD&C Blue #1 (2) Magenta: water, isopropyl alcohol, sodium lauryl sulphate, FD&C Red #3 & FD&C Blue #1 (3) Yellow: water, isopropyl alcohol, sodium lauryl sulphate, FD&C Yellow #5, and/or (4) Black: water, isopropyl alcohol, sodium lauryl sulphate, FD&C Blue #1. Other examples of edible inks that provide faithful matching to the CMYK color model, as well as other color models, and that function within the constraints of commercially available printing technologies may be used in the system 100. In some configurations, the inks used in system 100 include a combination of edible inks, natural inks, synthetic inks, or other inks.

Central Control Device Software Modules

FIG. 2A is an example computer system 200a containing software modules of a website used in a system for decorating edible media. The system 200a can, for example, be analogous to central control device 132 (FIG. 1). A user of the system 200a accesses a website on the central control device 132 to gain access to one or more software modules 202-232

The software modules shown in FIG. 2A may include an image library module 202, an image editing module 204, an edible media module 206, a user account module 208, a license module 210, a print module 212, a user location module 214, a social networking module 216, an augmented reality module 218, a training module 220, an ordering module 222, a maintenance module 224, a reporting module 226, and a messaging module 228.

The image library module 202 is a software module including a plurality of digital images that can be printed onto an edible media. The image library module 202 includes both images available for purchase and free images. The images may be licensed or unlicensed images, and may include clip art, illustrations, photographs, text, or other file content. The image library module 202 generally contains different formats of the same image each of which are configured for printers that use differing color models.

The images in the image library module 202 may contain embedded augmented reality markers, which allow the user access to augmented reality content. The augmented reality marker can be any asymmetric geographical shapes of any color with sufficient contrast. The user can use the image containing the augmented reality marker to access augmented reality content on the augmented reality module 218, for example.

The image library module 202 allows the user to browse or search through the images using keyword criteria such as "Sports" or "Princess" or "Birthday." The image library module 202 may be updated with new images and new image formats. In certain embodiments, image library module 202 may be updated with an image acquired through a local image source, such as a USB WebCam. In another illustrative embodiment, image library module 202 may be updated by a reference to Web content, such as a photograph posted on a social media network. In another implementation, image library module 202 may be updated based on changes in agreements with image suppliers, and/or alterations in files supported by the system 100.

The image library module 202 interacts with the license module 210 and the user location module 214 to allow or restrict users when finding and/or purchasing particular images. For example, the license module 210 may restrict access to a user based on a number of factors. One example factor may include barring image purchases based on a geographic location and/or an authorized list for the user. In this example, when a user selects to view images available from the image library module 202, the user location module 214 can automatically identify the geographic location of the user. The user's geographic location can then be used by the license module 210 to identify whether any of the images in the image library module 202 are restricted from being sold in the user's location. If a restriction is found, the license module 210 sends to the image library module 202 information on which images are unavailable to the user. The image library module 202 removes the restricted or unavailable images from the image library made available to the user. In certain embodiments, restriction of images based on the user's geographic location can be in addition to or in substitute for an authorized list of images containing available images for the user The image library module 202 also interacts with the user account module 208 to allow a secondary user to only search and purchase images that have been authorized for the secondary user by a principal user. For example, a principal user can designate specific secondary users. The principal user then searches through the image library module 202 and identifies which images can be sold to which secondary users. The principal user can designate different images for users in different geographic locations. When a secondary user accesses the website and selects to search the images in the image library module 202, the secondary user is only shown the images available at the user's geographic location, and/or on the user's authorized list, which is made of images previously authorized by the principal user.

The image library module 202 also interacts with the social networking module 216 to allow the user to identify the most popular images or designs and to access other social networking functions. For example, the user may be provided an option of viewing lists of the most popular designs. The user may also be provided an option of viewing consumer reviews of images in the image library. The provision of social networking options may be provided in an online fashion where the user can interact with social networking content using system 100.

The image library module 202 interacts with the print module 212 to ensure that the version of the image that is compatible with the color model of the printer is sent to the user's printer. When the user selects to print an image, the print module 212 sends to the image library module 202 the color model of the user's printer. The image library module 202 sends to the user's printer the correct format of the image. In certain embodiments, the print module 212 prompts or allows the user to identify the printer 134 attached to local control device 128. In other illustrative embodiments, the print module 212 auto detects the identity of printer 134.

The image library module 202 also interacts with the edible media module 206 to enable the user to identify images suitable for the particular edible media selected for decoration. The user enters into the edible media module 206 the specific type of edible media being decorated. The edible media module 206 contains characteristics of the edible media, and sends to the image library module 202 specific criteria for compatible images, such as image size. The image library module 202 removes the images which are not compatible with the edible media the user selected.

The edible media module 206 is a software module that includes a list of the edible media available to be used in the system 100 and which are available for purchase by the user. The user can search or browse through the edible media module 206 using various keyword criteria, such as "cupcakes" or "cake." The edible media module 206 may also contain information about the cost and availability of edible media. Furthermore, the edible media module 206 also may contain a database of unique codes that are associated with particular edible media. The unique codes may function as part numbers, printing data, cost data, retrieval data, or other data. The edible media module 206 interacts with the user account module 208 to allow the user to purchase edible media. Once the user selects an edible media for purchase, the user account module 208 processes the financial transaction. In some implementations, if a licensed image is selected, the user account module 208 may require the user to checkout before proceeding to print the image on the edible media.

The edible media module 206 interacts with the image library module 202 to allow the user to identify images that are compatible with particular edible media. The edible media module 206 contains information about edible media compatible with the system. The user chooses the specific type of edible media and the edible media module 206 sends information about this edible media to the image library module 202. The image library module 202 then isolates specific images that are compatible with the particular type of edible media.

The edible media module 206 includes at least one repository (not shown) of unique codes that are associated with particular edible media. The edible media module 206 tracks whether or not a code has been used to authorize a print. The edible media module 206 interacts with the print module 212 to verify that the user is using authorized edible media using the codes. The print module 212 notifies the edible media module 206 upon receiving a purchase request, which prompts the user to enter the code from the edible media. The edible media module 206 verifies that the code is valid and that the code has not been previously used. If the code is valid, then the print module 212 proceeds with the print of the image. If the code is not valid, then the print module 212 notifies the user of the invalidity without printing the image.

The image editing module 204 is a software module that allows users to edit selected images. Example editing functions may include cropping, moving, rotating, re-touching, brightening, darkening, and adding text to images, as well as other image editing operations. The image editing module 204 interacts with the licensing module 210 to prevent users from editing images on which there are editing restrictions imposed by a license. The license module 210 informs the image editing module 204 if there are any restrictions on editing the selected image, and if so, how. The image editing module 204 then prevents the user from editing any images in violation of a license.

The user account module 208 is a software module that maintains profiles of individual users in user accounts. The user accounts include information pertaining to a number of users, such as address data, financial data, previous image usage, etc. In some embodiments, the user account module 208 maintains a list of user names and passwords that provide or limit access to particular user accounts. The user account module 208 can process financial transactions, for example, to allow users to purchase edible media.

The user account module 208 can store purchase and order histories including selected images, designs, text content printed, notifications configured, edible media purchased, etc. The user account module 208 can also store user profiles, address data, financial data, and image restrictions.

The user account module 208 interacts with the edible media module 206 to allow the user to purchase edible media. Once the user selects the desired edible media, the user selects to purchase the edible media. The user account module 208 will then process the purchase. The user account module 208 may prompt the user for credit card information or bank account information for direct debit. Alternatively, the user account module 208 may already have this information on file. The user account module 208 will charge the user the designated amount.

In some configurations, the user account module 208 provides an option to purchase credits. The credits can be applied to a particular user account for purposes of purchasing images using the credits. The credits can be incremented when purchased by a user and decremented when the user purchases images using system 100. For example, if a user chooses to download and print a digital image, the user account module 208 can decrement the user's credits thereby providing payment, and print the requested images onto a requested edible medium.

Licensed digital images can be charged on a per use basis. Thus, if the user prints the same licensed digital image on six cupcakes, the user may be charged six credits for using the licensed digital image six times. In some implementations, the system 100 can allow printing of a licensed image multiple times on one sheet of edible media, for example, at the cost of one usage (e.g., one credit). The system 100 may allow a variable relationship between an image and the number of credits required to use the image.

In the event that the user is short on credits, the user may be prompted to purchase additional credits by using a credit card, for example. If however, the user wishes to print non-licensed digital images, no credit charge will be transacted. Rather, the user will simply purchase any materials utilized.

In some embodiments, a selected licensed digital image can be instantaneously purchased from the central control device 132, for example, using the local control device 128 upon receiving (i) user-entered payment information and (ii) a user request for purchase of the selected licensed digital image. The payment information can, for example, allow access to an e-commerce system (e.g., within system 100) for purchasing licensed digital images using decrementable credits for printing licensed digital images. The e-commerce system can be adjustable for multiple currencies such as the U.S. Dollar, the Pound, and the Euro, just to name a few examples.

In some configurations, users can pre-purchase credits that will enable a print function to be selectable within the GUI 127, for example. The pre-purchased credits allow for users to easily access licensed content as part of a custom design and print the design in an accelerated fashion. For example, if the user pre-purchased credits, the user may have been asked to sign a licensing/usage agreement at the time of purchasing the credits. Thus, when the user performs a transaction with such credits, additional forms and/or steps are not required of the user during design and print stages.

In some implementations, the payment information includes credit card data rather than previously purchased credits. In some embodiments, the payment information includes credit card data presented for purchasing decrementable credits.

In general, the user account module 208 interacts with the image library module 202 to allow the user to purchase an image from the image library module 202. Once the user selects the desired image, the user chooses to complete the purchase. The user account module 208 will then complete the purchase. For example, the user account module 208 can verify whether the user has any available credits. If the user does have available credits, then one or more credits are debited from the user's credits and the user account module 208 authorizes the use of the image. If the user does not already have available credits, the user account module 208 may prompt the user for credit card information or bank account information for direct debit. Alternatively, the user account module 208 may already have this information and use previously stored financial information. The user account module 208 will charge the user the designated amount and authorize the use of the image to complete the purchase.

The user account module 208 allows a principal user to designate one or more secondary users. The user account module 208 interacts with the image library module 202, the license module 210, and the user location module 214 to allow the principal user to designate an authorized image list for the particular secondary user. A principal user accesses the user account module 208 and designates specific secondary users. The principal user then selects the image library module 202 and searches through the image library. The principal user designates which images are authorized for which secondary users. The principal user can also authorize different images for different secondary users. This information is generally stored in the user account module 208.

The license module 210 is a software module that includes information regarding the system's license to certain images. The license module 210 interacts with the image library module 202 and the user location module 214 to ensure that the user may only search and select for purchase authorized licensed images. The user location module 214 informs the license module 210 of the user's geographic location. The license module determines whether restrictions exist on the sales of particular images in the user's location. If restrictions exist, the license module 210 requests that the image library module 202 remove the unauthorized images from the images available to the user. In some configurations, authorized lists or pre-filtered searching options can be applied to the available licensed content such that a user is pre-approved for finding and/or downloading particular content.

The license module 210 interacts with the image editing module 204 to ensure that any licensing restrictions on images are followed. Once the user selects a particular image, the license module 210 informs the image editing module 204 if any licensing restrictions exist that prevent the user from editing the selected image. If restrictions exist, the license module 210 presents the restrictions to the user. The print module 212 is a software module that allows the user to print images using the system 100. Once the user has selected an image and is ready to print the image onto an edible media, the user selects to print the image. The print module 212 allows a user to preselect default printer model information, which can be stored within the print module 212. In some implementations, the print module 212 selects a color profile based on printer model information stored within print module 212. Alternatively, print module 212 can perform hardware communication with the printer to determine printer model information for the purposes of selecting a color profile. In another illustrative embodiment, print module 212 allows the user to select a color profile. The print module 212 provides data from the central control device to the local control device for printing on a printer attached to the local control device. In certain embodiments, the local control device 128 may print data provided by the print module 212 within a print environment provided internally by a software web browser used to navigate the website with at least one image database. In other configurations, a local control device 128 may print data provided by the print module 212 in an external printing environment provided separately from the software web browser used to navigate the website with at least one image database.

The print module 212 interacts with the edible media module 206 to verify that the user inputs a code, such as an edible media code, that corresponds to an authorized edible media. The edible media module 206 verifies that the code is valid and unused before the print module 212 proceeds with sending data to the local control device for printing.

The user location module 214 is a software module that identifies the user's geographic location. In certain implementations, this may be accomplished by comparing the user's IP address against publicly available databases. In other embodiments, the user location module 214 determines a user's geographic location from a stored user address list. For example, the user location module 508 accesses one or more user address lists to determine which users reside in a particular location. The user address list typically includes a number of users with corresponding physical mailing addresses. The user location module 508 accesses the user address lists to determine which geographic location is relevant for a particular user and provide a catalog of images having proper licensing for the determined geographic location. User address lists can be generated by a vendor or third-party and sent to individual systems (such as system 100). The secondary user address lists can be uploaded by a primary user (e.g., a store manager) using storage media or uploaded automatically over the Internet. Although detecting IP addresses and user address lists are discussed above, any available method of determining an Internet user's location may be used.

The user location module 214 interacts with the license module 210 and the image library module 202 to ensure that the user can only select and purchase images that are licensed in the geographical area. For example, if an image is licensed to be sold or used in Canada, the same image may have requirements for use in the United States. As such, the user location module 214 can use license module 210 and image library module 202 to ensure image licensing agreements are obeyed.

The user location module 214 interacts with the user account module 208 to ensure that a secondary user can only search and select for purchase images that have been authorized by a principal user. When a user selects to search for an image from the image library module 202, the user location module 214 identifies the user's location. The user location module 214 informs the user account module 208 of the user's location, so the user account module 208 can identify whether the user is a secondary user with geographic restrictions on the authorized images available to the user. In some configurations, authorized lists or pre-filtered searching options can be applied to the available licensed content such that a user is pre-approved for finding and/or downloading particular content, despite the user location falling within a geographic restriction.

The social networking module 216 is a software module that allows the user to access social networking content. For example, the social networking module 216 may inform the user which of the available images are the most popular over all, the most popular for certain genders or age groups, or the most popular for certain events, such as birthdays. The social networking module 216 may contain user or consumer reviews of certain images. The social networking module 216 may also suggest ways that images can be altered using the image editing module 204. The social networking module 216 interacts with the image library module 202 to allow the user to purchase images identified in the social networking module 216.

The augmented reality module 218 is a software module that allows the user to access augmented reality content when the system 100 detects a valid augmented reality marker. The system 100 can print images onto edible media that contain embedded augmented reality markers. The user can then display the decorated edible media to a video device. In certain configurations, this video device is a web camera. The local control device 128 sends the video data to the central control device 132. The augmented reality module 218 on the central control device 132 scans the incoming video signal, and identifies a valid augmented reality marker. The augmented reality module 218 will respond by displaying augmented reality content. For example, in certain implementations the augmented reality marker may be embedded in an image of a princess that is used to decorate a cake. The augmented reality module 218 may display a singing and dancing princess in response to recognizing the augmented reality marker.

The training module 220 is a software module that includes training content which instructs users on how to use the decorating system. The training module 220 may contain videos, lists of common questions and the answers thereto, diagrams, or any other training content that user may find useful.

The ordering module 222 is a software module that includes inventory items for a system owner (e.g., a bakery owner, store owner) to access for reordering edible media, edible ink, replacement parts, printheads, and other system supplies.

The maintenance module 224 is a software module that includes maintenance menus for updating software, hardware, or inventory. The maintenance module 224 can additionally provide troubleshooting instructions, printer maintenance features, testing functions, and cleaning functions.

The reporting module 226 is a software module that includes mechanisms for reporting on sales, inventory, customers, errors, malfunctions, and other events occurring in system 200a. In some embodiments, reporting data can be exported to comma delimited files, Excel files, or exported to particular reporting software. The reporting module 226 can additionally provide site metric reporting via NetInsight, Google analytics, or similar site metric reporting software.

The messaging module 228 is a software module that includes mechanisms for generating and sending electronic messages to users. For example, the messaging module 228 may send an electronic message to specific user accounts or groups of user accounts based on previous purchases. The messaging module 228 may send system users receipts or other billing information in the form of a message. The messaging module 228 may also send advertising content or fliers to known users. In some configurations, the messaging module 228 sends messages to system managers or store managers regarding system updates or image updates.

Security module 230 is a software module that handles secure socket connections from local control device 128. For example, following authentication through login procedures through a software web browser, central control device 132 can establish additional secure connections to the same local control device 128 with software modules separate from the software web browser. Functionality not incorporated into the software web browser on local control device 128 can interact with the software modules on central control device 132 through security module 230. Interaction with software modules on central control device 132 can proceed through multiple software applications on local control device 128. In certain implementations, security module 230 handles secure transmission of both licensed image data and financial data for purchases of licensed images. In other illustrative implementations, security module 230 handles secure transmission of financial data for purchases of licensed images, but does not apply security policies to licensed image data. In certain embodiments, HTTP (hypertext transfer protocol) can be used for transmitting payment and/or image data, such as in the form of unsecured HTTPS or secured HTTPS. In other embodiments, FTP (file transfer protocol) can be used for transmitting payment and/or image data. Alternatively, SMTP (simple mail transfer protocol) can be used for data transfer.

Additional modules 232 can be included in system 200a. For example, service oriented third party applications can be merged or supplied as add-ins as appropriate. Similarly, online advertising content, Internet access, FLASH applications, database management, online shopping, and other services may be offered in system 200a.

Local Control Device Software Modules

Figure 2B:
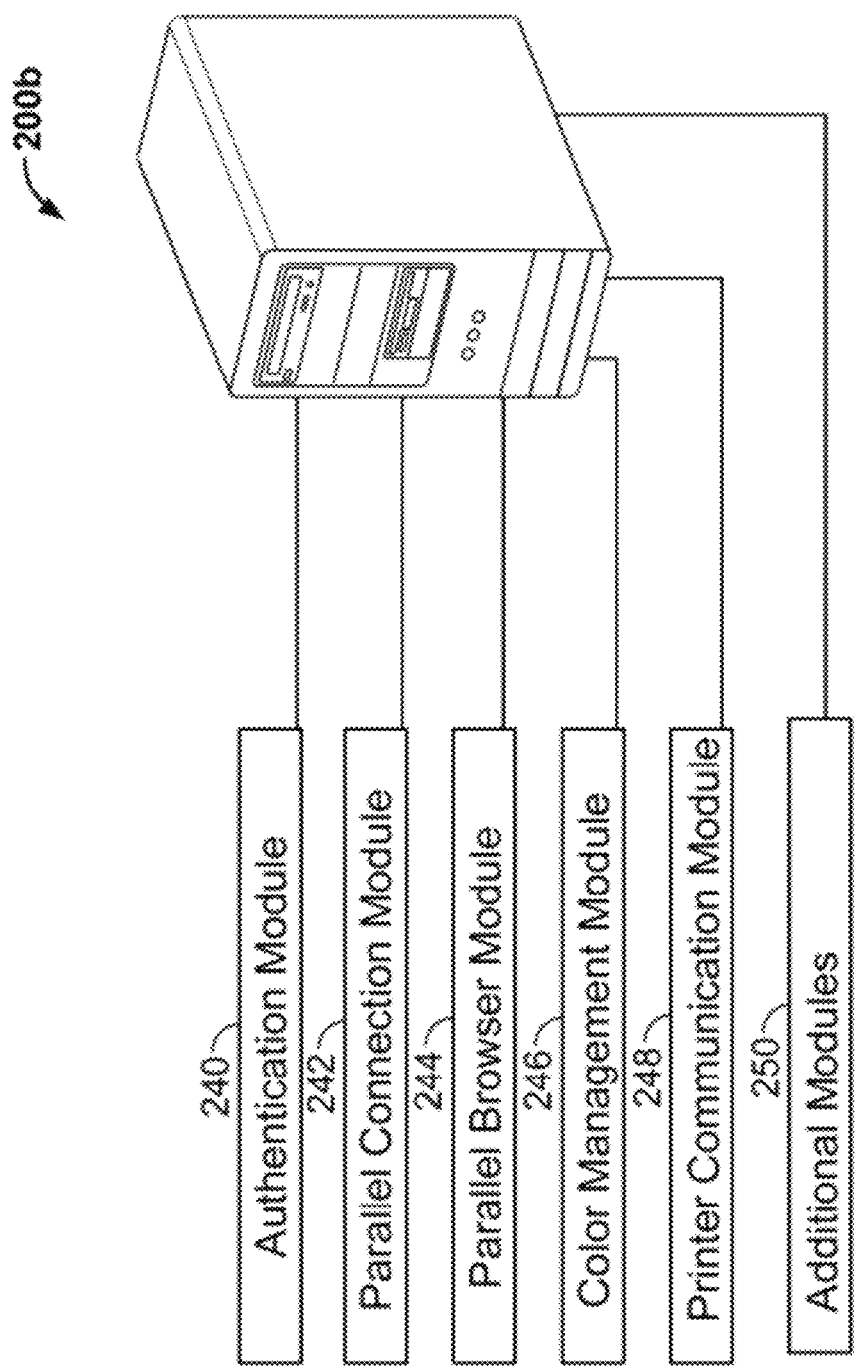
FIG. 2B is an example computer system containing software modules in a local control device in a system for decorating edible media.

FIG. 2B is an example computer system 200b containing examples of software modules used in a system for decorating edible media. The system 200b can, for example, be analogous to local control device 128 (FIG. 1). A user of the system 200b accesses a website on the central control device 132 to gain access to one or more software modules 202-232(FIG. 2A).

The software modules on local control device 128 include authentication modules, parallel connection modules, parallel browser modules, color management modules, and/or printer communication modules. Additional modules are possible. The described software modules can be selectively combined to form a multifunctional software module, or split into multiple software modules.

The authentication module 240 interacts with the parallel connection module 242. Upon successful verification of an authenticated session between the software web browser on local control device 128 and central control device 132 via network 118, the authentication module 240 causes parallel connection module 242 to establish a second connection to central control device 132 in parallel to the connection used by the software web browser on local control device 128. In some implementations, the parallel connection is established automatically after authentication of a secure connection for the software web browser by authentication module 240. In other embodiments, the second connection is established based on user request. The parallel connection module 242 connects with the security module 230 shown in FIG. 2A. In certain implementations, parallel connection module 242 may utilize the connection created by the software web browser for communication with central control device 132.

In certain configurations, the second connection occurs over the network 118 used by the software web browser. In other implementations, the second connection occurs over a network different from network 118. The connection established by the parallel connection module 242 can use identical networking protocols or encryption protocols to the connection utilized by the software web browser, or can use a different networking and/or encryption protocols.

In some embodiments, the second connection persists despite the initial connection between the software web browser on local control device 128 and central control device 132 being terminated. In other configurations, the second connection terminates concurrently with termination of the first connection between the software web browser on local control device 128 and the central control device 132.

The parallel connection module 242 interacts with parallel browser module 244. Parallel browser module 244 utilizes the secure socket connection with central control device 132 over the second connection created by the parallel connection module 242. Access to software modules on central control device 132, including the image library 202, are accessible to the parallel browser module 244 concurrently with accessibility from the software web browser on local control device 128. In certain implementations, the software web browser on local control device 128 is a generic web browser. The software web browser on central control device 132 can be implemented as $3^{rd}$ party software, with closed, proprietary, or undocumented application programming interfaces, and/or security profiles that deny access to system functions including local file system access or low level printer control commands. In other embodiments, the software web browser on local control device 128 provides a documented application programming interface (API) for the software web browser to interact with other software installed on local control device 128. Parallel browser module 244 can co-exist on local control device 128 with either implementation of software web browser on local control device 128.

In certain configurations, parallel browser module 244 provides a streamlined user-interface for accessing software modules residing on central control device 132. The parallel browser module 244 can be implemented in a variety of programming languages or development environments. In certain implementations, the parallel browser module can be implemented as an Adobe Integrated Runtime (AIR) application. In the AIR application, the parallel browser module 244 acts as a cross-platform, browser-based runtime application. In other embodiments, parallel browser module can be implemented in C++ using Qt libraries. In the C++/Qt framework implementation, the parallel browser module 244 acts as a web-enabled cross-platform application and UI framework with access to system functions, such as the local file system.

The parallel browser module 244 is implemented as a Rich Internet Application, providing both local file system access and remote web content access. For example, remote web content including but not limited to thumbnail representations of licensed images from image library module 202 can be downloaded by parallel browser module 244 and stored in a local cache residing on the local file system of local control device 128, providing low latency rendering of images during image manipulation events including browsing and editing. In other embodiments, the parallel browser module 244 is implemented in a software package complying with security policies that permit remote web content access, but not local file system access, or vice versa. Local cache contents are in a custom format that prevents users from extracting local cache contents for unauthorized editing and/or printing of cached licensed images.

The parallel browser module 244 on local control device 128 exchanges data with central control device 132 over the same network connection established by the software web browser. In select implementations, the software web browser utilized an unsecured connection such as HTTP (Hypertext Transfer Protocol). The software web browser utilizes a secured connection such as HTTPS (HTTP with secure socket layer (SSL)/transport layer security (TLS)), performing security procedures including but not limited to server authentication, client authentication, and secure encryption key exchange.

The parallel browser module 244 on local control device 128 exchanges data with central control device 132 over a network connection different than the network connection established by the software web browser. The separate connection established by the parallel browser module 244 can either be secured or unsecured, independent of if the software web browser connection is secured or unsecured.

The parallel browser module 244 is capable of sending and receiving separate classes of data on different connections and/or different connection security profiles. For example, image data from image library module 202 may be received by the parallel browser module 244 over an unsecure HTTP connection between the parallel browser module 244 and the central control device 132, while financial data may be sent from the local control device 128 to central control device 132 over a secure connection established by the software web browser. In another example embodiment, both image data and financial data may be sent over a secure connection established by either the software web browser or the parallel brower module 244.

Parallel browser module 244 bypasses existing print drivers provided by the operating system when printing. When bypassing operating system print drivers, parallel browser module 244 interacts with a color management module 246. The color management module 246 provides color matching and correction to print data provided by print module 212 on central control device 132. Color encoding on print data propagating from print module 212 may be indexed by a color representation scheme as known in the art.

In certain configurations, the color representation scheme is as described by the International Color Consortium (ICC). The ICC specification uses the CIE color profile and is widely used and is referred to in many International and other de-facto standards, and was approved as an International Standard, ISO 15076-1, which is incorporated herein by reference. A standardized color representation scheme such as the ISO 15076-1 ensures color rendition accuracy despite variations in color detection and production across image capture devices (e.g., scanners), image display devices (e.g., monitors), and image reproduction devices (e.g., printers). Color management module 246 provides a color managed workflow from source image to printer output, applying color representation transformations that ensure accurate color representation in each color domain. The general principles of color managed workflows using the ICC Color management Model have been described variously, for example in U.S. Pat. No. 7,161,710 to MacLoed, et al, assigned to Adobe Systems Incorporated, which is incorporated herein by reference.

In some implementations, color profile information is embedded in the image provided by the print module 212. In other embodiments, color profile information is retrieved separately from the image data provided by the print module 212. In certain configurations, a separate image color profile for the display device connected to the local control device 128 is applied to the retrieved image. In other implementations, the display device connected to local control device 128 is not color corrected using any color profile.

Application of color correction to print devices is independent of application of color correction to display devices. In certain embodiments, a user can automatically retrieve the corresponding color profile for a printing device connected to local control device 128 based on hardware model information for printer 134. In other cases, the user can provide their own color profile based on color spectrography measurements performed on printed outputs of printer 134.

The color management module 246 interacts with a printer communication module 248. The printer communication module 248 provides communication to a printer device connected to local control device 128 without utilizing printer drivers installed on the operating system on local control device 128. In certain configurations, printer communication module 248 automatically detects the model number of the attached printer 134, and downloads corresponding software through the second connection established by parallel connection module 242. In other implementations, printer communication module 248 includes pre-installed software for several different print hardware manufacturers and/or vendors. In further embodiments, printer communication capabilities provided by the printer communication module 248 are not dependent on specific cartridge reservoirs utilized by the printer.

Parallel web browser module 244 is associated with network address identification information. In certain embodiments, network address identification information allows modules residing on the local control device 128 to interact with one another without networks external to the local control device 128, such as a LAN, MAN, or the Internet. In other embodiments, network address identification information only allows modules residing on the local control device 128 to interact with one another through an external network connection, with or without messages passing through the central control device 132.

Parallel web browser module 244 and the software web browser on the local control device 128 communicate with a pre-defined message format and message exchange patterns. In an illustrative embodiment, the Simple Open Access Protocol (SOAP) is utilized. Alternatives communication schemes for exchanging complex data structures include but are not limited to Extensible Markup Language-Remote Procedure Call (XML-RPC).

Additional modules 250 can be included in system 200b. For example, media players, advertising displays, and other services may be offered in system 200b.

Account Management

User accounts can be managed by an administrator (e.g., a bakery or store owner). The administrator typically configures an administrative profile where administrative tasks can be carried out. For example, the system owner can log in to an administrative profile for configuring the system 100, reviewing inventory reports, and purchasing consumables. The administrative profile can also include options to create additional user accounts, update or modify users or passwords, generate contact lists, browse and order consumables, view order or purchase histories, modify language parameters (e.g., Spanish, English, Mandarin, French, etc.), manage licensed image assets, edit pricing, etc.

Web Host Server

A web host server within central control device 132 is configured by the administrator to allow users to select particular edible items, select customization options, and preview designed products before printing. The administrator can add or remove User Interface controls to provide or remove functionality in the GUI. For example, the administrator can modify a User Interface within the web host server to ensure all design modification buttons are presented in one interface. This can provide the advantage of allowing the user to quickly modify designs without having to move through multiple screens.

In one example, the web host server includes updatable links with (i) helpful hints and exceptional cake design examples, (ii) how-to instructions, (iii) frequently asked questions, (iv) tips and tricks from other users, and (v) online demonstration videos, just to name a few example links. In some configurations, a full help section is integrated into the system including tool tips, videos, etc.

In some implementations, the web host server includes notification and messaging functionality. For example, the web host server may include calendar integration options complete with scheduling and reminder notifications for particular holidays, birthdays, etc. The notification functionality can also include customized templates or projects which can be attached to the notifications. For example, if a company provides customized birthday cakes for all employees, the company can create a birthday template coupled to each employee's birthday date in a reminder notification. The notifications can be configured to email a customer, for example, in advance of an event requiring configuration of an edible media item.

In some embodiments, the web host server includes advanced browsing options with predictive text and faceted search filters. As such, a customer can easily navigate images and enter text in an expedited fashion. The web host server is operable to attach metadata or categorical information to particular images, frames, characters, or reminders to facilitate users in improving design time for preparing an image for printing.

Website Content

The websites hosted in system 100 can include menus, buttons, and other controls. The websites generally include standard website content such as contact information, privacy policies, warranty information, a site map, advertising content, social media content, and licensing information. Other content may be provided in websites hosted in the system 100.

Image Manipulation

The systems disclosed herein can provide image manipulation functions. Image manipulation functions can be performed in the GUI 127 in a mocked up onscreen version of the final product. Users can modify image media, backgrounds, frames, and text within the system 100. Functions for modifying and editing images include, but are not limited to color skewing, cropping, zooming, rotating, conversion to black/white or grayscale, and filtering. Images can be previewed, stretched, scaled, skewed, or otherwise manipulated in a Graphical User Interface to obtain a desired result for the user. Text can be added, removed, or otherwise modified. For example, text can be arced for a round design or angled for special effects. Text can be entered by a user or selected from a list of standard common phrases such as Happy Birthday, Congratulations, or Happy Anniversary, to name a few examples. In some configurations, watermarks can be added graphically and printed onto the edible media.

Media Authentication

The systems disclosed herein can provide media authentication for licensed images. For example, the system 100 validates particular licensed images for printing based on user information, image information, and/or product information. The system 100 provides an inventory system with trackable records. Each trackable record contains information regarding unique lot numbers assigned to each image to ensure image disclosures can be accounted for. Each trackable record can additionally contain quantity information for a product and media type compatible with such a product. Trackable records can be linked to user logs to determine customer accounts that activated particular products or images. This can be used to track lot numbers for recall purposes, for example. In some implementations, the trackable records can be used as an advertising tool to market to one or more specific customer.

In some embodiments, the system 100 prevents unauthorized usage of licensed images by preventing the system and/or user from locally saving a licensed image. In addition, the system 100 prevents unauthorized usage of licensed images by preventing the user from accessing a particular licensed image more than once in one session, for example. Other mechanisms of preventing unauthorized usage of licensed images can be implemented. Low level image processing, such as applying ICC color management, can still occur in the presence of the above mechanisms for preventing unauthorized image usage.

Checkout

Upon determining one or more items for purchase, users can choose to checkout and purchase such items. The checkout process generally leverages standard e-commerce functionality using application programming interfaces (APIs) for performing transactions. The APIs can integrate functionality such as shopping carts, shipping options, order preview, order confirmation, payment options, add/remove functions, etc. The checkout process guides the user through transactions. In some configurations, the checkout process can additionally manage reporting and accounting functions.

Process for Ordering Edible Media

Figure 3:
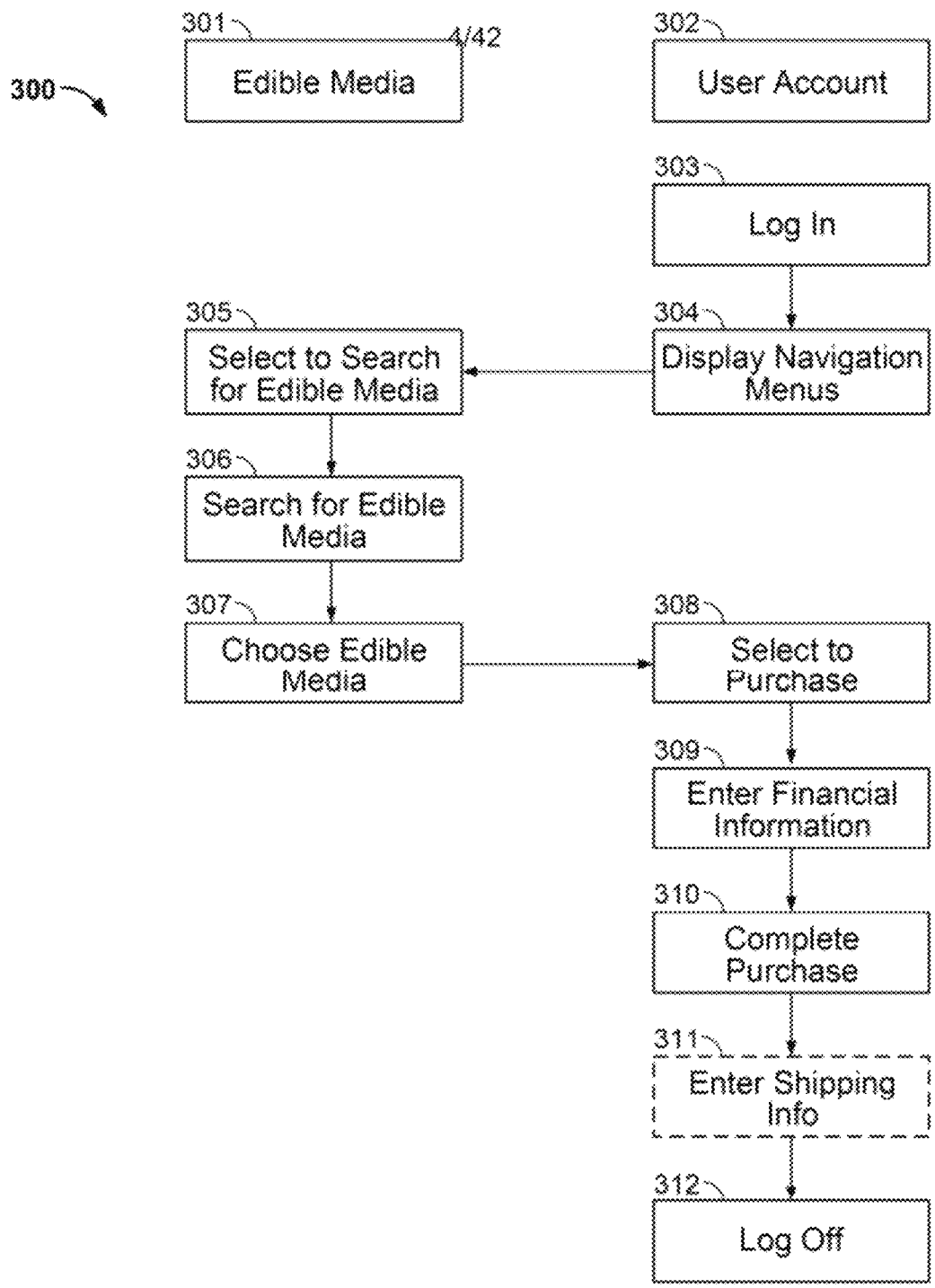
FIG. 3 is an example swim lane diagram of a process for ordering edible media.

FIG. 3 is an example swim lane diagram of a process 300 for ordering edible media. The process 300 can, for example, be performed in the online environment in system 100. Although the process 300 is described with reference to system 100, other systems, environments, or processors can perform the steps in process 300.

The online environment in system 100 may represent a website hosting one or more software modules. Software modules in this example include an edible media module 301 and a user account module 302. The edible media module 301 is a software module that includes information about edible media that is available for purchase, including current availability and inventory statistics. The user account module 302 is a software module that includes user accounts having profiles of information regarding particular users, such as financial information and address information. The user account module 302 can be configured to process financial transactions.

The user accesses a User Interface element in the website, such as GUI 127 to access the user account module 302. The user account module 302 presents a logon screen to the user and requests entry of a username and password. The user inputs the user name and password to login (303) and the user is logged into the system 100. In certain illustrative embodiments, in the event that the user forgets login credentials, an additional prompt permits the user to input identification information, such as the answer to a preselected security question, a PIN, or an e-mail address, to authenticate the user's request either to reset login credentials, or request secure delivery of login credentials.

The username and password may or may not be secure when sent from the software web browser to central control device 132. For example, the username/password may be encapsulated in TCP/IP packets as unencrypted plain text. Alternatively, username and password information may be secured over SSL/TLS.

The user account module 302 displays navigation menus (304). The navigation menus include a number of options representing different ways that the user may use the system 100. Options can include, but are not limited to quick launch items (e.g., quick copy, quick upload, quick print, etc.), photograph manipulation options, framing configuration options, artwork selection and manipulation options, purchasing options (e.g., enter media codes, user data, etc.), ordering options (e.g., pre-order forms), PhotoCake configuring options, settings options, and administrative options (e.g., shut down, restart, test system, etc.). The user can also choose to open a prior design to print copies on new edible media. Other options are possible.

The edible media module 301 provides an option to select to search for edible media (305). For example, the edible media module 301 offers the user the option of searching for specific edible media or browsing through a catalogue of edible media. The user navigates through the catalogue (306) and selects the edible media that the user wishes to purchase (307). In some implementations, the user is provided an option to select multiple types of edible media in a single purchase. When the user has selected the desired edible media, the user instructs the user account module 302 that the user is ready to complete the purchase (308). The user is directed to the user account module 302, which processes the purchase of the edible media.

The user account module 302 prompts the user to enter the user's financial information (309). The user may enter credit card information or bank account information for direct debit. In certain embodiments, the user account module 302 may store the user's financial information. The user has the option of using previously used financial information that is remembered by the user account module 302. In an illustrative embodiment, the user is presented with a screen to allow verification of purchase details before finalizing a purchase. The user account module 302 then completes the purchase (310) by charging the user according to the information that has been entered. In certain embodiments, the user has agreement terms that do not require purchase procedures to be executed for each individual image, and instead, purchase procedures are applied to a batch of images periodically, such as at monthly billing cycle.

In some configurations, the user account module 302 provides an option for shipping purchased edible media to the user. The user account module 302 may request additional information, such as an address the edible media should be sent to, or which shipping method the user prefers. Alternatively, the user account module 302 may retain previously used address information, in which case the user may choose to use previously stored information. The user completes the process 300 by logging off of the system (312).

Process for Establishing Secondary User Authorization

Figure 4:
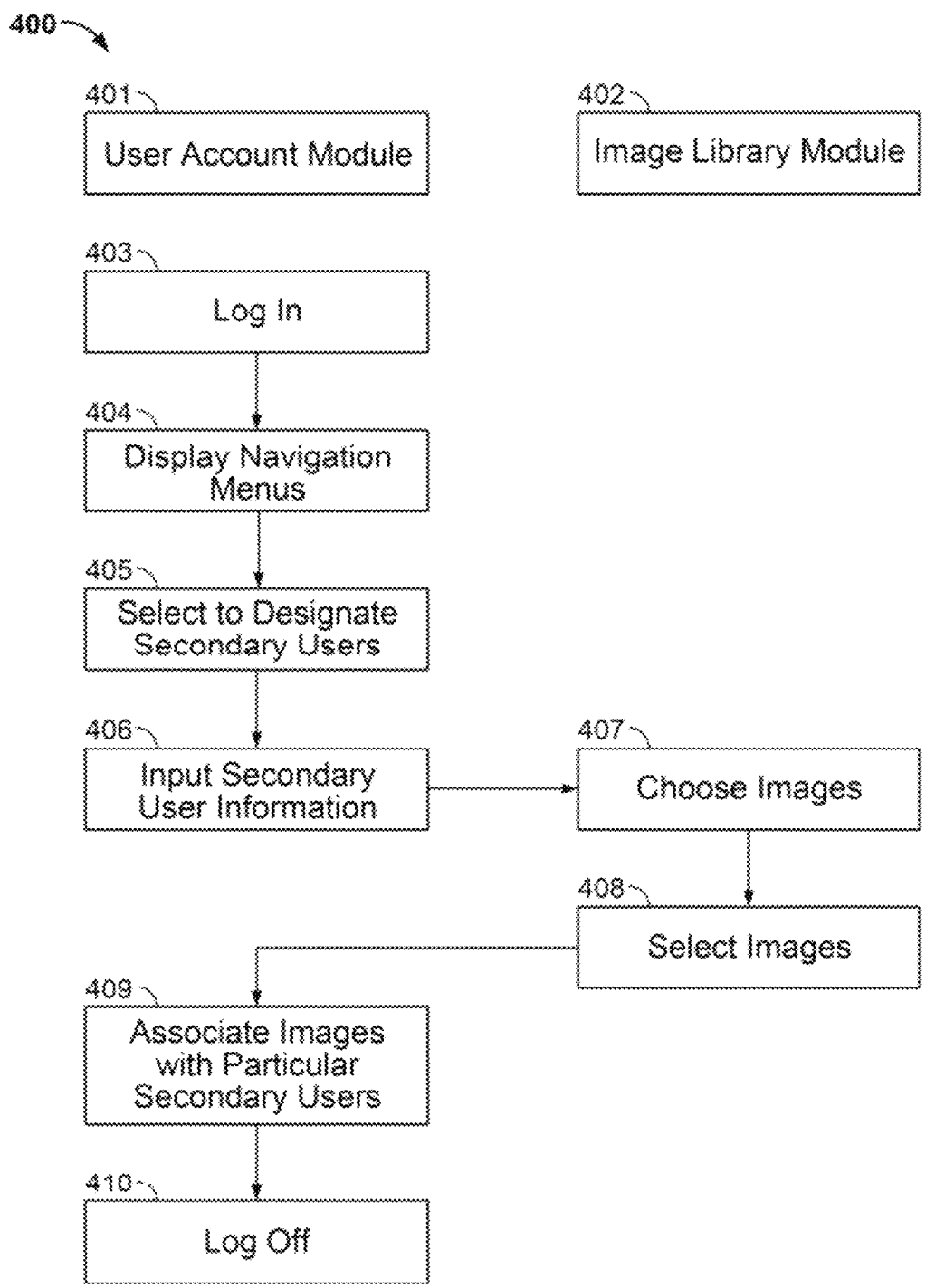
FIG. 4 is an example swim lane diagram of a process for a principle user to authorize secondary users and designate authorized images for the secondary users.

FIG. 4 is an example swim lane diagram of a process 400 for a principle user to authorize secondary users and designate authorized images for the secondary users. The process 400 can, for example, be performed in the online environment in system 100. Although the process 400 is described with reference to system 100, other systems, environments, or processors can perform the steps in process 400.

The online environment includes an Internet website hosting a user account module 401 and an image library module 402. The user account module 401 is a software module that includes user accounts containing profiles of information regarding particular users. The image library module 402 is a software module containing a searchable and browsable library of images.

The principal user accesses the user account module 401 and logs in to the principal user's account (403) by entering the principal user's user name and password. The principal user is shown a navigation menu containing a number of selectable options (404).

The principal user selects to designate secondary users (405). The principal user is then prompted for information regarding the secondary users and how such secondary users will be identified (406). For example, the principal user may be asked to enter unique user names and passwords for secondary users. Alternatively, the principal user may enter email or physical address information for the secondary users. The secondary users may be sent instructions on how to access their new secondary user accounts. The user account module 401 saves the information given on the secondary users, and associates the secondary user accounts with the principal user's account.

The image library module 402 allows the principal user to search for authorized images for the secondary users (407). The principal user searches or browses through available images, using keyword criteria such as "Disney" or "Princess" or "Birthday." The principal user selects images, or groups or categories of images, that will be authorized for the secondary users and the image library module 402 receives the selections (408).

Once the principal user has finished searching through the images and selecting images, the principal user selects to associate particular images and the user account module 401 associates the selected images with the particular secondary users.

The user account module 401 displays the designated secondary users, and the principal user associates the selected images, groups or images, or categories of images with specific users. The principal user designates different authorized images for users in different geographic locations and/or authorized lists. The principal user can subsequently log off of the system 100.

Process for Decorating an Edible Medium

FIGS. 5A-5D depict an example swim lane diagram of a process 500 for decorating an edible medium. The process 500 can be performed by system 100, for example, in the online environment in system 100. Although the process 500 is described with reference to system 100, other systems, environments, or processors can perform the steps in process 500. In other implementations, the process 500 for decorating an edible medium may include fewer or more events than shown in FIGS. 5A-5D.

Figure 5A:
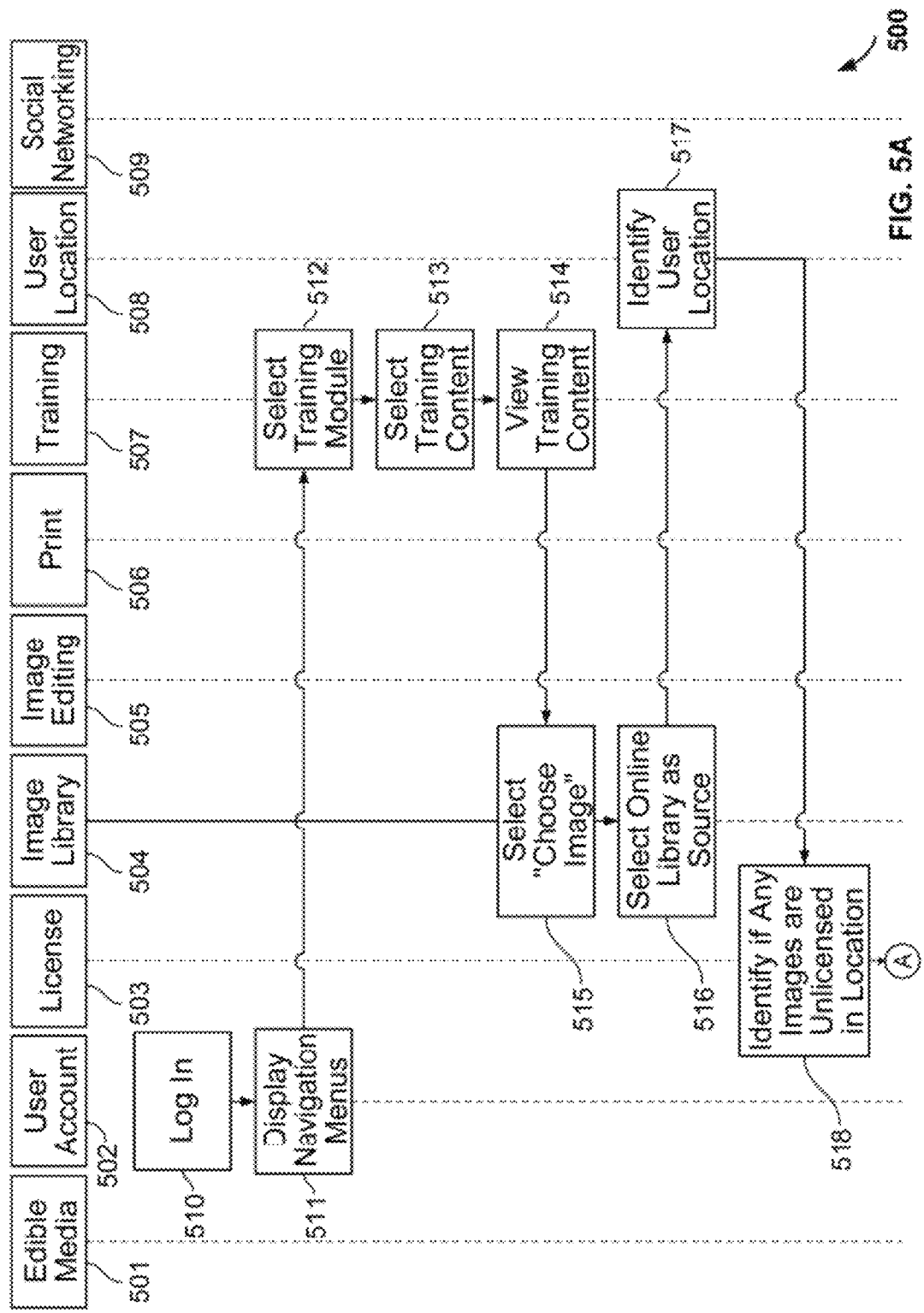
FIGS. 5A-5D depict an example swim lane diagram of a process for decorating an edible medium.

Referring now to FIG. 5A, an Internet website includes a number of modules 501-509. An edible media module 501 is a software module that includes information about which edible media are compatible with the system 100 and characteristics of the individual types of edible media. The edible media module 501 includes a database of unique codes and information on whether or not the particular codes have been used or not.

A user account module 502 is a software module that includes profiles of information regarding particular users. The user account module 502 allows or disallows users to login to user accounts using a username and a password. The user account module 502 also stores financial information and address information about the user and processes financial transactions.

A license module 503 is a software module that includes information about system licensing to certain images. System licensing information may include data identifying where particular images can be sold by geographic location and if and/or how the images may be edited.

An image library module 504 is a software module that includes a searchable and browsable library of images. The image library module 504 also allows the user to upload images from local image sources to use in the system.

An image editing module 505 is a software module that allows a user to edit images. A print module 506 is a software module that provides data to a local control device 128 for printing of selected images onto edible media using a specific color profile for a particular printer. A training module 507 is a software module that includes training content that instructs users to use the system 100. A user location module 508 is a software module that identifies the geographic location of the user. The user location module 508 can ensure that licensing restrictions are obeyed. In addition, the user location module 508 can allow principal users to control which images are offered for sale to secondary users in certain geographic zones. A social networking module 509 is a software module that allows a user to access social networking content and resources.

In operation, the user inserts an edible media into the printer. The user accesses the user account module 502 using the GUI 127 and logs into the user's account (510) by entering the user's unique username and password. The system 100 displays a menu containing a number of navigation options (511).

The user selects the training module 507 to learn how to use the system to decorate edible media (512). The training content may be any content that aids the user in using the system. In certain embodiments, the training module 507 may contain video demonstrations, written instructions, and lists of common questions and answers. The user selects the training content for viewing (513) and the training module 507 presents the selected training content to the user (514).

After viewing the training content, the user can choose an image to use to decorate an edible media (515). The user can additionally select an image source. The user may choose a local image source, an online image source, or the image library in the image library module 504, for example. In this example, the user selects the image library as the image source (516).

The system 100 accesses the user location module 508 and determines the geographic location of the user (517). In certain configurations, the user location module 508 determines the geographic location by looking up the user's IP address and associating the user's IP address with a geographic location. Other methods of determining the user's geographic location may be used.

After the user's geographic location is determined (517), the system 100 accesses the license module 503 and determines whether any licensing restrictions exist for the selected images in the user's geographic location (518). For example, the system 100 may determine the user's physical address from an authorization list and verifies whether any licensing restrictions exist. If licensing restrictions exist for the user's geographic location, the system 100 narrows the number of images provided to the user.

If licensing restrictions do not exist for the user or the user's geographic location and/or the user is on an authorized list, the system 100 can provide the user with all licensed images. The system 100 can additionally provide free images, non-copyright images, or third party designed images.

Figure 5B:
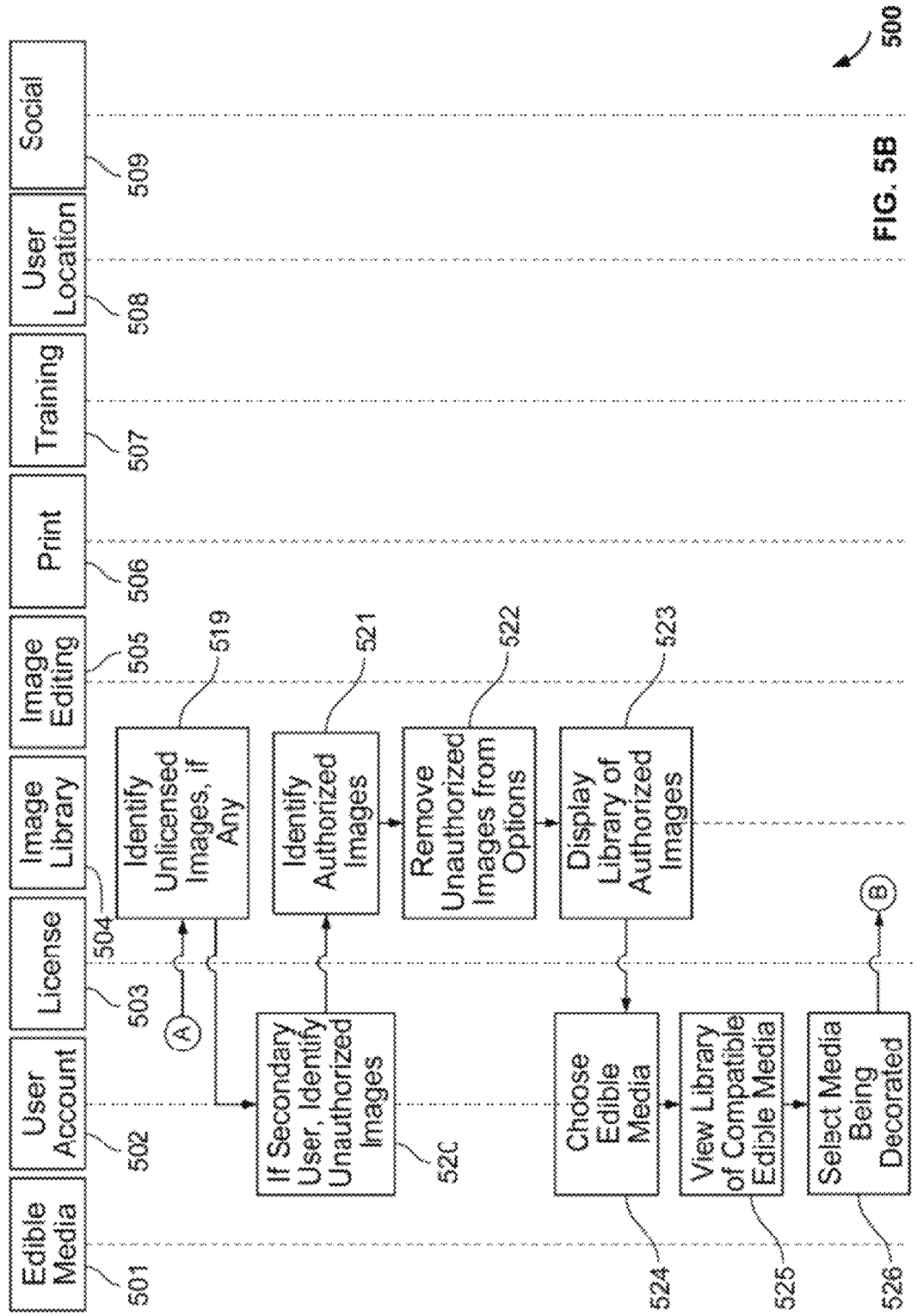

Referring now to FIG. 5B, upon determining whether licensing restrictions exist, the license module 503 informs the image library module 504 whether any of the images are restricted and/or are on an authorized list that can override restrictions, such as restrictions based on the user's location (519). The system 100 identifies whether there are any restrictions from the user account module 502 on the images that the particular user is authorized to purchase (520). For example, the particular user may be a secondary user, in which case a principal user may have previously instructed the system 100 which images the secondary user is authorized to purchase. If the particular user has restrictions on which images the user is authorized to purchase, the user account module 502 sends the list of authorized images to the image library module 504 (521).

The image library module 504 receives information on which images are available to the particular user from both the user account module 502 and the license module 503. The image library module 504 restricts access to unauthorized images from the library of image options available to the user (522). The image library module 504 displays to the user a searchable and browsable library of images available to the user for purchase or use (523). The user may search through the images, using word searching, or alternatively by browsing through image categories and viewing all images in a category.

The edible media module 501 displays a list of the edible media that may be used with the system 100 (524). The image library module 504 then displays the images that are authorized for the user to purchase and that are compatible with the edible media that the user is decorating (525). The user selects from the list of edible media the type of edible media that is being decorated (526). Examples of options for edible media include but are not limited to standard media with sizes of ½, ¼, and ⅛ sheet, or precut media of sizes 8 inch round, 3 inch round, or 2 inch round, or Designer Prints.

In some implementations, the user can choose to access the social networking module 509 to aid the user in choosing an image. The social networking module 509 can be used in a number of ways. For example, the social networking module 509 may inform the user which of the available images are the most popular overall, the most popular for certain genders or age groups, or the most popular for certain events, such as birthdays, holidays, or other events. The social networking module 509 may include user or consumer reviews of certain images. The social networking module 509 can suggest ways that images can be altered using the image editing module 505.

Figure 5C:
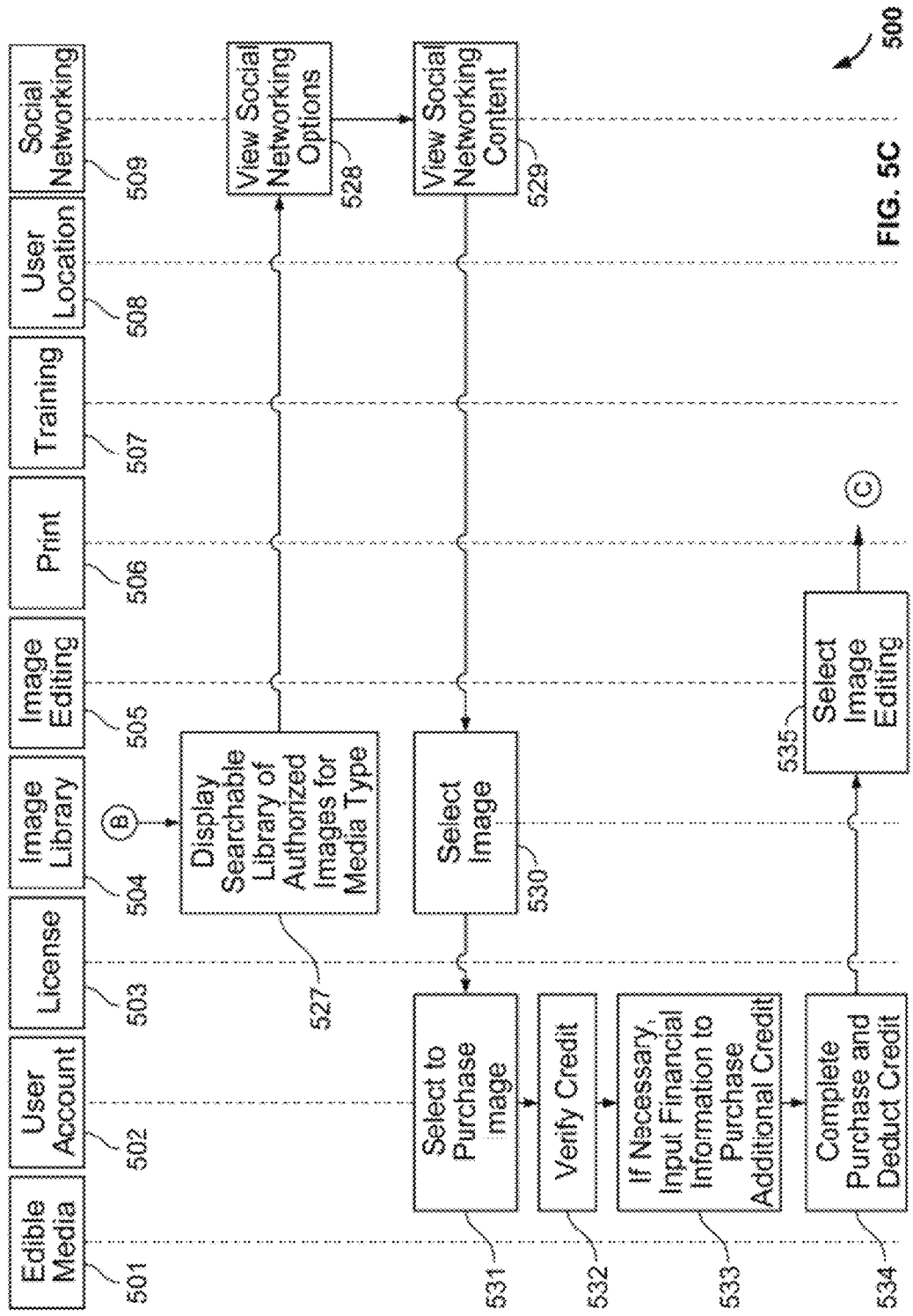

Referring now to FIG. 5C, the user can request to view one or more libraries of images. The image library module 504 displays at least one searchable library of authorized images for the user-selected media type (527). The user selects to view social networking options (528) and selects a social networking option to view the social networking content (529).

The user selects an image (530) and instructs the system that the user wishes to purchase the image (531). The user account module 502 checks to see whether the user has sufficient credit to purchase the image (532). If the user does not have sufficient credit, the user has the option of purchasing more credit (533). The user is prompted to enter financial information, such as a credit card to be charged or a bank account for direct debit. Alternatively, the user may choose to use previously-entered financial information stored in the user's account in the user account module 502. In some embodiments, the user may enter address information and request an invoice of a printing/purchasing transaction. In the event that the user has sufficient credit, the user is asked to confirm the purchase. Upon confirmation by the user, the purchase is completed and the credit is deducted from the user's account (534).

Figure 5D:
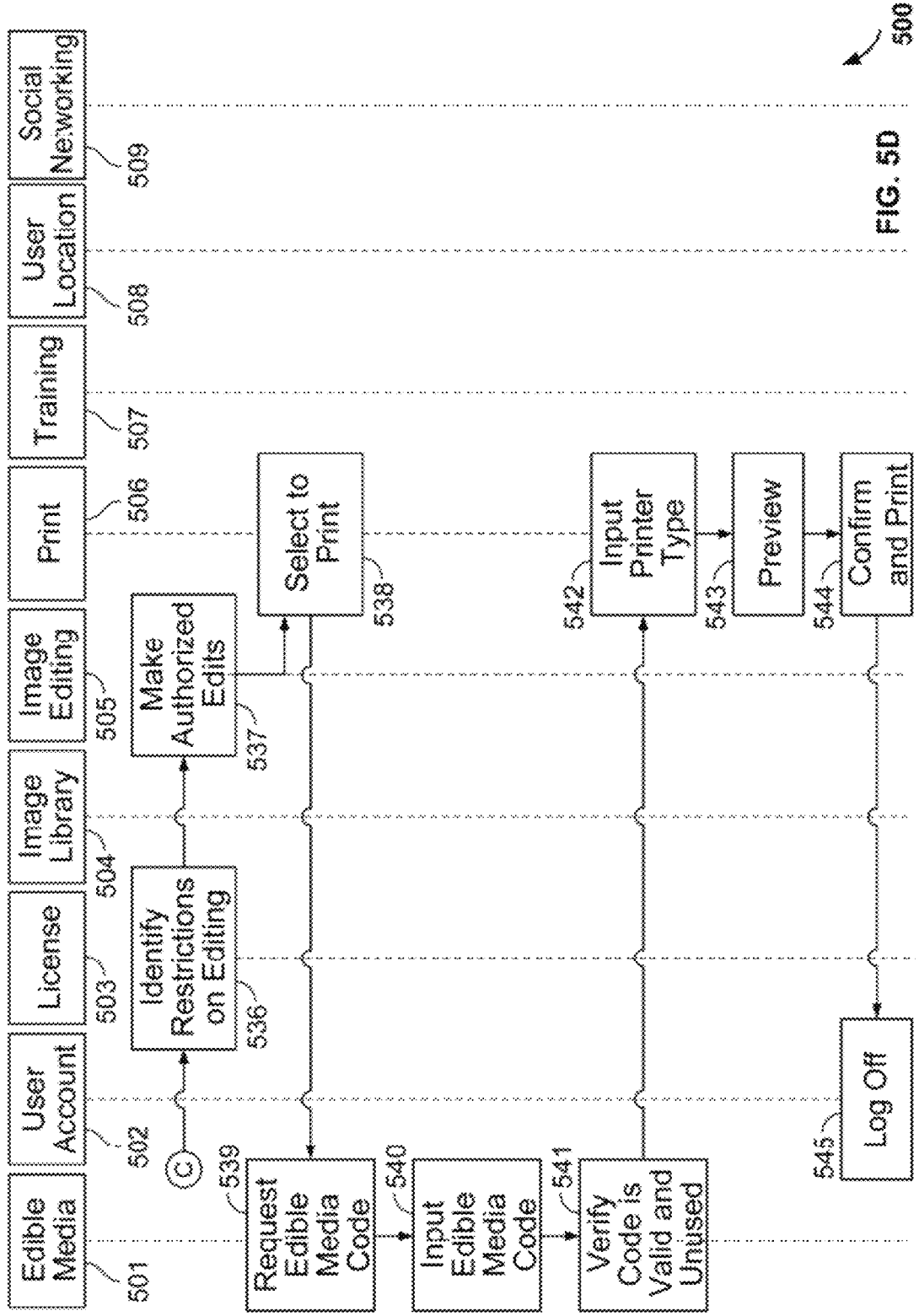

In some configurations, the user may choose to edit the purchased image (535). Editing a purchased image can be performed using the image editing module 505. Referring now to FIG. 5D, the image editing module 505 verifies with the license module 503 that the user is authorized to modify the image. The verification identifies restrictions on editing particular images (536). If a license does not prevent the image from being altered, then the user makes desired edits to the image (537). The user may be able to crop, rotate, resize, brighten, darken, re-touch, and perform other operations to the selected image. In certain embodiments, the user can save the edited image for later use or continued editing.

The user selects to print the image (538). The print module 506 prepares print data and the edible media module 501 prompts the user to enter a code (539). The user can find the code (e.g., edible media code) in a location on the edible media, or on the packaging and documentation sent to the user with the edible media.

The user inputs the edible media code (540). The edible media module 501 verifies that the inputted code is valid and that the code has not been previously used (541).

The user is prompted to input a printer type for use in printing on the edible media (542). The image library module 504 stores different versions of the same image that are compatible with different printer color profiles. The print module 506 ensures that an image compatible with the color profile of each selected printer is sent to local control device 128.

Once the printer information is input, the print module 506 provides the user the option of viewing a preview of the image printed onto the selected edible media. If the user wishes to see a preview, then the image is displayed to the user (543). If the user declines, or once the preview has been shown, then the user is asked to confirm the generation of print data. Once the user confirms the print, the print information is sent to the local control device 128, for printing onto an edible media (544). Upon completion of the printing process, the user selects to log off the system (545). Alternatively, the user can remain logged on to process additional images to print.

At any point, the user can choose to clear a design in progress or reset the design in progress to a previous state. This option provides the user an efficient mechanism to remove mistakes or simply begin a new design.

Process for Viewing Augmented Reality Content

Figure 6:
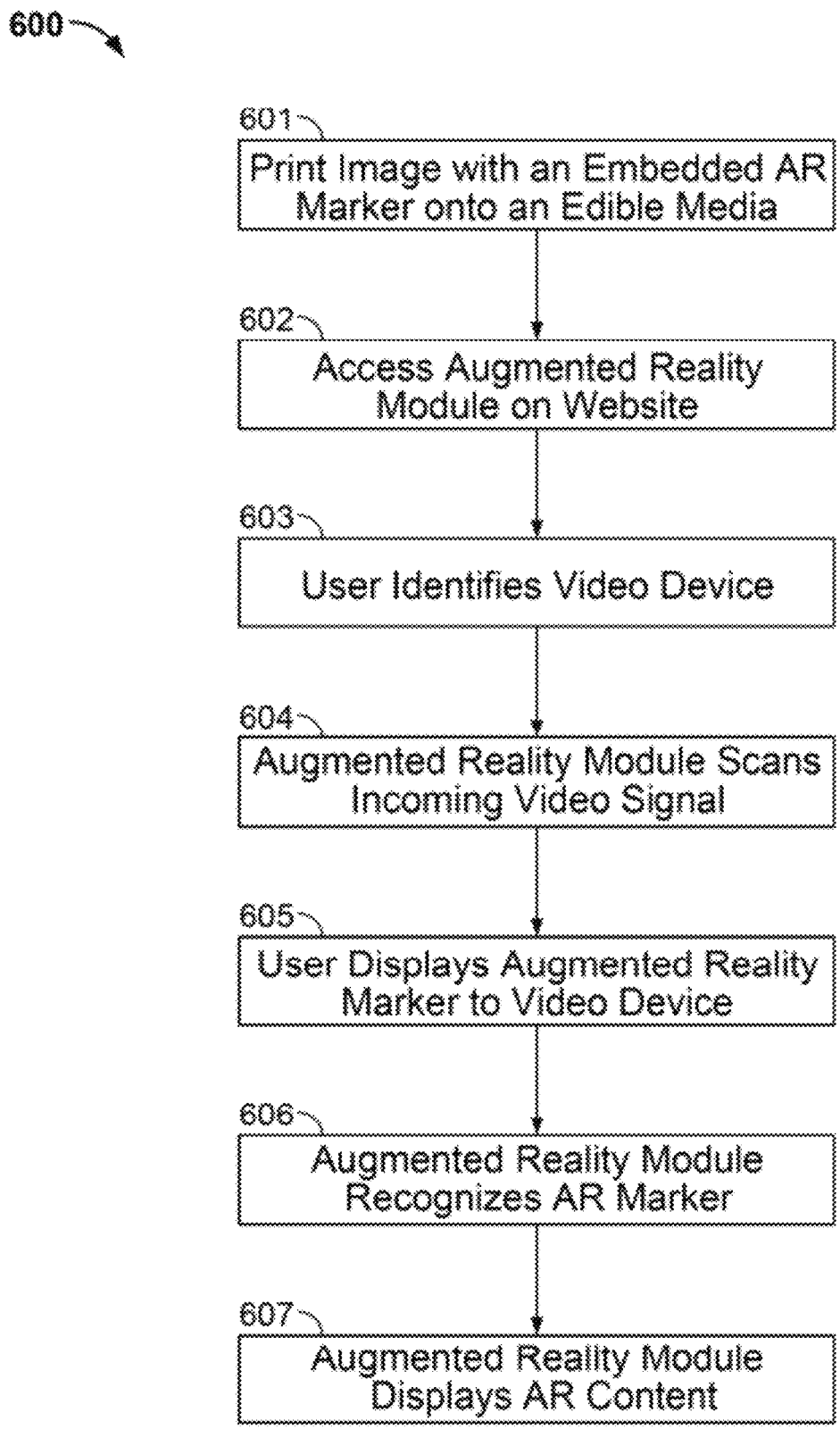
FIG. 6 is an example flow diagram of a process for displaying augmented reality content using a decorated edible medium with an augmented reality marker.

FIG. 6 is a flowchart diagram of a process 600 for viewing augmented reality content using the system. Although the process 600 is described with reference to system 100, other systems, environments, or processors can perform the steps in process 600. The system of FIG. 1 may be used to print an image containing an embedded augmented reality marker onto an edible media. The user can use the image with the embedded augmented reality marker to access augmented reality content.

The embedded augmented reality marker may be any asymmetrical geometric shape with at least two colors, of sufficiently high contrast to allow the augmented reality marker to be recognized when scanning image frames within a video signal. The augmented reality marker shape is not required to be related to the augmented reality content, but can be any geometric and asymmetrical shape.

The augmented reality content may be any content that combines reality with virtual reality. For example, the augmented reality marker may be embedded in an image of a popular cultural figure or may be the figure itself. The augmented reality content shown to the user could be a display of the cultural figure from the image singing and dancing. In another example, the augmented reality content could be the opportunity to purchase items related to the image, which are otherwise unavailable for purchase.

The system 100 prints an image with an embedded augmented reality marker onto an edible media (601). For example, the printing can be performed using the process 500 of FIG. 5. After printing the image with an embedded augmented reality marker onto the edible media, the system 100 accesses the augmented reality module 218 on the website. In certain implementations, the user enters a web address into the web browser of the local control device 128 and selects the augmented reality module 218.

The user identifies the video device (603). For example, the user instructs the augmented reality module 218 of the source of the incoming video signal. The augmented reality module 218 prompts the user to enter a specific video device location. The augmented reality module 218 may communicate with the local control device 128 to determine which video devices are installed for use on the local control device 128. In some embodiments, the augmented reality module 218 can display to the user a list of possible video devices for the user to select a particular device. The user selects a video device.

The augmented reality module 218 scans incoming video signal (604). The augmented reality module 218 scans the incoming video signal to detect the video signal for a valid augmented reality marker.

The user displays the edible media containing the augmented reality marker to the video device (605). The video device thus captures video footage of the augmented reality marker and sends the video signal to the augmented reality module 218 on the system controller.

The augmented reality module 218 recognizes the augmented reality marker (606). The augmented reality module 218 can continually or periodically scan incoming video data to detect other valid augmented reality markers. When the user displays an edible media with an augmented reality marker printed upon the media to the video device, the augmented reality module 218 recognizes the marker in the incoming video signal. The augmented reality module 218 responds to the user by displaying augmented reality content (607). In an illustrative embodiment, augmented reality content transmitted over network 118 is displayed on the local control device 128.

Process for Decorating Edible Media with Licensed Digital Image

Figure 7:
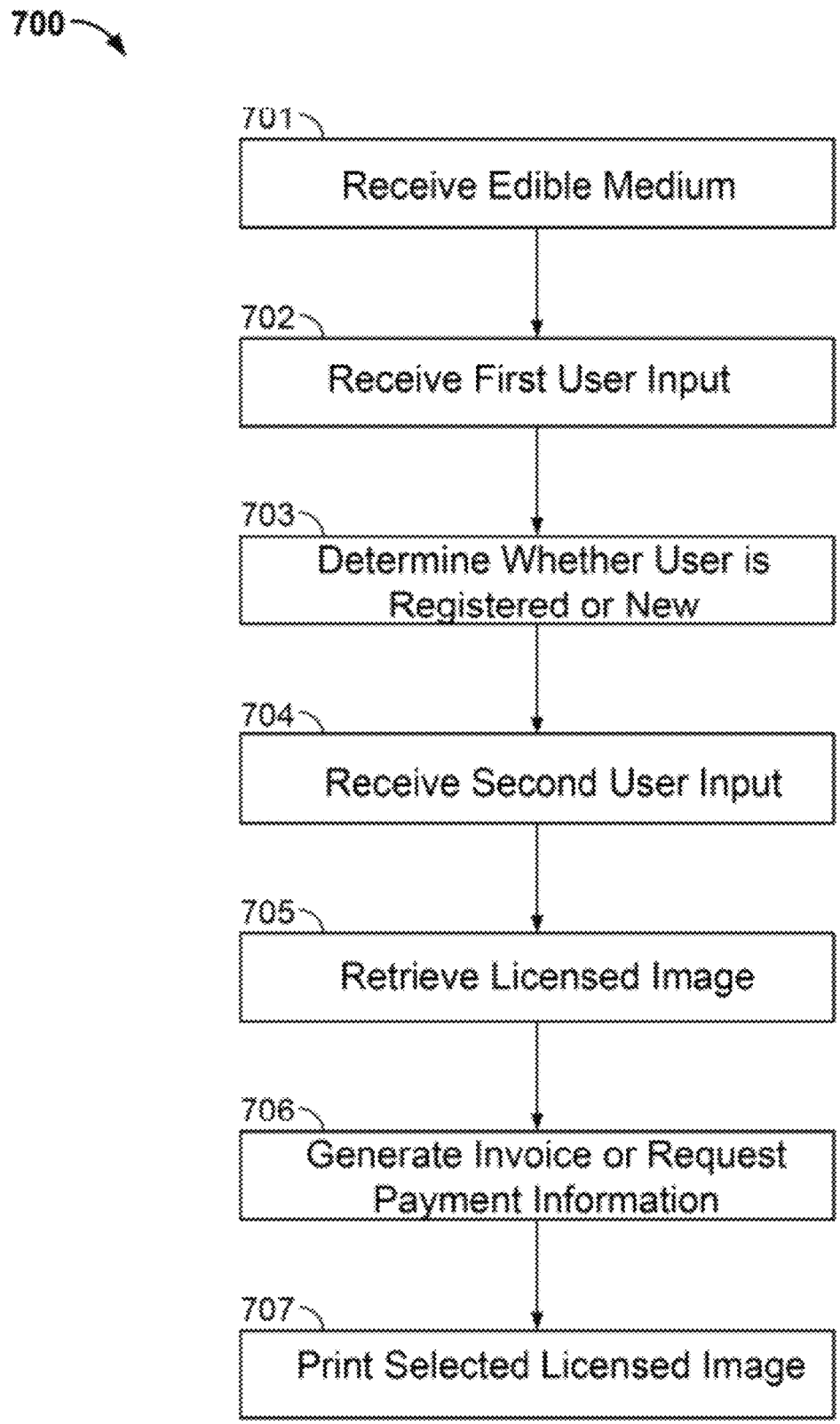
FIG. 7 is a flow diagram of a process for decorating edible media with licensed digital images.

FIG. 7 is a flow diagram of a process 700 for decorating edible media with licensed digital images. The process 700 can be performed by system 100, for example, in the online environment in system 100.

The system 100 includes a printing system connected to the Internet which receives an edible medium (701). The edible medium may be selected by the user and placed within the system 100, for example.

The system 100 receives a first user input identifying a user of the system (702). For example, a user logs into the system using a username and password. The system 100 determines whether the user is a registered user or a new user (703).

The system 100 receives a second user input selecting at least one licensed image (704). For example, a user enters a request to select a copyrighted cartoon character for printing on a cake top. In some configurations, the system 100 can limit the available licensed images shown to the user according to the user's geographic location and/or authorization list. The system 100 retrieves the at least one licensed image from an Internet repository (705). Upon retrieving the licensed image of the copyrighted cartoon character, the system 100 generates an invoice for the user if the user is a registered user. If the user is an unregistered user or a new user, the system 100 requests payment information to ensure the licensed image is purchased before printing occurs (706). Upon verifying payment, the system 100 prints the selected licensed image onto the selected edible medium. In some implementations, the system 100 enables the user to digitally edit the selected image prior to printing the selected image onto the edible medium.

Process for Printing Selected Image in Software Web Browser

Figure 8A:
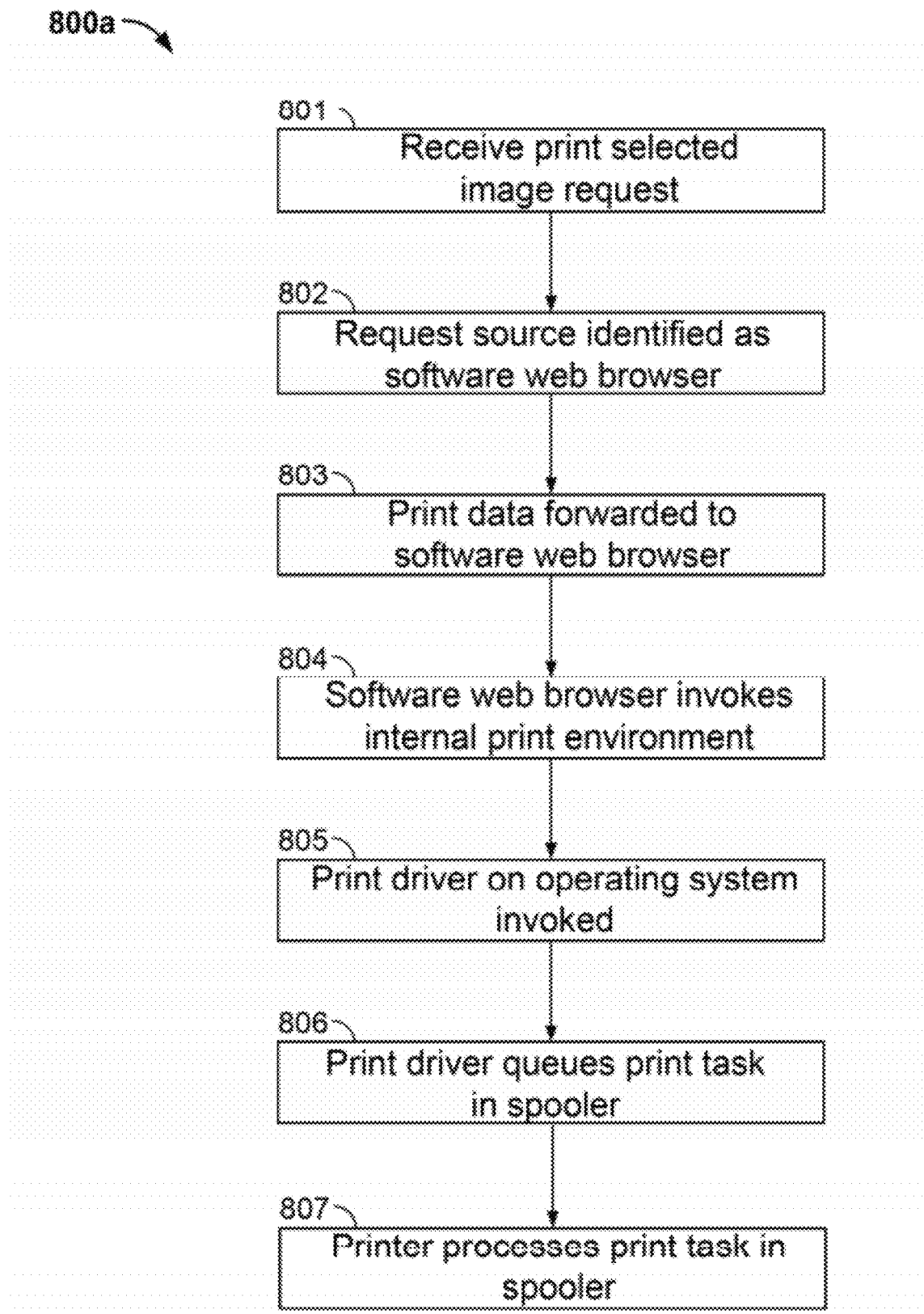
FIG. 8 is a flow diagram of a process for printing edible media that bypasses operating system print drivers.

FIG. 8A is a flow diagram of a process 800a for printing a selected image in a software web browser. The process 800a can be performed by system 100, for example, in the online environment in system 100.

The system 100 receives a print selected image request (801). Either licensed or unlicensed images can be printed using the process 800.

The print module 212 checks the source of the incoming print request (802). In this example, the source is identified as the software web browser. In certain embodiments, the print module 212 checks the source by evaluating identifier packets within a data stream. In other configurations, the print module 212 recognizes network addresses to identify source applications for a particular data packet.

Upon identifying the source of the print request, print module 212 forwards print data over the corresponding secure connection. In this example, print data is forwarded over the secure connection between the software web browser on the local control device 128 and the central control device 132 in system 100 (803).

After the software web browser receives print data from print module 212 over a secure connection, the software web browser invokes an internal print environment (804).

Based on the software web browser's internal print environment, a particular print driver installed within the operating system on local control device 128 is invoked by the software web browser (805). In various implementations, the print driver is implemented by a vendor or manufacturer of the printer, in some cases using proprietary or not publicly documented code.

The invoked print driver generates a byte stream compatible with the target printer 134, and queues the print task in the operating system's printer spooler (806). For example, at 600 vertical dpi (dots per inch), 600 horizontal dpi, 8.5 by 11 inches, 4 colors, and 8 bits per color, a 134 Megabyte raw byte stream is created. In certain embodiments, the software web browser's internal print service and the print driver installed on the operating system are based on proprietary or non-documented code. In other configurations, certain elements of the software web browser's internal print service or the print driver installed on the operating system provide an open or documented interface, allowing print data propagated from print module 212 to be modified prior to being delivered to the operating system printer spooler.

The operating system's printer spooler queues print tasks for the particular printer hardware. The operating system can queue multiple print jobs in the spooler while the printer executes tasks on the queue at a throughput dependent on printing configuration and hardware technology. The printer eventually processes the print corresponding to the requested image (807). In certain implementations, tasks within the spooler can be rearranged such that the print request corresponding to (801) may be processed out of first in first out order.

Process for Printing Selected Image in Parallel Browser Module

Figure 8B:
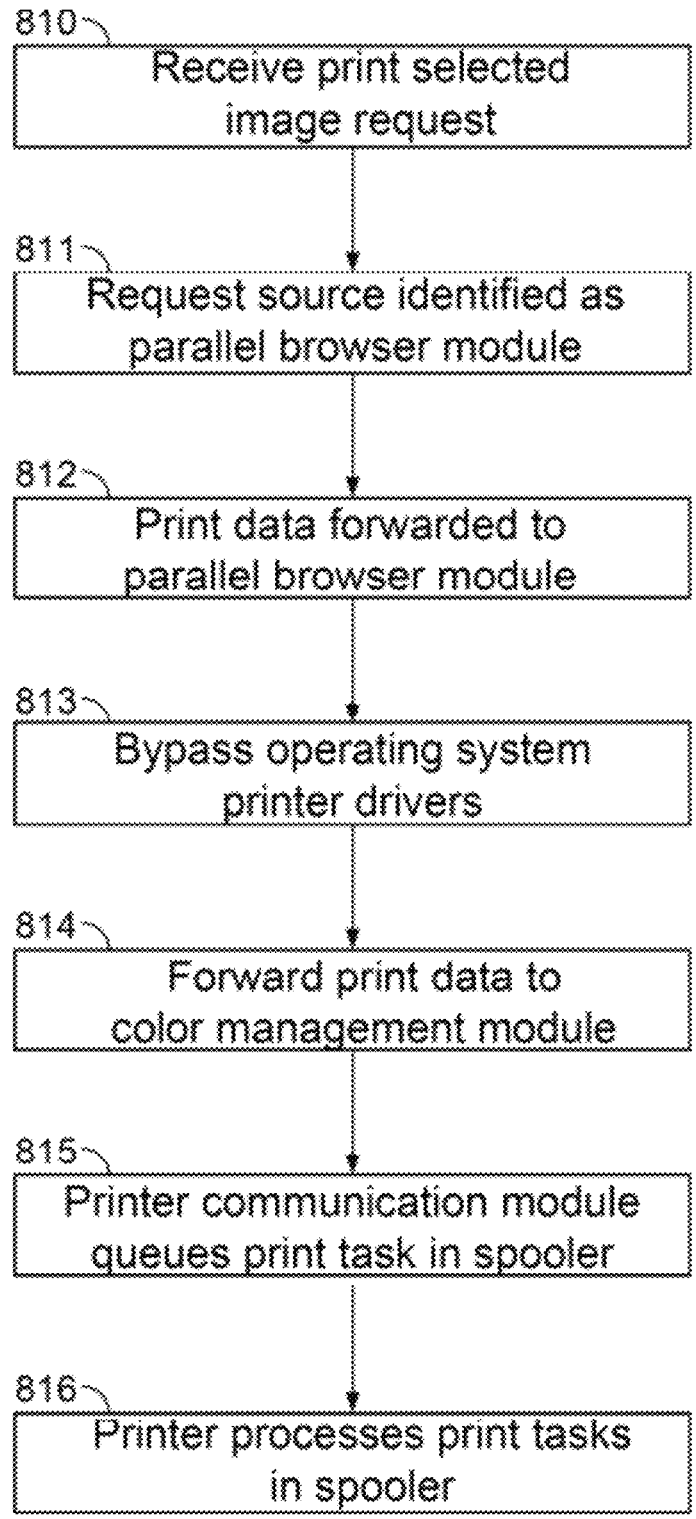

FIG. 8B is a flow diagram of a process 800b for printing a selected image in parallel browser module. The process 800b can be performed by system 100, for example, in the online environment in system 100.

The system 100 receives a print selected image request (810). Either licensed or unlicensed images can be printed using the process 800b.

The print module 212 checks the source of the incoming print request. In this example, the source is identified as the parallel browser module 244 (811). In certain embodiments, the print module 212 checks the source by evaluating identifier packets within a data stream. In other configurations, the print module 212 recognizes network addresses to identify source applications for a particular data packet.

Upon identifying the source of the print request, print module 212 forwards print data over the corresponding secure connection. In this example, the print module 212 forwards print data over the secure connection between the parallel browser module 244 on the local control device 128 and the central control device 132 in system 100 (812).

After the parallel browser module 244 receives print data from print module 212 over a secure connection, the parallel browser module 244 bypasses the operating system's printer drivers (813) and forwards print data to the color management module 246 (814). The color management module 246 applies color correction by converting from the color profile of the image to the color profile of the particular printing device in order to maintain color consistency. In certain implementations, color management module 246 also provides color space conversion, such as between CMYK and RGB, as necessary, and converts to the bit depth required by the printer, such as 8 bits or 16 bits. In some embodiments, color management module 246 also performs linearization and half tone control to improve image reproduction. In an illustrative embodiment, color management module 246 does not entirely rely on operating system color management functions, resulting in an installation independent framework for color management. Color management functions may be implemented in an open source implementation, such as the Little Color Management System (LCMS), or in a proprietary implementation, such as EFI's Colorproof XF software.

Color corrected print data is propagated to printer communication module 248. The printer communication module 248 creates a byte stream compatible with the intended printer, and queues the print task in the operating system's printer spooler (815).

The operating system's printer spooler queues print tasks for particular printer hardware to print. The printer eventually processes the print corresponding to the requested image (816).

Process for Decorating Edible Medium Using Parallel Browser Module

FIGS. 9A-9D depict an example swim lane diagram of a process 900 for printing a decoration on an edible medium using the parallel browser module 244 shown in FIG. 2B. In other configurations, the process 900 for printing a decoration on an edible medium using the parallel browser module 244 may include fewer or more events than shown in FIGS. 9A-9D. The process 900 can be performed by system 100, for example, with central control device 132 and local control device 128 connected via network 118. Although the process 900 is described with reference to system 100, other systems, environments, or processors can perform the steps in process 900.

Figure 9A:
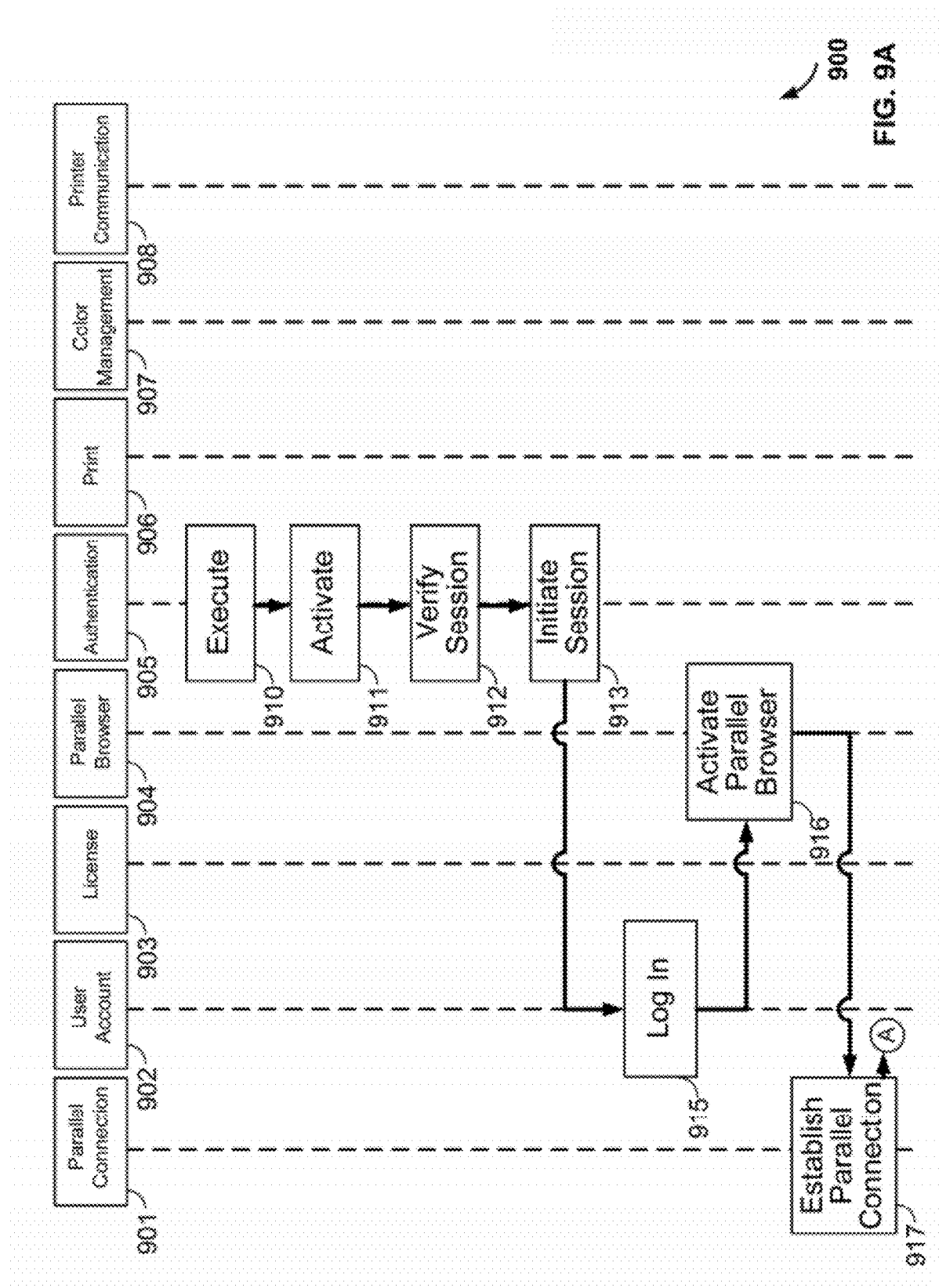

Referring now to FIG. 9A, a central control device 132 and local control device 128 shown in system 100 includes a number of modules 901-909. A parallel connection module 901 is a software module that establishes a secondary connection between central control device 132 and local control device 128. This secondary connection is in parallel with a connection between a software web browser residing on local control device 128 and the central control device 132.

A user account module 902 is a software module that includes profiles of information regarding particular users. The user account module 902 allows or disallows users to login to user accounts using a username and a password. The user account module 902 also stores financial information and address information about the user and processes financial transactions. Following successful login, central control device 132 provides local control device 128 with user identification data. In some embodiments, parallel web browser module 244 may receive user identification data directly from central control device 132. In other embodiments, parallel web browser module 244 may receive user identification data through the software web browser.

In certain embodiments, Parallel web browser module 244 receives user identification data through the associated network address identification information, and following reception of user identification data, parallel web browser module 244 remains independently operable from the software web browser during the duration of an active socket connection between parallel web browser module 244 and the software web browser.

In an illustrative embodiment, a valid user login session for parallel web browser module 244 is determined by the inclusion of unexpired user identification data, such as a unique token provided by central control device 132, in communications between the central control device 132 and local control device 128.

A license module 903 is a software module that includes information about system licensing to certain images. System licensing information may include data identifying where particular images can be sold and if and/or how the images may be edited.

A parallel browser module 904 is a software module that provides a GUI to software modules shown in FIG. 2A, such as the image library module 202, which allows the user to upload images from local image sources to use in the system, and the image editing module 204, which allows a user to edit images. An authentication module 905 is a software module that verifies successful login to the user account module 902 before permitting parallel browser module 904 to establish a connection. A print module 906 is a software module that initiates the printing of selected images onto edible media using a specific color profile for a particular printer. A color management module 907 is a software module that applies color correction algorithms to images provided by print module 906. A printer communication module 908 is a software module that encodes color corrected output into a byte stream compatible with a particular printer.

Prior to process 900, the user utilizes a software web browser to log into a secure site, establish an account, and download an application installer. The application installer creates modules including but not limited to the parallel browser module 904, authentication module 905, color management module 907, and printer communication module 908 on the local control device 128.

Process 900 begins with execution of the authentication module 905 (910). Execution can occur manually through the GUI 127, or automatically through startup events during operating system bootup. Following execution, authentication module 905 enters an inactive state, and is activated manually via GUI 127, or automatically using a threshold condition such as elapsed time (911). Upon activation, authentication module 905 verifies if a secure session with user account module 902 through a software web browser has already been established (912). Following detection of no existing secure session with user account module 902, authentication module 905 initiates an instance of a software web browser residing on local control device 128. Authentication module 905 causes the new instance of the software web browser to navigate to an Internet website providing access to the user account module 902, the website displaying a prompt for user login credentials (915).

Following successful login, the parallel browser module is activated (916). In certain implementations, parallel browser module 904 can be activated from a navigation option shown within the software web browser used for login procedures. In other embodiments, parallel browser module 904 can be activated externally from the software web browser, such as an icon in GUI 127.

In each method of activating parallel browser module 904, parallel connection module 901 first establishes a second connection in parallel with the secure connection between the software web browser on local control device 128 and the website server on central control device 132 (917). In certain configurations, the second parallel connection is automatically terminated when the first secure connection is terminated. In other implementations, the second connection established by parallel connection module 901 persists after the first secure connection module is terminated.

Figure 9B:
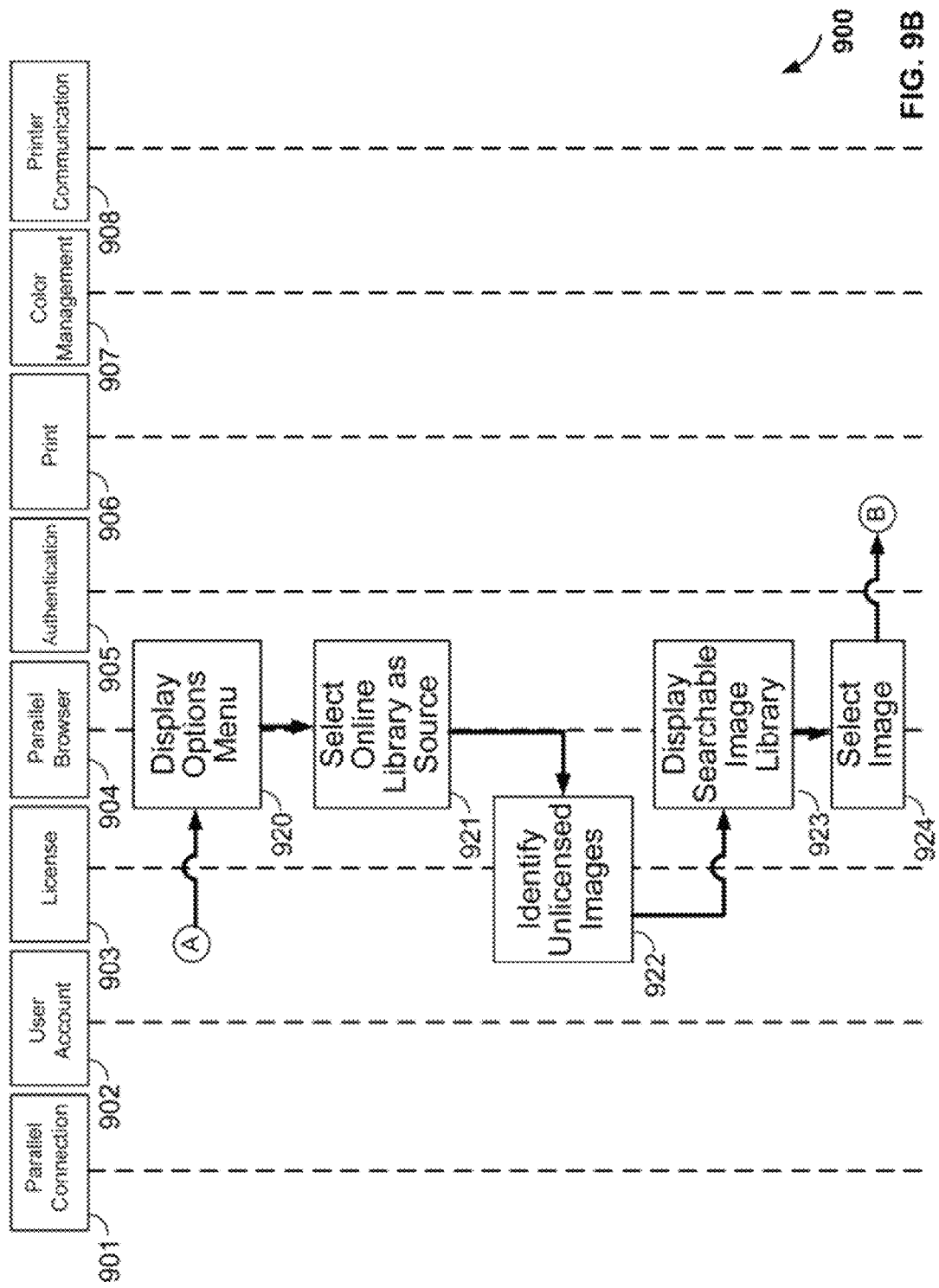

Referring now to FIG. 9B, following establishment of a second connection by parallel connection module 901, parallel browser module 904 displays a menu containing a number of navigation options (920). In another embodiment, for instance, when parallel browser module 904 interacts with software modules that the software web browser is not capable of interaction with, parallel browser module 904 displays more navigation options than displayed in the software web browser, such as color correction, page layout, and printer configuration options. In other configurations, independent of if parallel browser module 904 is communicable with more software modules than the software web browser, parallel browser module 904 displays fewer navigation options. In this example, parallel browser module 904 displays options relating to designing edible media, and does not display options available in the software web browser such as subscription information, account management, and customer alerts.

After parallel browser module 904 displays navigation options, the user can choose an image to use to decorate an edible media. The user may choose images from a local image source, an online image source, or the image library in the image library module 202 of FIG. 2A. In this example, the user selects the image library as the image source (921).

The system 100 can perform operations not explicitly shown in FIG. 9A-9D. As one example, the system 100 can access the user location module 214, shown in FIG. 2A, and determine the geographic location of the user. After the user's geographic location is determined, the system 100 can access the license module 903, and determine whether any licensing restrictions exist for images in the user's geographic location. The system 100 narrows the number of images provided to the user in parallel browser module 904 based on licensing restrictions (922).

Parallel browser module 904 displays to the user a searchable and browsable library of images available to the user for purchase or use (923). The user may search through the images, using word searching, or alternatively by browsing through image categories and viewing all images in a category. While not shown in this example, in some embodiments, the user can choose to access the social networking module 216, shown in FIG. 2A, to aid the user in choosing an image.

The user selects an image and instructs the system that the user wishes to purchase the image (924). In some configurations, the user account module 902 prompts the user through parallel browser module 904 to enter financial information, such as a credit card to be charged or a bank account for direct debit. Alternatively, as shown in this example, the user account module 902 operates in the background to utilize payment data associated with the unique username and password used for establishing the first secure connection between the software web browser and web server, without interrupting the process of designing the edible media.

Figure 9C:
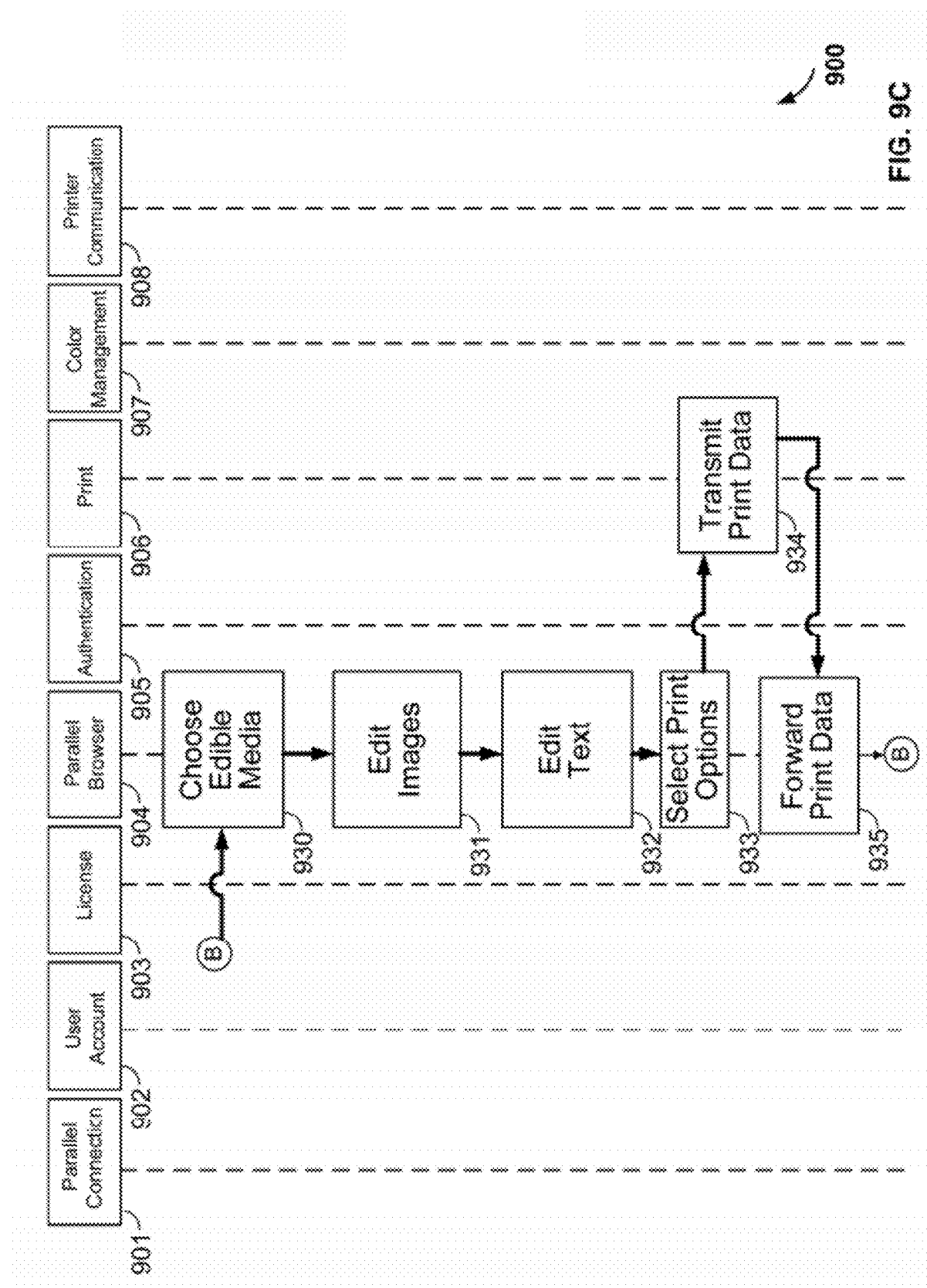

Referring now to FIG. 9C, following image selection, the user selects an edible media type (930). Examples of options for edible media include but are not limited to standard media with sizes of ½, ¼, and ⅛ sheet, or precut media of sizes 8 inch round, 3 inch round, or 2 inch round.

In some implementations, the user may choose to edit the purchased image from within the parallel browser module 904 (931). The user may crop, rotate, resize, stretch to width, stretch to height, brighten, darken, re-touch, and perform other operations to the selected image. The parallel browser module 904 also permits the user to undo operations, navigate back to a previous options interface, or navigate to the next options interface.

In some embodiments, the user may choose to add text to the purchased image (932). In one option, the user can select from a list of phrases, such as "Congratulations," "Bon Voyage," or "Happy Birthday." In another option, the user can type a custom phrase. The user may be able to bend a phrase upwards or downwards to varying degrees of curvature, straighten a phrase, change font type, font color, and select left, right, or centered justification. Furthermore, the user may be able to crop, rotate, resize, stretch to width, stretch to height, brighten, darken, re-touch, and perform other operations to the text independently or in conjunction with the selected image. The parallel browser module 904 also permits the user to undo operations, navigate back to a previous options interface, or navigate to the next options interface.

The user selects print options after the parallel browser module 904 prompts the user for print options, such as number of prints for the particular image (933). Other examples include but are not limited to print orientation, image tiling, and providing grayscale or color options for a given image or print region. Parallel browser module 904 passes on print options to print module 906. In some cases, the user is prompted to input a printer type for use in printing on the edible media.

The image library module 202, shown in FIG. 2A, stores different versions of the same image that are compatible with different printer color profiles. The print module 906 ensures that an image compatible with the color profile of each selected printer is transmitted to the local control device 128 for printing (934).

Upon receiving print data from print module 906 over the secure second connection between local control device 128 and central control device 132, parallel browser module 904 forwards print data to color management module 907 (935).

Referring now to FIG. 9D, color management module 907 applies color correction by converting from the color profile of the image to the color profile of the particular printing device in order to maintain color consistency across devices (940). Color management module 907 provides color correction capabilities to each graphical text, photo, and artwork element, flattening multiple layers into a single bitmap following color correction. Color management module 907 also provides any color space conversion, such as between CMYK and RGB, as necessary (941), and converts to the bit depth compatible with the printer, such as 8 bits or 16 bits (942). Color management module 907 also performs linearization and half tone control to further improve image reproduction (943).

Printer communication module 908 bypasses printer drivers installed in the operating system (944), and instead directly encodes a printer compatible byte stream and appends the byte stream to the printer spooler in the operating system (945). The operating system printer spooler proceeds to execute the print tasks in the queue, resulting in an edible media being printed. The printer communication module 908, together with parallel connection module 901, provides a user rights controlled low-level print management process for the edible media decorating system 100.

At any point in the process of FIG. 9A-D, the user can choose to clear a design in progress or reset the design in progress to a previous state. This option provides the user an efficient mechanism to remove mistakes or simply begin a new design.

Example User Interface Functionality

Any number of User Interface elements can be provided to a user of system 100. The User Interface elements may include multiple screens presented as web pages. As is typical, the GUI 127 in system 100 provides a home screen and various other screens available for user navigation. One example home screen may include user-selectable controls to perform a quick copy of an image, upload or print a photograph, select options such as frames or artwork, generate an order, create a design, and modify system settings.

The quick copy control can be selected by a user to initiate a scanner for uploading an image and quickly copying the image to a system repository. The quick copy control can provide instructions onscreen to the user for accomplishing the quick copy. The instructions may include text, graphics, and/or video content. The instructions can be provided in a user-selectable language.

The upload or print a photograph control can be selected to upload and print a photograph. The photograph control can instruct a user to identify a media source (e.g., scanner, CD, USB, Flash card, web camera, etc.). The photograph control can request that the user verify media settings and upon verification, the control can upload the photograph. The user can choose to edit the uploaded photograph and print the uploaded photograph with applied editing.

Options such as selecting frames or artwork are selected by the user to invoke the system to configure frames and/or artwork for printing. The configuration options can, for example, include verifying original media settings, and selecting a frame or artwork item. The system 100 can retrieve the frame and/or artwork and allow the user to perform edits. The users can additionally edit a particular edible media (e.g., topping) before printing the frame and/or artwork on the edible media.

The order form control can be used to generate an order. For example, users can choose to generate and complete a number of standard order forms. Example order forms include a licensed artwork order form, a licensed frames order form, a general order form, a customer cake order form, and a customer deli order form. In some configurations, users can print an order form and manually request an edible media print or product.

Other controls can be provided to present other information about the system 100 and or inventory available to the system 100. For example, controls can be provided to present inventory management items such as quarterly purchase reports, complete purchase history reports, on-hand inventory reports, and the like.

Another example control can include options or screens for modifying system settings including default color and default fonts. Users may also wish to customize a user account associated with the websites hosted on system 100. For example, a user may wish to change a color scheme or font size when logging into one or more websites hosted on system 100.

Another example control can provide maintenance checklists and tasks for an administrative user. The maintenance controls may only be visible to the administrative user upon login. Other standard system users may not view or access the maintenance controls and/or menus.

In some implementations, the User Interface can provide links to copyright release forms, copyright statement forms or other legal documents. Users can choose to preview and/or print the legal documents on demand.

Example User Interface Tree

Figure 10:
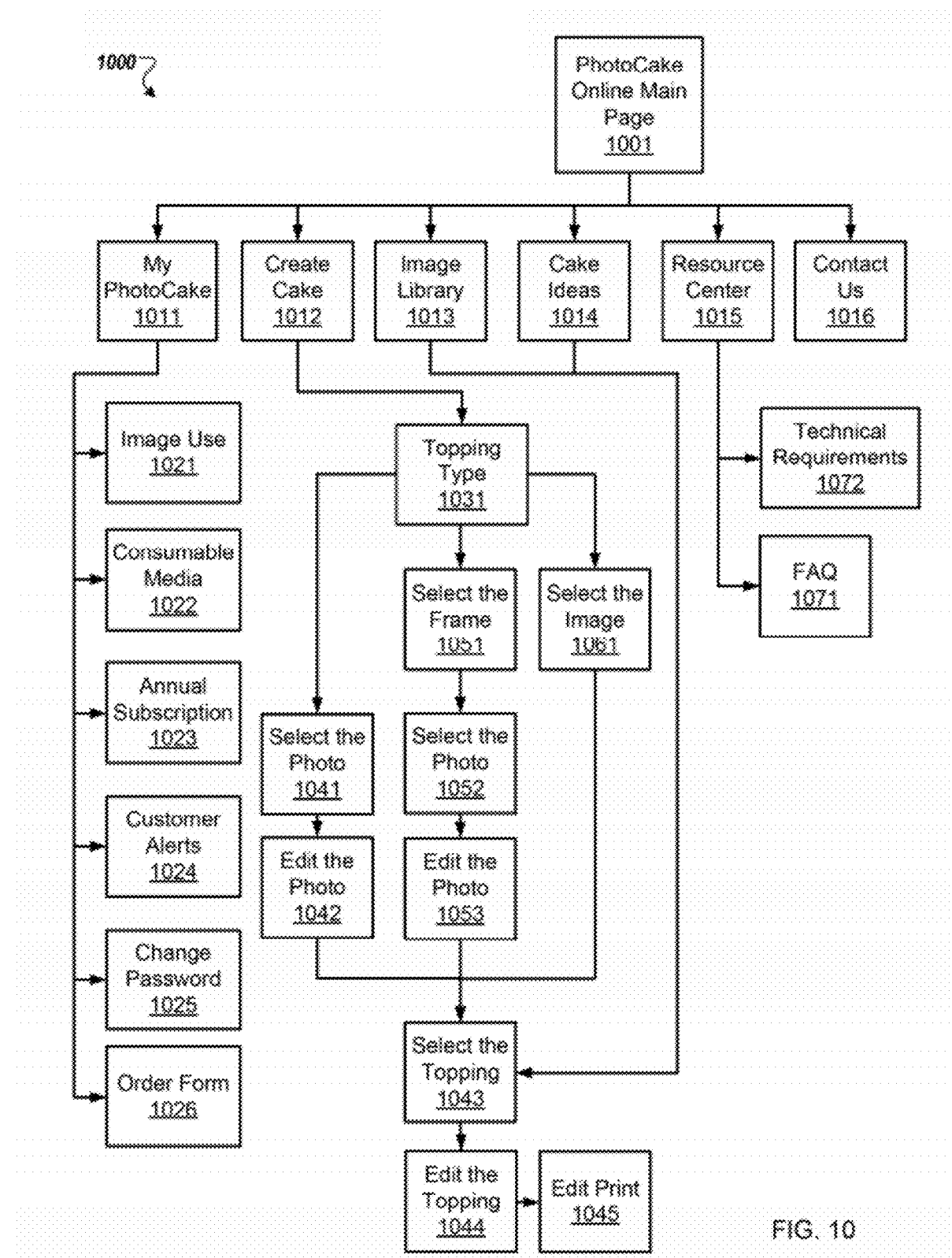
FIG. 10 depicts an example User Interface tree for a website in a system for decorating edible media.

FIG. 10 depicts an example User Interface Tree 1000 for a website in a system for decorating edible media, with each node representing a webpage. The hierarchy of the User Interface Tree 1000 shown in FIG. 10 is merely exemplary, with nodes capable of being re-positioned at different hierarchies, divided into separate nodes, or merged into a single node. The labels for nodes are also exemplary of subject matter contained within each webpage. All user interfaces in the User Interface Tree 1000 can be displayed in the software web browser on local control device 128, or certain user interfaces in the User Interface Tree 1000 can be displayed in the software web browser, and other user interfaces in the User Interface Tree 1000 can be displayed in a software environment external to the software web browser, such as the parallel browser module 244.

Figure 11A:
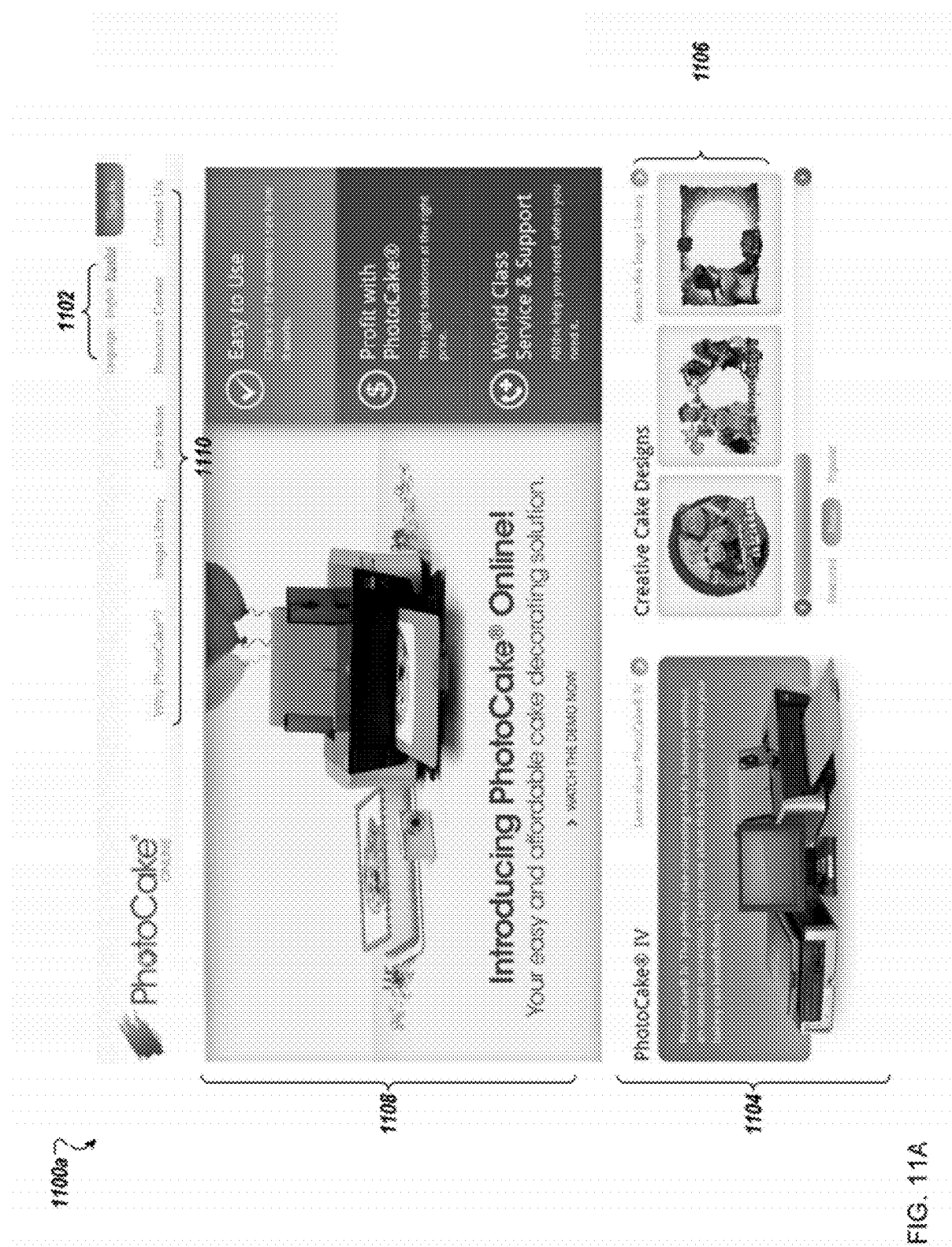
FIGS. 11-32 depict example webpages from a system for decorating edible media.

FIG. 11A depicts an example User Interface 1100a, corresponding to node 1001 of User Interface Tree 1000, for the main page of the system for decorating edible media. FIG. 11A contains a User Interface region 1102 to select between display languages. In certain embodiments, the languages can be selected from a drop down list. In other configurations, the central control device 132 can automatically detect the localization settings of local control device 128 accessing the website, and display a corresponding native language.

FIG. 11A contains a User Interface region 1104 that provides additional details on the various components of the system, such as the printer, scanner, display device, and local control device.

FIG. 11A depicts connectivity to the image library module 202 through User Interface region 1106. A subset of selected images, such as featured, new, or popular images are selected from the overall image library for preview on the User Interface 1100a. A scroll bar is included to enable viewing of images beyond the quantity that can concurrently be shown on User Interface 1100a.

FIG. 11A contains a User Interface region 1108 that provides information on the capabilities and services of the system for decorating edible media, such as a video tutorial of system operation. User Interface 1100a provides a region 1110 with a plurality of navigation choices to other webpages including a Why PhotoCake webpage, a webpage relating to an overview of services of the system for decorating edible media, an Image Library webpage, a webpage for browsing contents of the image library module 202, a Cake Ideas webpage, a webpage relating to examples of outputs of the system for decorating edible media, a Resource Center webpage, a webpage relating to technical support and customer service issues, and a Contact Us webpage, a webpage relating to modes of communication for reaching providers of the services of the system for decorating edible media.

Figure 11B:
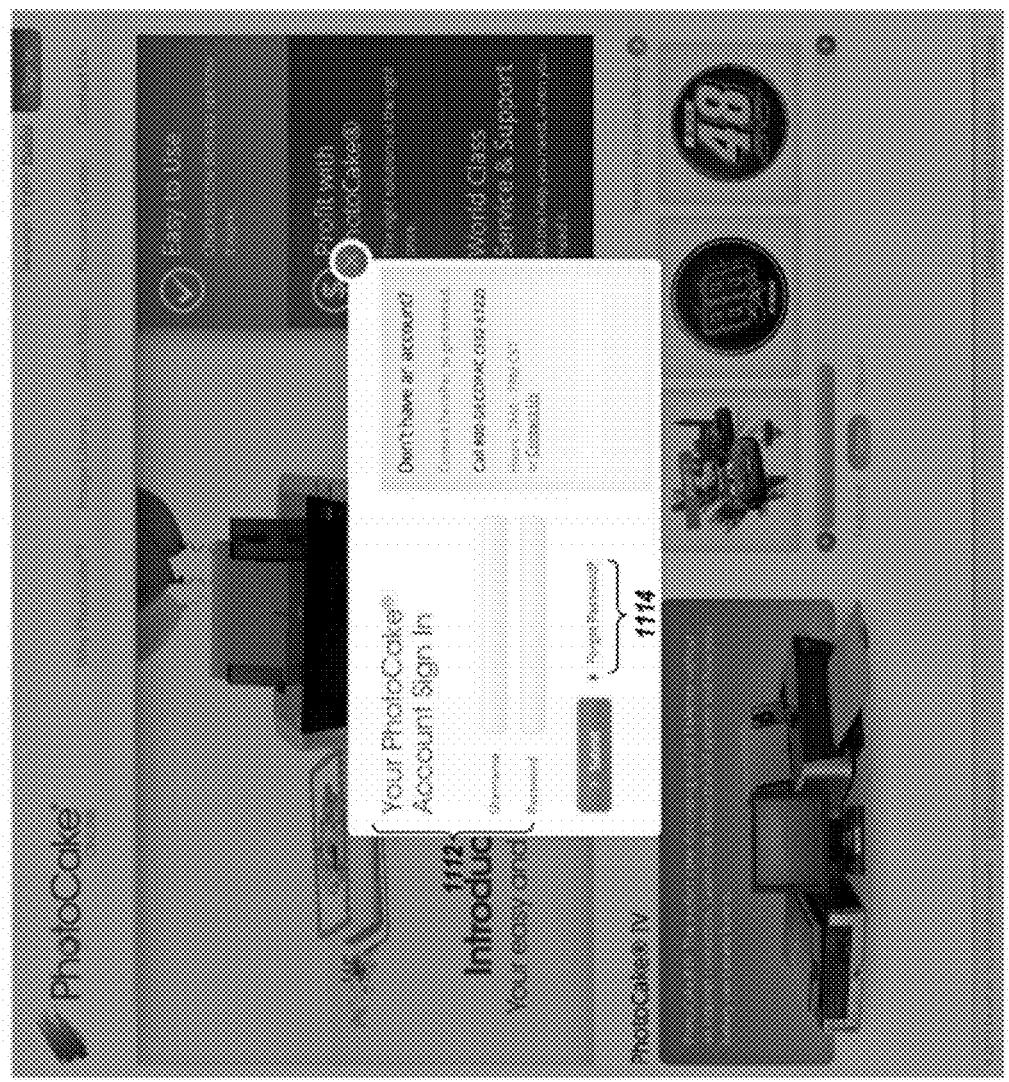

FIG. 11B depicts an example User Interface 1100b, corresponding to a different state of node 1001 of User Interface Tree 1000, for the main page of the system for decorating edible media.

FIG. 11B additionally contains a User Interface region 1112 that prompts for user authentication through a username/password entry region. A region for providing information on account creation is also provided. In certain implementations, the authentication prompt can be a pop-up window overlaid above User Interface 1100b as shown in FIG. 11B. In other embodiments, the authentication prompt can be embedded within the User Interface 1100b.

FIG. 11B may contain a User Interface region 1114 that permits the user, in the event that the user forgets login credentials, to invoke a prompt to input identification information, such as the answer to a preselected security question, a PIN, or an e-mail address, to authenticate the user's request either to reset login credentials, or request secure delivery of login credentials.

Figure 12:
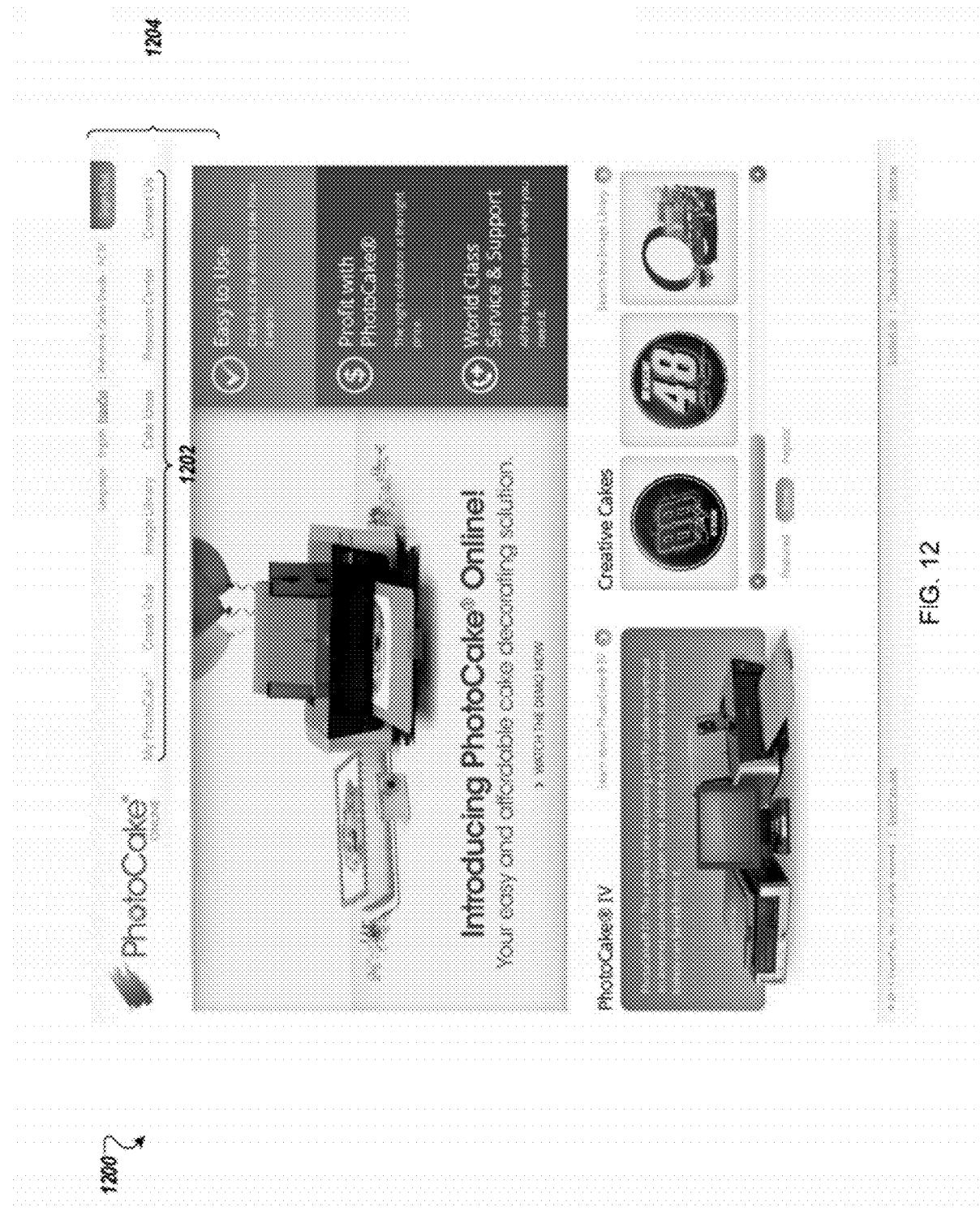

FIG. 12 depicts an example User Interface 1200, corresponding to a state of node 1001 of User Interface Tree 1000 after successful login, with a region 1202 showing an updated plurality of navigation choices to other webpages. FIG. 12 also depicts a User Interface region 1204 for signing out of a user account. In certain configurations, after successful login, the User Interface regions relating to login, including but not limited to regions 1112 and 1114 shown in FIG. 11B are removed, and region 1110 is updated with a new plurality of navigation options. For example, the Why PhotoCake webpage can be substituted with a MyPhotoCake webpage, a webpage relating to account management, and the Create Cake webpage can be added, a webpage relating to designing decorative edible media for printing.

Figure 13:

FIG. 13 depicts an example User Interface 1300, corresponding to node 1011 of User Interface Tree 1000, for the MyPhotoCake webpage. FIG. 13 provides a region 1302 with a plurality of navigation choices to other webpages. FIG. 13 also depicts a User Interface region 1304 for signing out of a user account. FIG. 13 includes a summary of account information region 1306, which displays information such as account number, expiration, and contact information. FIG. 13 depicts connectivity to the image library module 202 through image library subset display region 1308, which displays a subset of selected images, such as featured, new, or popular images, from the overall image library. An image library search region 1310 is included, allowing user input of keyword or image number to retrieve images from image library module 202. A favorite image library subset display region 1312 provides a thumbnail view of a subset of photos classified as favorites by the logged in user. An alert timeline region 1314 displays a subset of alerts, including version updates, and image credit availability information. A credit and media count availability of region 1316 displays the number of licensed image credits available, and the number of print media available.

FIG. 13 includes an account management region 1318 which contains a plurality of navigation choices to other webpages relating to account management, including Image Use, a webpage displaying historical statistics on images printed on edible media, Consumable Media, a webpage displaying historical statistics on edible media usage, Annual Subscription, a webpage displaying subscription information, Customer Alerts, a webpage relating to his play of alerts, Change Password, a webpage relating to password management, and Order Form, a webpage relating to purchasing of edible media.

Figure 14:

FIG. 14 depicts an example User Interface 1400, corresponding to node 1021 of User Interface Tree 1000, for the Image Use webpage. FIG. 14 provides a region 1402 with a plurality of navigation choices to other webpages. FIG. 14 also depicts a User Interface region 1404 for signing out of a user account. A favorite image library subset display region 1406 provides a thumbnail view of a subset of photos classified as favorites by the logged in user. An alert timeline region 1408 displays a subset of alerts, including version updates, and image credit availability information. A credit and media count availability region 1410 displays the number of licensed image credits available, and the number of print media available. FIG. 14 includes an account management region 1412, which contains a plurality of navigation choices to other webpages relating to account management, including Image Use, Consumable Media, Annual Subscription, Customer Alerts, Change Password, and Order Form webpages.

FIG. 14 includes a purchase history region 1414, which allows a user to input the date range to display purchase history information. Purchase history filter region 1416 allows a user to input the choice of filtering purchase history by date or by image number. Purchase history display region 1418 displays a tabular representation of information relating to date of image use, image number, text description of image, number of credits utilized, and cost of utilization.

Figure 15:
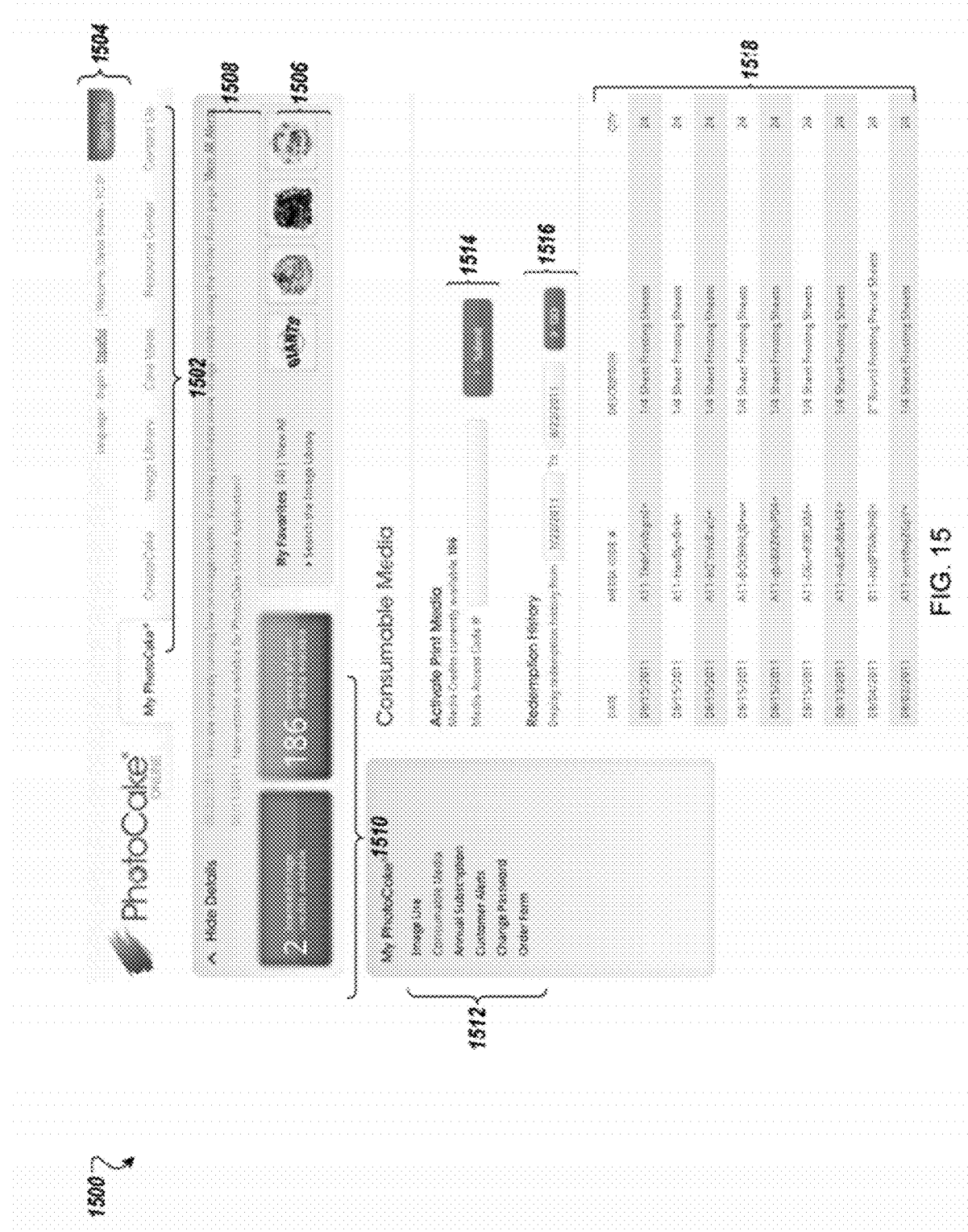

FIG. 15 depicts an example User Interface 1500, corresponding to node 1022 of User Interface Tree 1000, for the Consumable Media webpage. FIG. 15 provides a region 1502 with a plurality of navigation choices to other webpages. FIG. 15 also depicts a User Interface region 1504 for signing out of a user account. A favorite image library subset display region 1506 provides a thumbnail view of a subset of photos classified as favorites by the logged-in user. An alert timeline region 1508 displays a subset of alerts, including version updates, and image credit availability information. A credit and media count availability of region 1510 displays the number of licensed image credits available, and the number of print media available. FIG. 15 includes an account management region 1512, which contains a plurality of navigation choices to other webpages relating to account management, including Image Use, Consumable Media, Annual Subscription, Customer Alerts, Change Password, and Order Form webpages.

FIG. 15 also includes a media access code entry region 1514, which allows a user to enter a unique code corresponding to purchased edible media in order to increase the number of available prints to a user. Redemption history region 1516 allows a user to input the date range to display redemption history information. Redemption history display region 1518 displays a tabular representation of information relating to date of edible media redemption, media code number, and a text description of edible media type.

Figure 16:
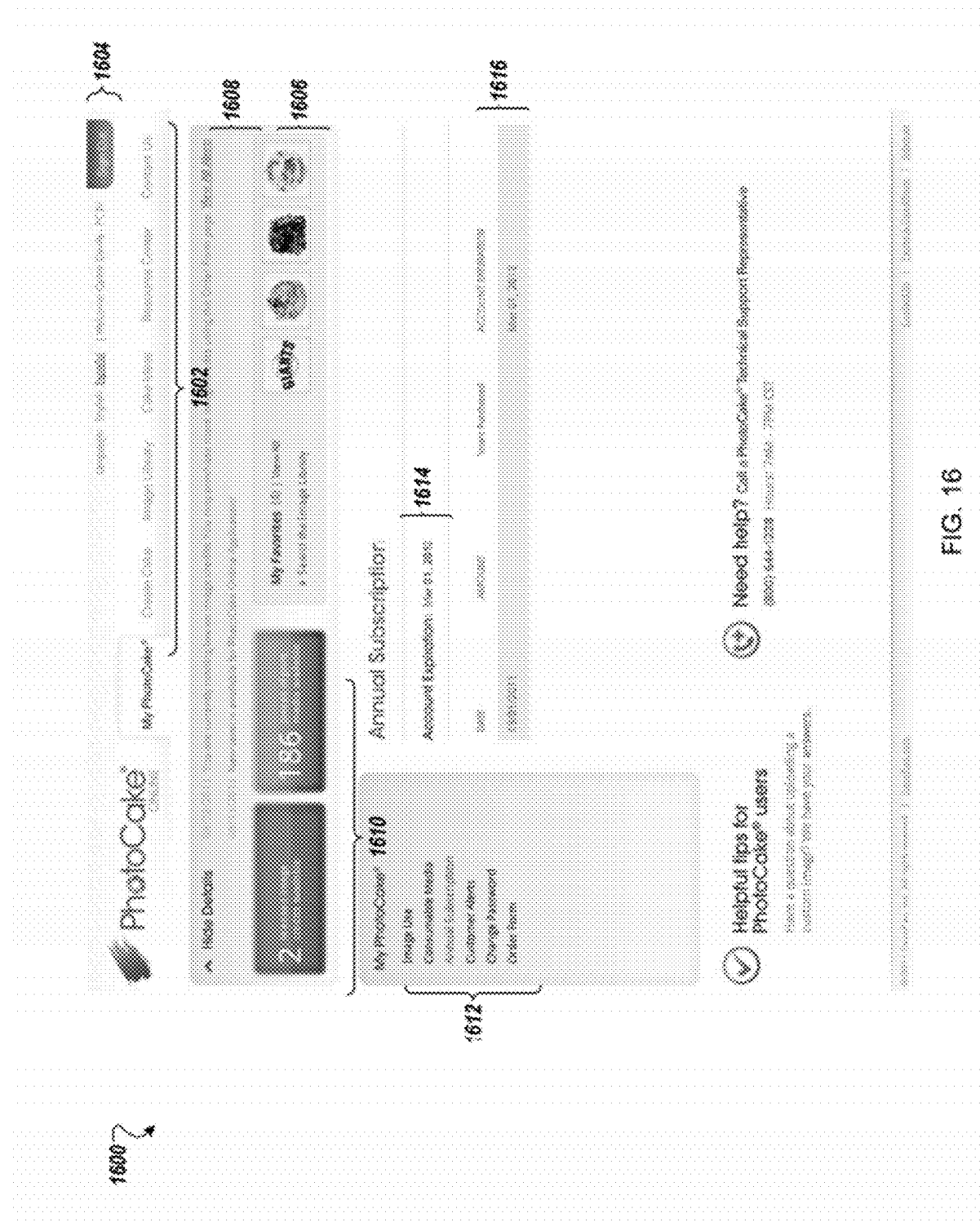

FIG. 16 depicts an example User Interface 1600, corresponding to node 1023 of User Interface Tree 1000, for the Annual Subscription webpage. FIG. 16 provides a region 1602 with a plurality of navigation choices to other webpages. FIG. 16 also depicts a User Interface region 1604 for signing out of a user account. A favorite image library subset display region 1606 provides a thumbnail view of a subset of photos classified as favorites by the logged in user. An alert timeline region 1608 displays a subset of alerts, including version updates, and image credit availability information. A credit and media count availability of region 1610 displays the number of licensed image credits available, and the number of print media available. FIG. 16 includes an account management region 1612, which contains a plurality of navigation choices to other webpages relating to account management, including Image Use, Consumable Media, Annual Subscription, Customer Alerts, Change Password, and Order Form webpages.

FIG. 16 also includes an account expiration date region 1614, which displays when the currently active subscription is targeted to expire. Subscription history display region 1616 displays a tabular representation of information including date of subscription, cost of subscription, subscription years purchased, and account expiration date corresponding to subscription type purchase.

Figure 17:
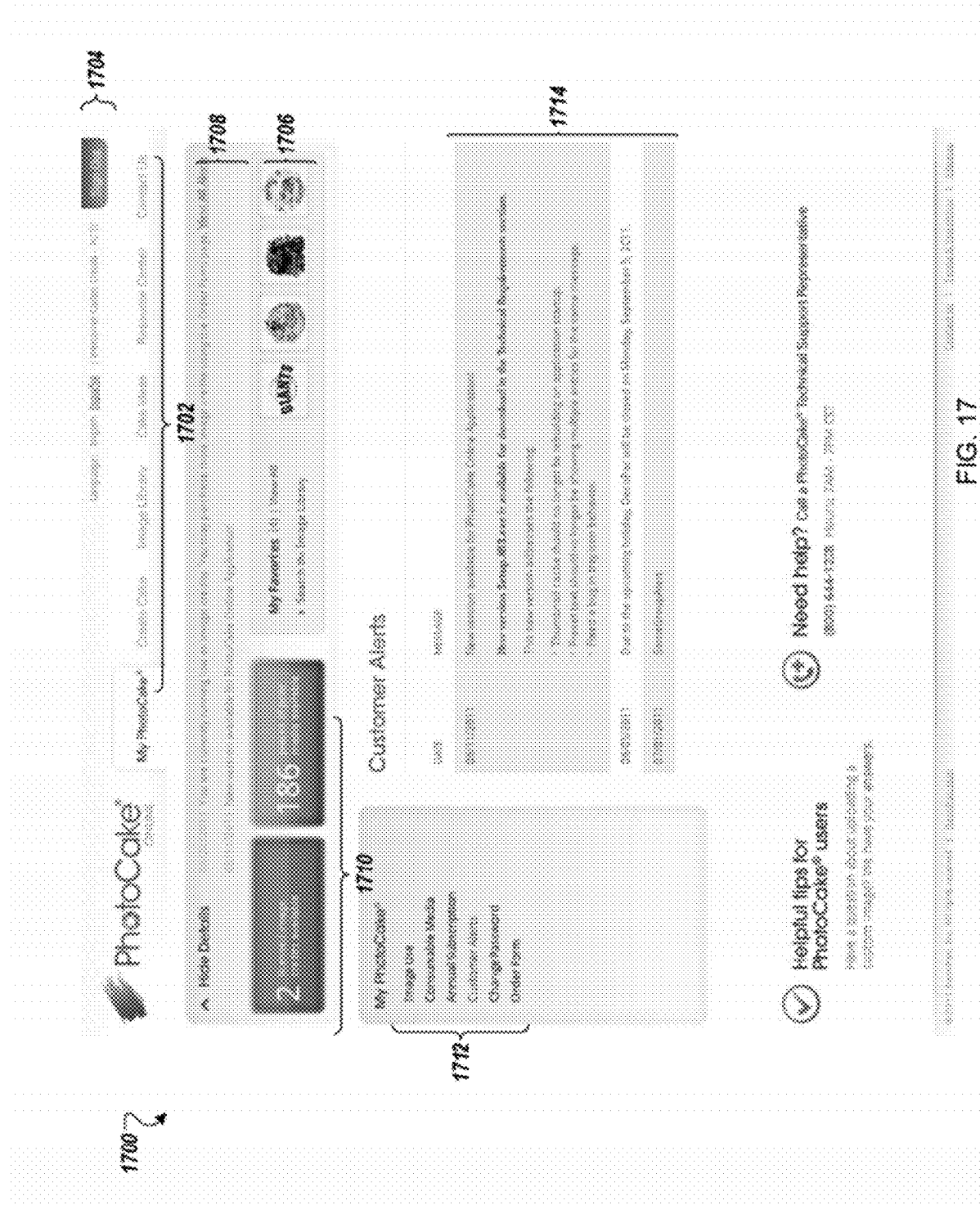

FIG. 17 depicts an example User Interface 1700, corresponding to node 1024 of User Interface Tree 1000, for the Customer Alerts webpage. FIG. 17 provides a region 1702 with a plurality of navigation choices to other webpages. FIG. 17 also depicts a User Interface region 1704 for signing out of a user account. A favorite image library subset display region 1706 provides a thumbnail view of a subset of photos classified as favorites by the logged in user. An alert timeline region 1708 displays a subset of alerts, including version updates, and image credit availability information. A credit and media count availability of region 1710 displays the number of licensed image credits available, and the number of print media available. FIG. 17 includes an account management region 1712, which contains a plurality of navigation choices to other webpages relating to account management, including Image Use, Consumable Media, Annual Subscription, Customer Alerts, Change Password, and Order Form webpages.

FIG. 17 also includes a customer alert history display region 1714, which displays a tabular representation of information including date of customer alert, and a text description of the customer alert.

Figure 18:
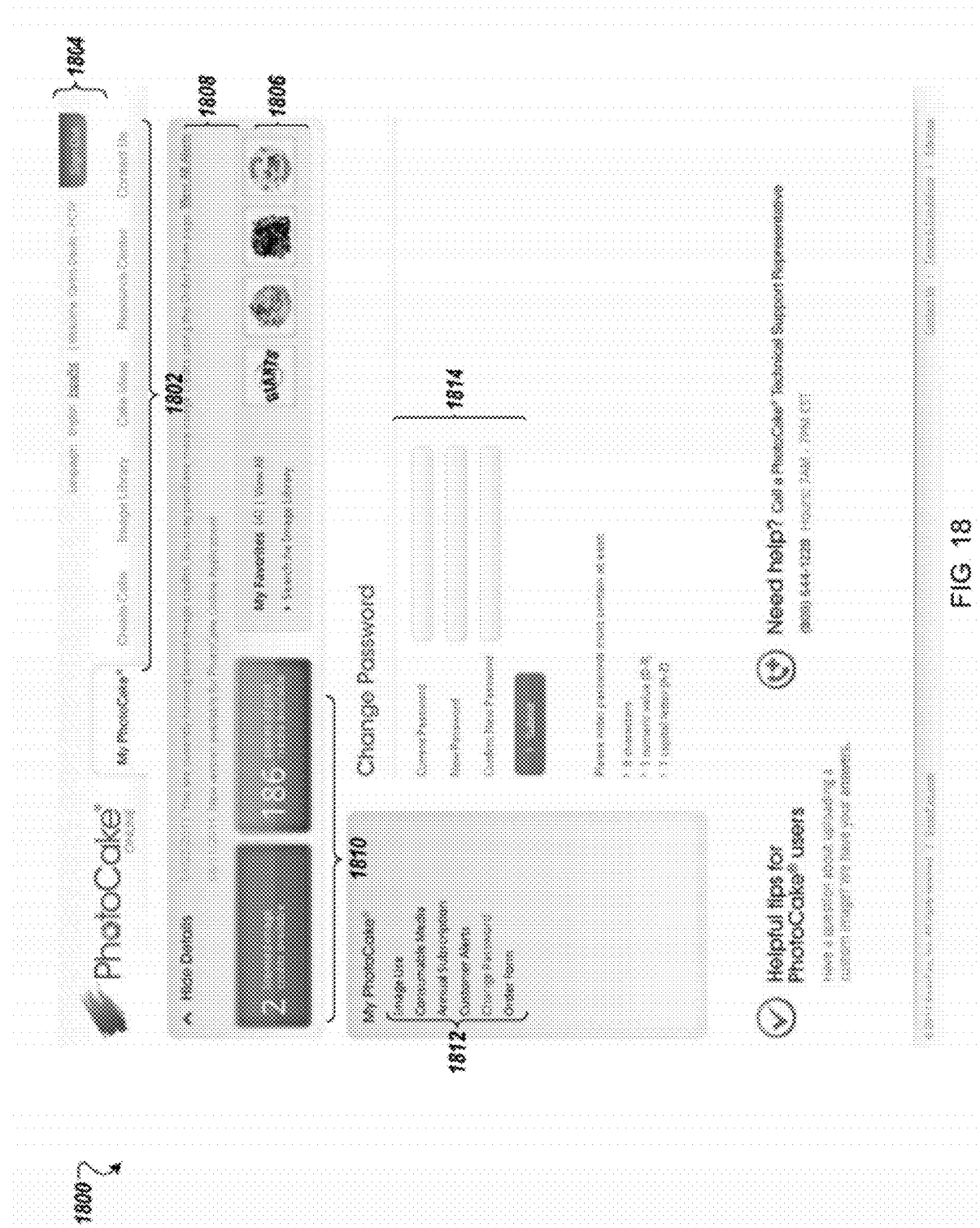

FIG. 18 depicts an example User Interface 1800, corresponding to node 1025 of User Interface Tree 1000, for the Change Password webpage. FIG. 18 provides a region 1802 with a plurality of navigation choices to other webpages. FIG. 18 also depicts a User Interface region 1804 for signing out of a user account. A favorite image library subset display region 1806 provides a thumbnail view of a subset of photos classified as favorites by the logged in user. An alert timeline region 1808 displays a subset of alerts, including version updates, and image credit availability information. A credit and media count availability of region 1810 displays the number of licensed image credits available, and the number of print media available. FIG. 18 includes an account management region 1812, which contains a plurality of navigation choices to other webpages relating to account management, including Image Use, Consumable Media, Annual Subscription, Customer Alerts, Change Password, and Order Form webpages.

FIG. 18 also includes a password update region 1814, which prompts a user for the current, new, and a confirmation of a new password.

Figure 19:
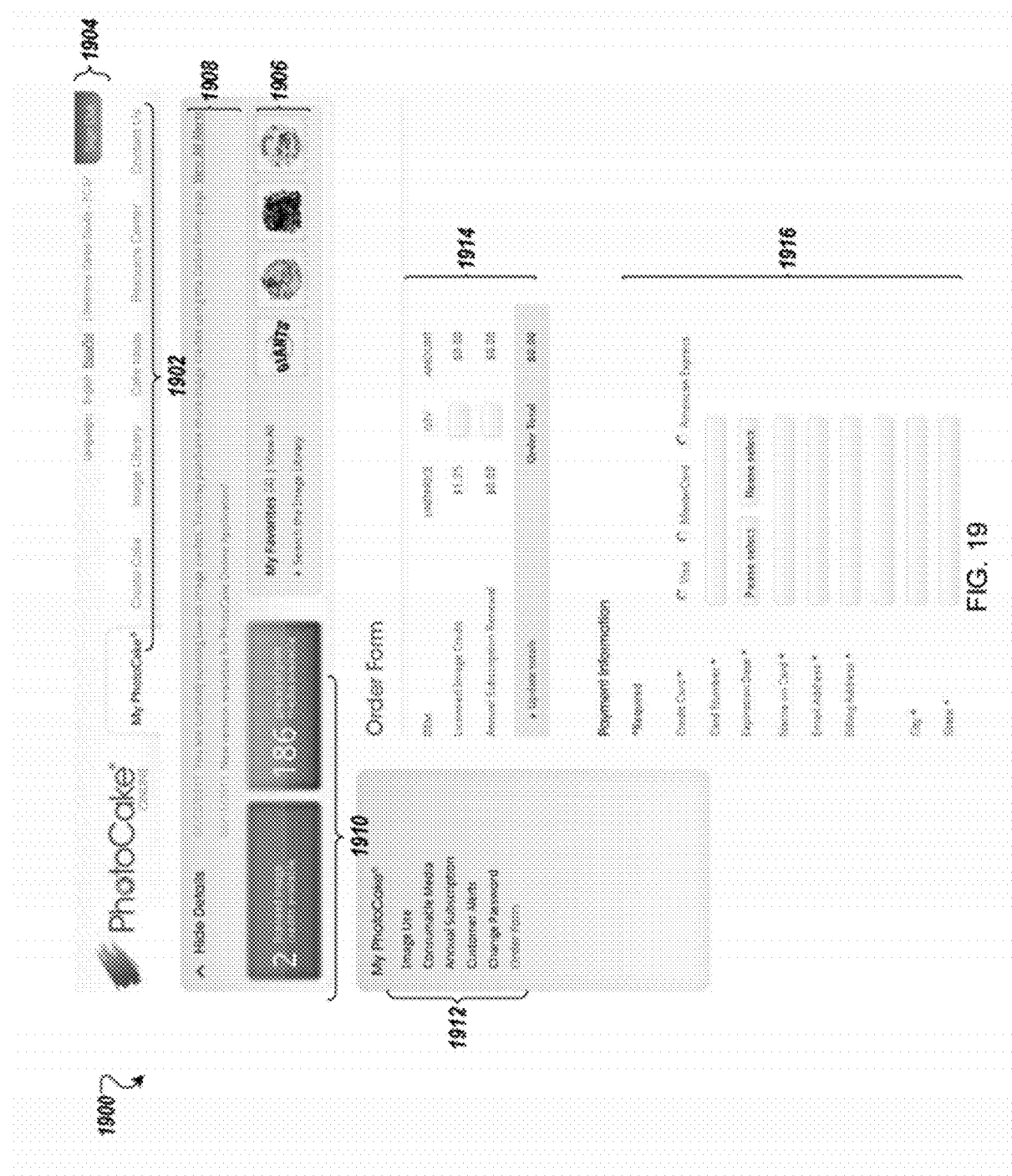

FIG. 19 depicts an example User Interface 1900, corresponding to node 1026 of User Interface Tree 1000, for the Order Form webpage. FIG. 19 provides a region 1902 with a plurality of navigation choices to other webpages. FIG. 19 also depicts a User Interface region 1904 for signing out of a user account. A favorite image library subset display region 1906 provides a thumbnail view of a subset of photos classified as favorites by the logged in user. An alert timeline region 1908 displays a subset of alerts, including version updates, and image credit availability information. A credit and media count availability of region 1910 displays the number of licensed image credits available, and the number of print media available. FIG. 19 includes an account management region 1912, which contains a plurality of navigation choices to other webpages relating to account management, including Image Use, Consumable Media, Annual Subscription, Customer Alerts, Change Password, and Order Form webpages.

FIG. 19 also includes an itemized order form region 1914, which displays the items for purchase, such as licensed image credits and annual subscription renewals, along with respective unit prices and quantities. Region 1916 prompts the user for billing information to provide payment for the order described by region 1914.

Figure 20:
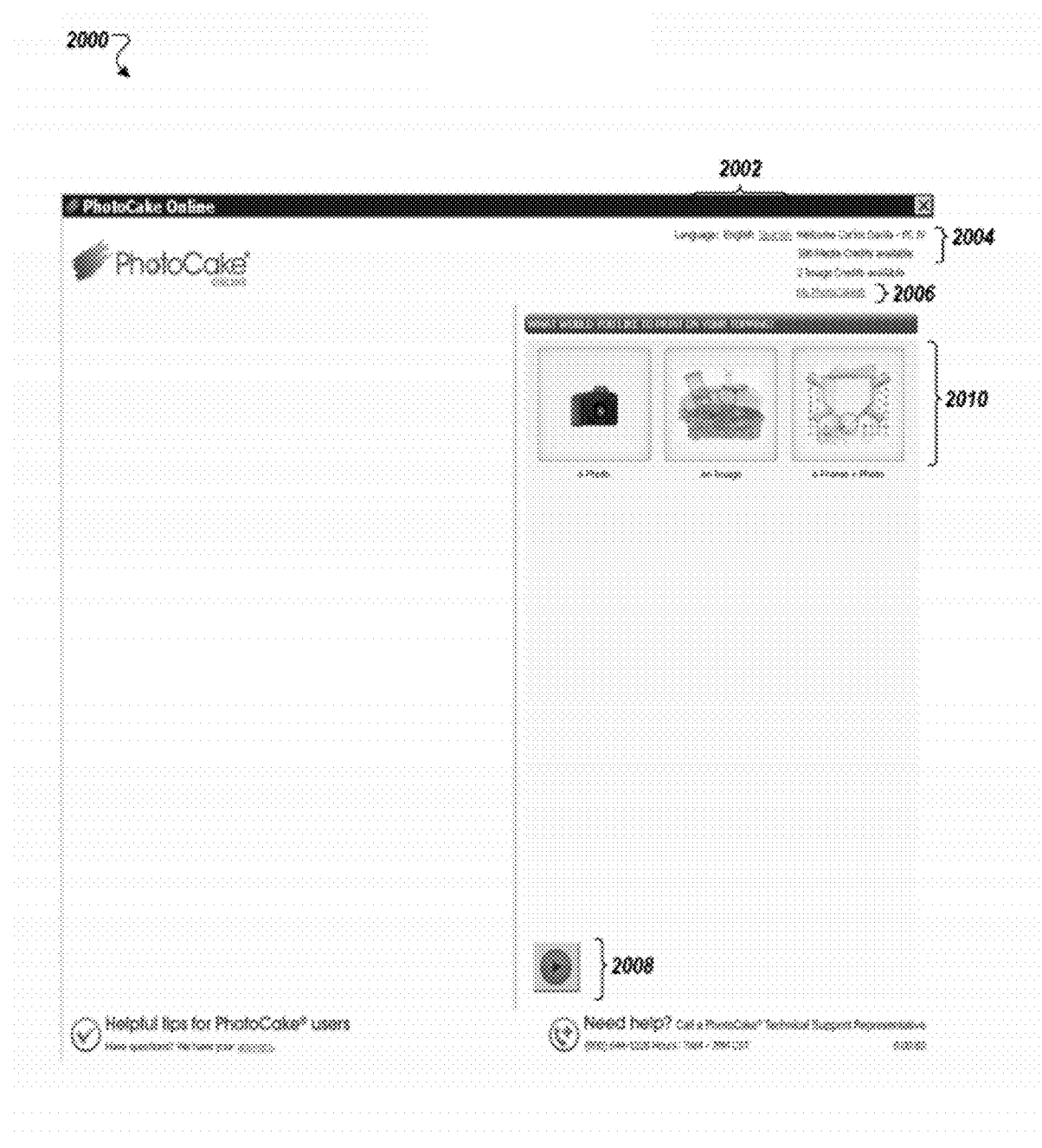

FIG. 20 depicts an example User Interface 2000, corresponding to node 1031 of User Interface Tree 1000. In certain implementations, User Interface 2000 can be displayed in the same web browser used to access the User Interface 1100a. In other embodiments, User Interface 2000 can be displayed in an external software application from the software web browser, as shown in this example. The software web browser and the external application can run concurrently on the local control device 128, and the external software application can be installed on local control device 128 prior to the user login process on User Interface 1100a, or can be prompted for download when navigating to the Create Cake webpage for the first time. In configurations that use the external software application to display the Create Cake User Interface 2000, a separate parallel secure connection by the external software application can be established between the local control device 128 and central control device 132 to allow secure remote access of licensed images in the image library module 202.

The User Interface 2000 contains a region 2002 to select between display languages. Region 2004 displays the subscriber's name, software version, number of licensed image credits available, and the number of print media available. Region 2006 provides a navigation option to return to the software web browser to display the User Interface 1300 for the MyPhotoCake webpage. Region 2008, shown without a text label in this example, provides a quick link to a webpage in a software web browser providing technical support and frequently asked questions relating to the User Interface 2000. In alternative implementations, region 2008 can include a text label.

The User Interface 2000 also contains a region 2010 for the user to choose what to print on a topping, including Photo, Image, and Frame+Photo sources.

Figure 21:
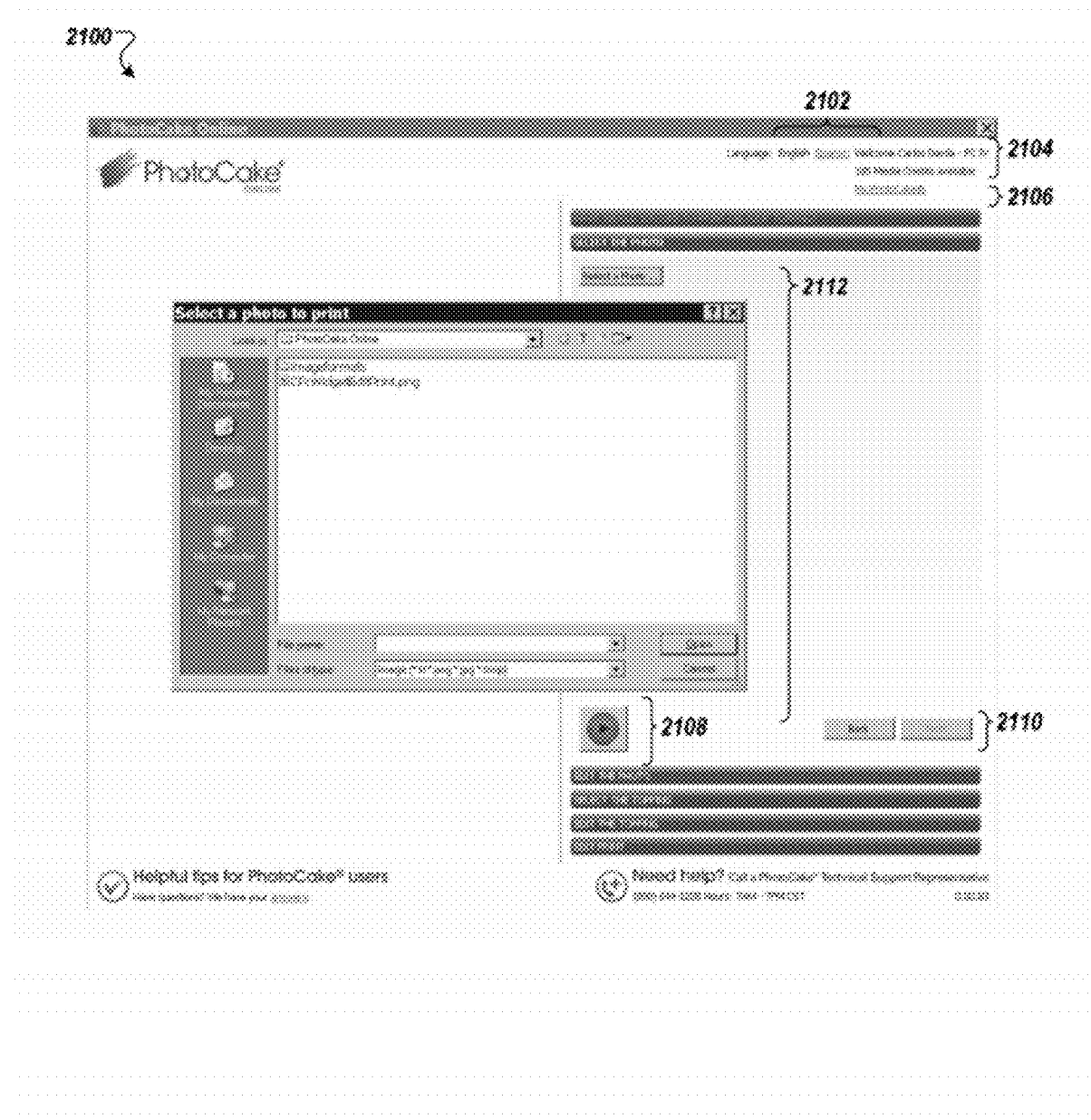

FIG. 21 depicts an example User Interface 2100, corresponding to node 1041 of User Interface Tree 1000, displayed when the user chooses the option to print a topping with the Photo type. User Interface 2100 includes a region 2102 to select between display languages. Region 2104 displays the subscriber's name, software version, number of licensed image credits available, and the number of print media available. Region 2106 provides a navigation option to return to the software web browser to display the User Interface 1300 for the MyPhotoCake webpage. Region 2108 provides a quick link to a webpage in a software web browser providing technical support and frequently asked questions relating to the User Interface 2000. Region 2110 provides the option to navigate backwards or forwards within the Create Cake User Interface sequence. User Interface 2100 also includes a local file selection region 2112 for allowing a user to select an image file stored on or accessible by local control device 128.

Figure 22:
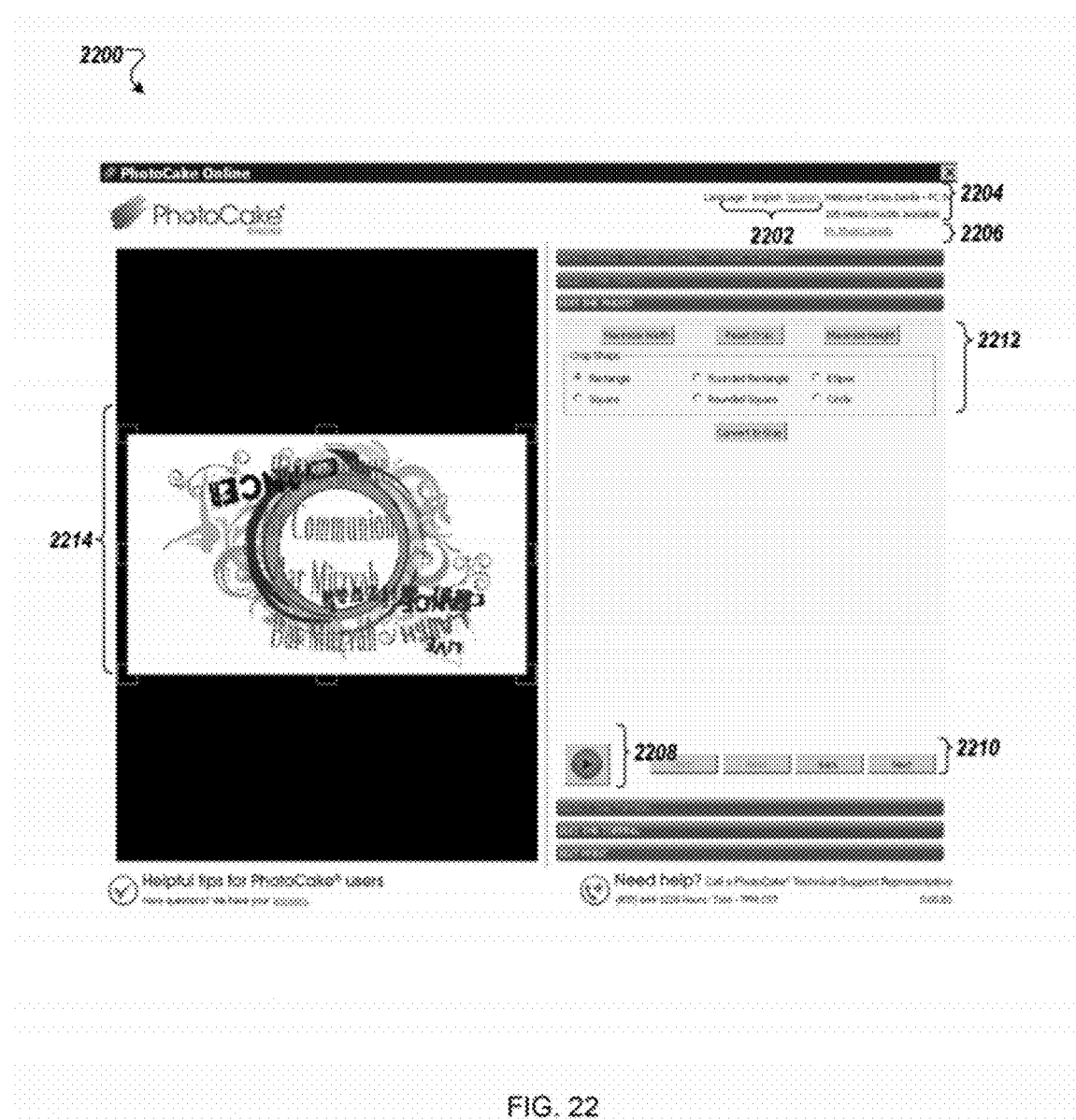

FIG. 22 depicts an example User Interface 2200, corresponding to node 1042 of User Interface Tree 1000, displayed after the user has completed local image file selection following user selection of the option to print a topping with the Photo type. User Interface 2200 includes a region 2202 to select between display languages. Region 2204 displays the subscriber's name, software version, number of licensed image credits available, and the number of print media available. Region 2206 provides a navigation option to return to the software web browser to display the User Interface 1300 for the MyPhotoCake webpage. Region 2208 provides a quick link to a webpage in a software web browser providing technical support and frequently asked questions relating to the User Interface 2000. Region 2210 provides the option to navigate backwards or forwards within the Create Cake User Interface sequence. User Interface 2200 also includes a photo editing region 2212, which allows modifications to the selected local file image. Editing capabilities include, but are not limited to, maximizing width, maximizing height, cropping to various shapes, and converting to grayscale. User Interface 2200 also includes manual photo editing region 2214, which allows a user to use a point-and-click interface to edit a photo, such as cropping.

Figure 23:
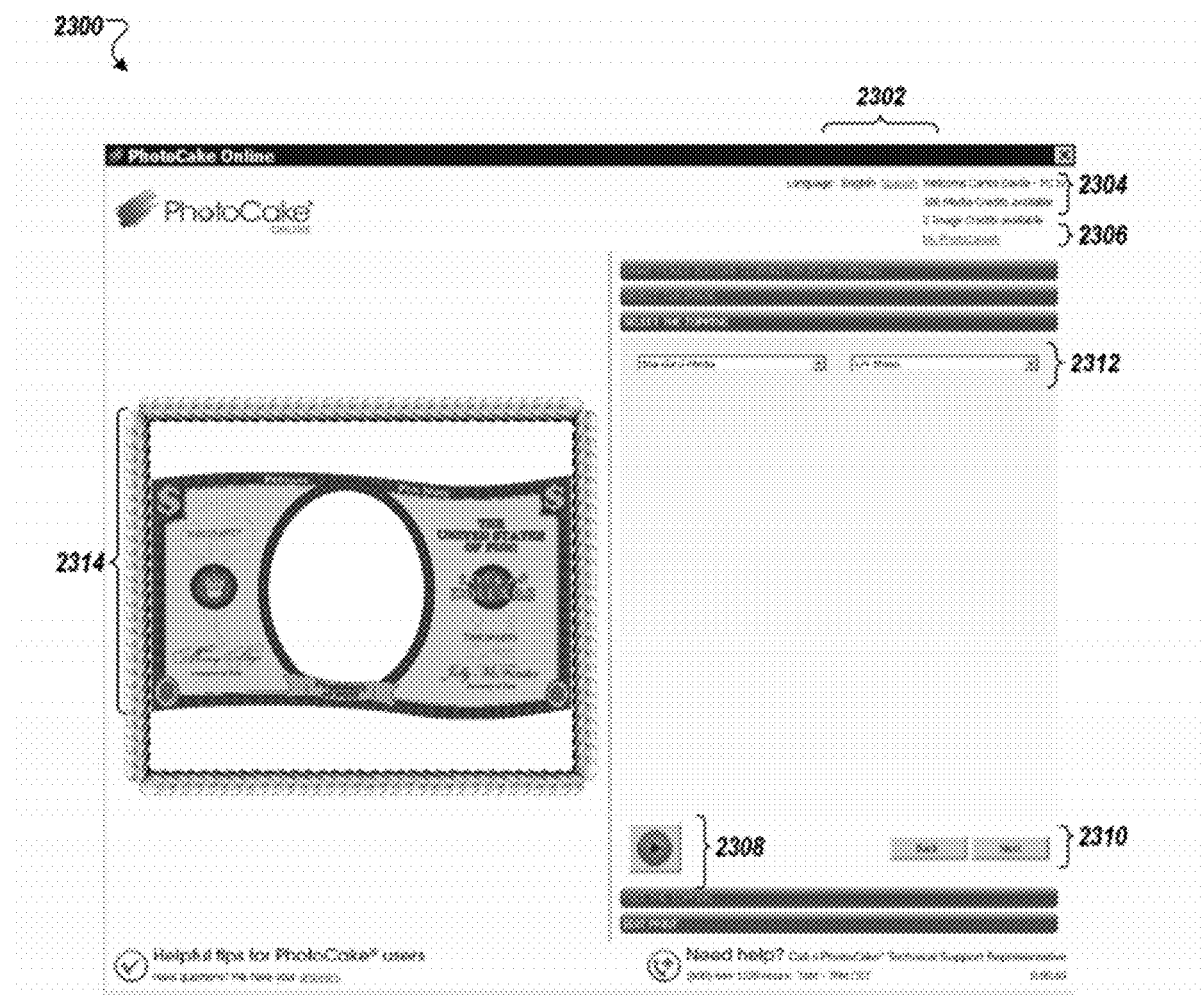

FIG. 23, corresponding to node 1043 of User Interface Tree 1000, depicts an example User Interface 2300 displayed for selecting topping configuration. In the example User Interface Tree 1000 of FIG. 10, User Interface 2300 is a common user interface for the Photo, Image, and Frame+Photo print types, as depicted by the branches converging on node 1052 in FIG. 10.

User Interface 2300 includes a region 2302 to select between display languages. Region 2304 displays the subscriber's name, software version, number of licensed image credits available, and the number of print media available. Region 2306 provides a navigation option to return to the software web browser to display the User Interface 1300 for the MyPhotoCake webpage. Region 2308 provides a quick link to a webpage in a software web browser providing technical support and frequently asked questions relating to the User Interface 2000. Region 2310 provides the option to navigate backwards or forwards within the Create Cake User Interface sequence. User Interface 2300 also includes a topping selection region 2312 which provides multiple topping options including but not limited to standard media with sizes of ½, ¼, and ⅛ sheet, or precut media of sizes 8 inch round, 3 inch round, or 2 inch round. User Interface 2300 also includes topping selection preview region 2314, which allows a user to preview changes to the image based on a selected topping configuration in real-time.

Figure 24:
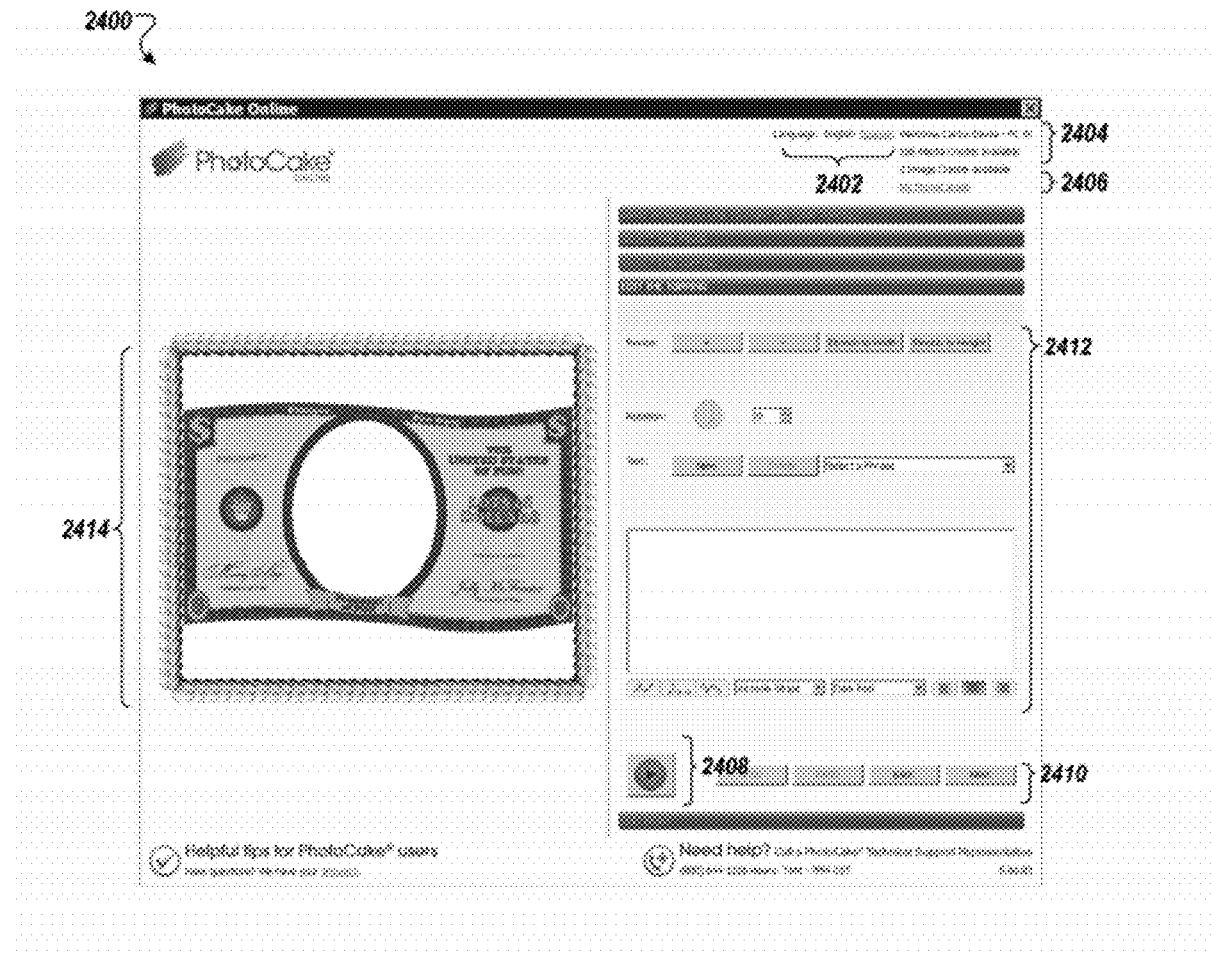

FIG. 24 depicts an example User Interface 2400, corresponding to node 1044 of User Interface Tree 1000, displayed for editing a topping following selection of a topping in User Interface 2300. User Interface 2400 includes a region 2402 to select between display languages. Region 2404 displays the subscriber's name, software version, number of licensed image credits available, and the number of print media available. Region 2406 provides a navigation option to return to the software web browser to display the User Interface 1300 for the MyPhotoCake webpage. Region 2408 provides a quick link to a webpage in a software web browser providing technical support and frequently asked questions relating to the User Interface 2000. Region 2410 provides the option to undo or redo topping edits, and to navigate backwards or forwards within the Create Cake User Interface sequence.

User Interface 2400 also includes a topping editing region 2412, which provides multiple topping editing options. Editing options include, but are not limited to crop, rotate, resize, stretch to width and stretch to height.

Editing options also include the choice to add text. The user can select from a list of phrases, such as "Congratulations," "Bon Voyage," or "Happy Birthday," or the user can type a custom phrase. The user may be able to bend a phrase upwards or downwards to varying degrees of curvature, straighten a phrase, change font type, font color, and select left, right, or centered justification.

User Interface 2400 also includes topping editing preview region 2414, which allows a user to preview changes to the image based on a selected edits in real-time.

Figure 25:
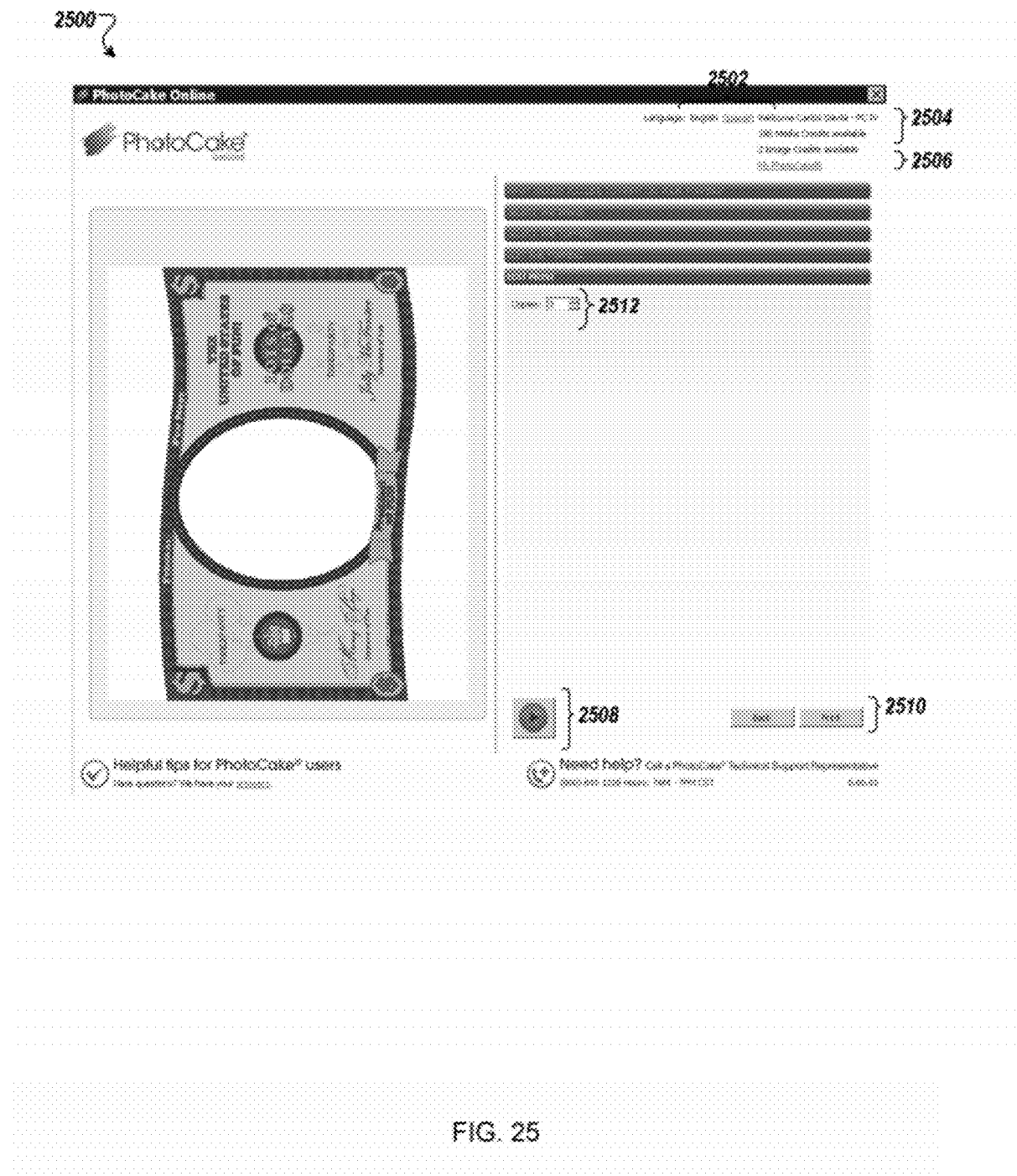

FIG. 25 depicts an example User Interface 2500, corresponding to node 1045 of User Interface Tree 1000, displayed for print editing following topping editing User Interface 2400. User Interface 2500 includes a region 2502 to select between display languages. Region 2504 displays the subscriber's name, software version, number of licensed image credits available, and the number of print media available. Region 2506 provides a navigation option to return to the software web browser to display the User Interface 1300 for the MyPhotoCake webpage. Region 2508 provides a quick link to a webpage in a software web browser providing technical support and frequently asked questions relating to the User Interface 2000. Region 2510 provides the option to navigate backwards or to initiate the print process of the final design. User Interface 2500 also includes a print configuration region 2512, which provides the user print options, such as the number of prints for the particular image.

Figure 26:
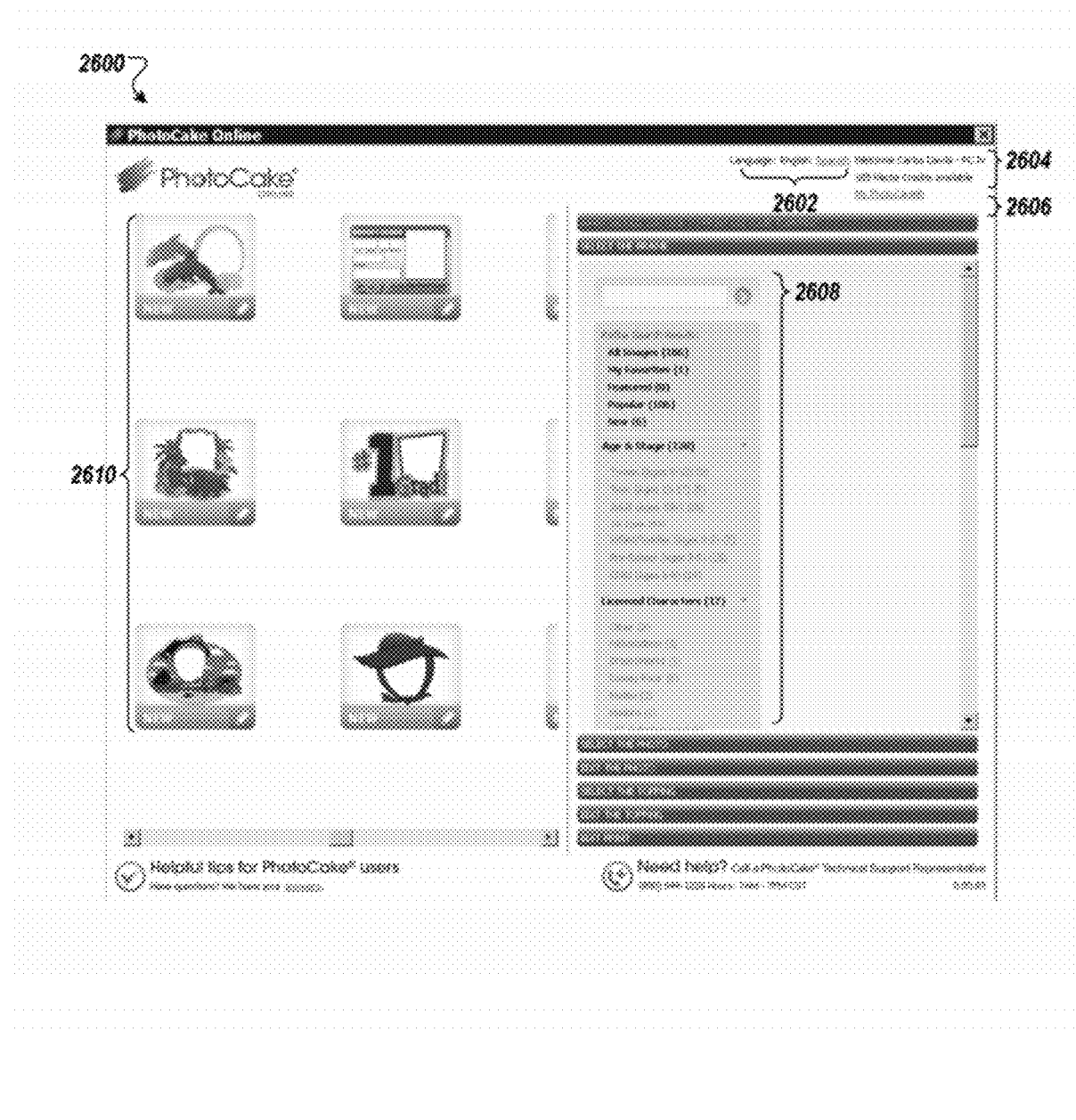

FIG. 26 depicts an example User Interface 2600, corresponding to node 1051 of User Interface Tree 1000, displayed for selecting a frame from a frame image. As shown in the exemplary User Interface Tree of FIG. 10, the sequence of User Interface displays for creating a topping involving the Frame+Photo Type is similar with the exception of the additional User Interface 2600 for Frame image selection preceding User Interface 2100 for local image file selection.

User Interface 2600 includes a region 2602 to select between display languages. Region 2604 displays the subscriber's name, software version, number of licensed image credits available, and the number of print media available. Region 2606 provides a navigation option to return to the software web browser to display the User Interface 1300 for the MyPhotoCake webpage. Region 2608 provides to the user a searchable and browsable library of frame images available to the user. The user may search through the frame images, using word searching, or alternatively by browsing through image categories and viewing all images in a category. Region 2610 provides a scrollable region displaying thumbnails of frame images available to the user based on search results or selected categories from region 2608. To select a particular frame image, the user clicks on a thumbnail displayed in region 2610. Following selection of a particular frame image, the User Interface 2100 of FIG. 21 is displayed for the purposes of selecting the local image file to be displayed within the framed area. Subsequent User Interface displays for creating a print of the Frame+Photo type proceeds in the same sequence as for the Photo type, as described earlier in regards to discussion of nodes 1041-1045 of User Interface Tree 1000.

Figure 27:
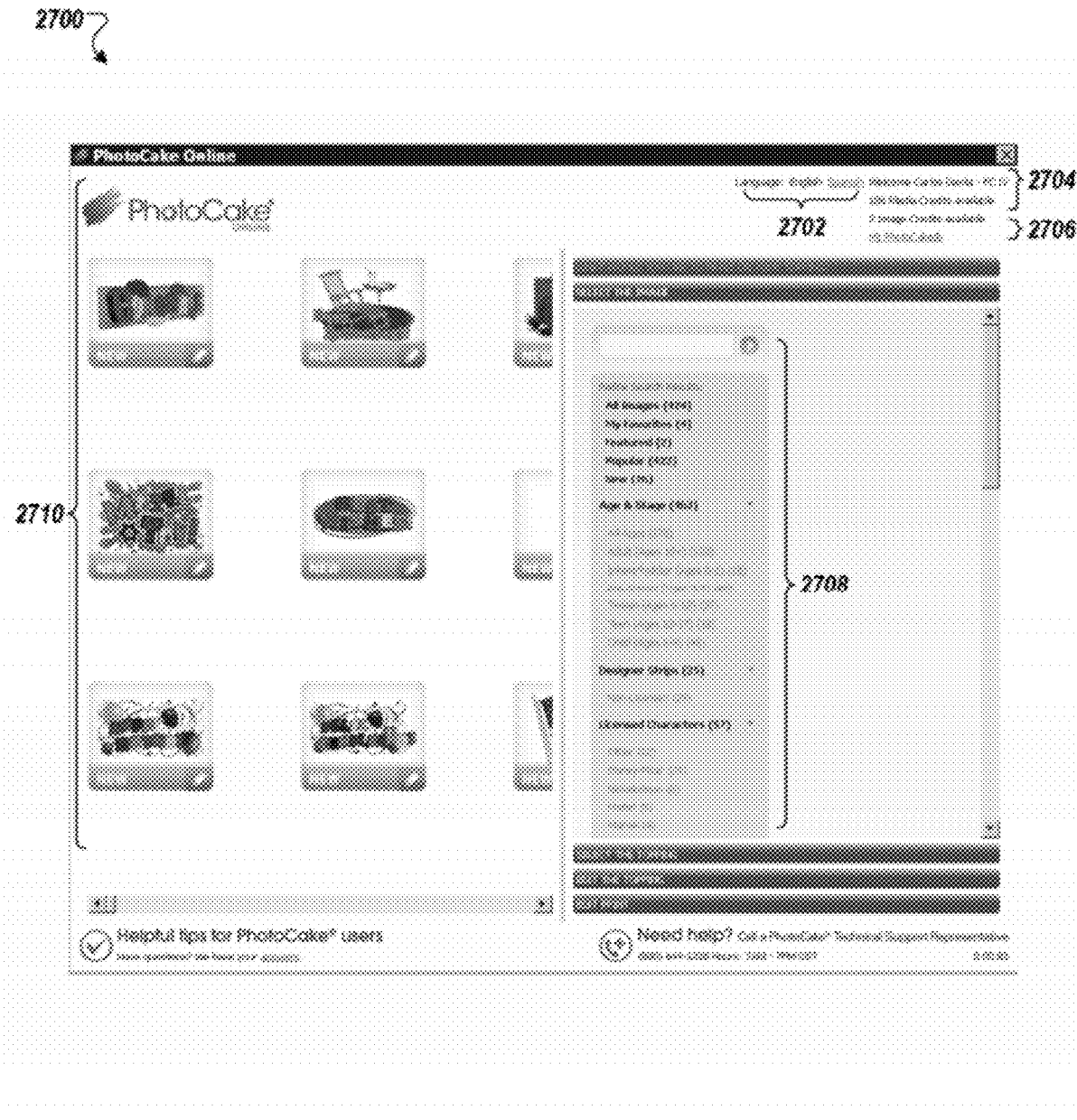

FIG. 27 depicts an example User Interface 2700, corresponding to node 1061 of User Interface Tree 1000, displayed for selecting an image from Image Library Module 202 following user selection of the Image type print in User Interface 2000. As shown in the exemplary User Interface Tree of FIG. 10, the sequence of User Interface displays for creating a topping involving the Image type is similar to creating a Photo type print with the exception that following Image selection in User Interface 2700, the User Interface display sequence proceeds to User Interface 2300 for topping selection, bypassing photo selection User Interface 2100 and photo editing User Interface 2200.

User Interface 2700 includes a region 2702 to select between display languages. Region 2704 displays the subscriber's name, software version, number of licensed image credits available, and the number of print media available. Region 2706 provides a navigation option to return to the software web browser to display the User Interface 1300 for the MyPhotoCake webpage. Region 2708 provides to the user a searchable and browsable library of images available to the user. The user may search through the images, using word searching, or alternatively by browsing through image categories and viewing all images in a category. Region 2710 provides a scrollable region displaying thumbnails of images available to the user based on search results or selected categories from region 2708. To select a particular image, the user clicks on a thumbnail displayed in region 2710. Following selection of a particular image, the User Interface 2100 of FIG. 21 is displayed for the purposes of selecting the local image file. Subsequent User Interface displays for creating a print of the Image type proceeds in the same sequence as described earlier in regards to discussion of nodes 1043-1045 of User Interface Tree 1000.

Figure 28:
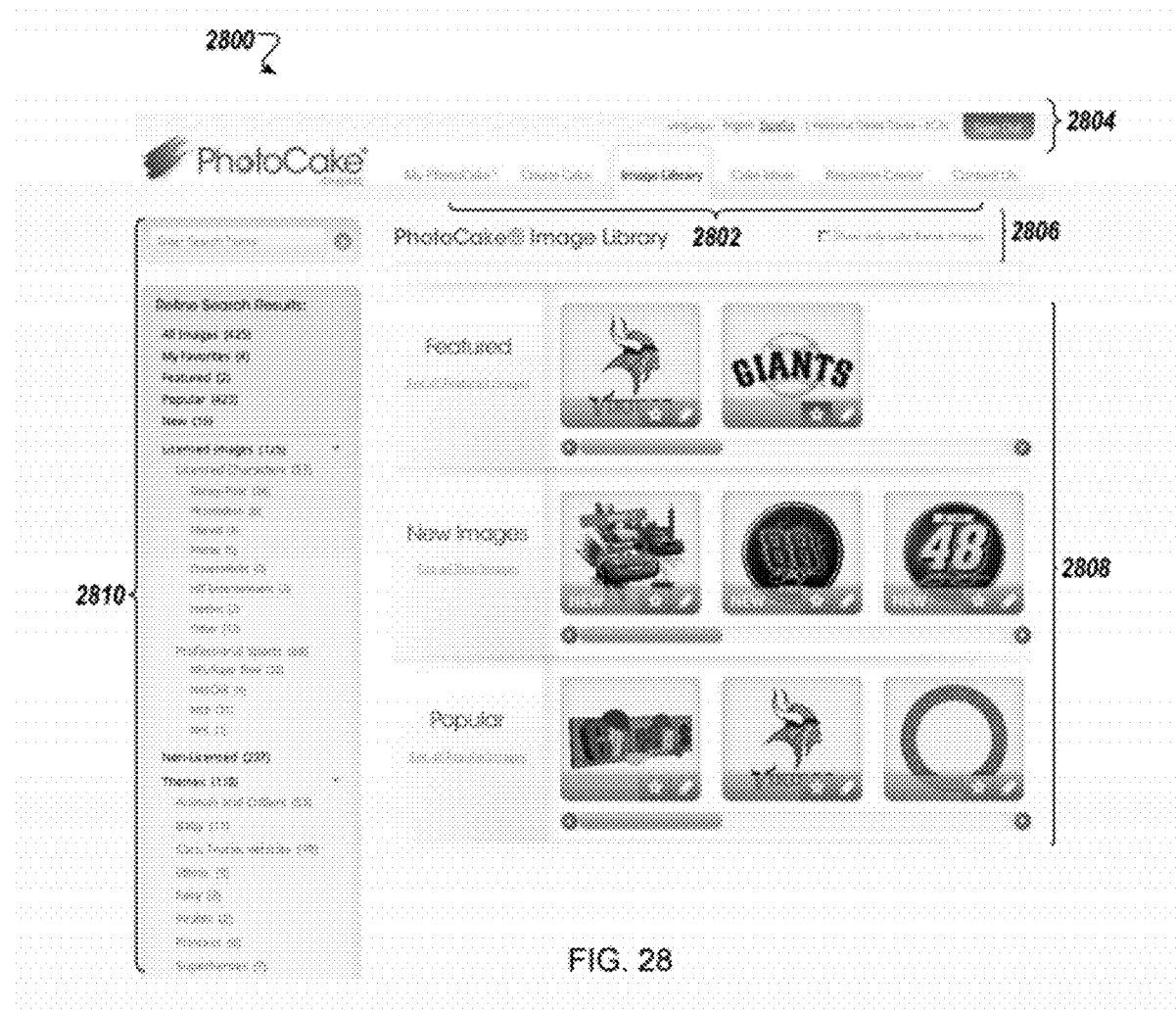

FIG. 28 depicts an example User Interface 2800, corresponding to node 1013 of User Interface Tree 1000, for the Image Library webpage. FIG. 28 provides a region 2802 with a plurality of navigation choices to other webpages. FIG. 28 also depicts a User Interface region 2804 for signing out of a user account. A region 2806 provides the option to only display images of the frame image type.

Region 2810 provides to the user a searchable and browsable library of images available to the user. The user may search through the images, using word searching, or alternatively by browsing through image categories and viewing all images in a category. Prior to entering a search term or category selection, region 2808 provides separate scrollable row regions displaying thumbnails of images corresponding to Featured, New, and Popular Images available to the user. Following entering a search term or category selection, region 2808 is replaced with a single scrollable region displaying a matrix of thumbnails corresponding to search or category selection results. New images in the Image Library Module 202 are labeled with a NEW marker on the respective thumbnails.

Figure 29:
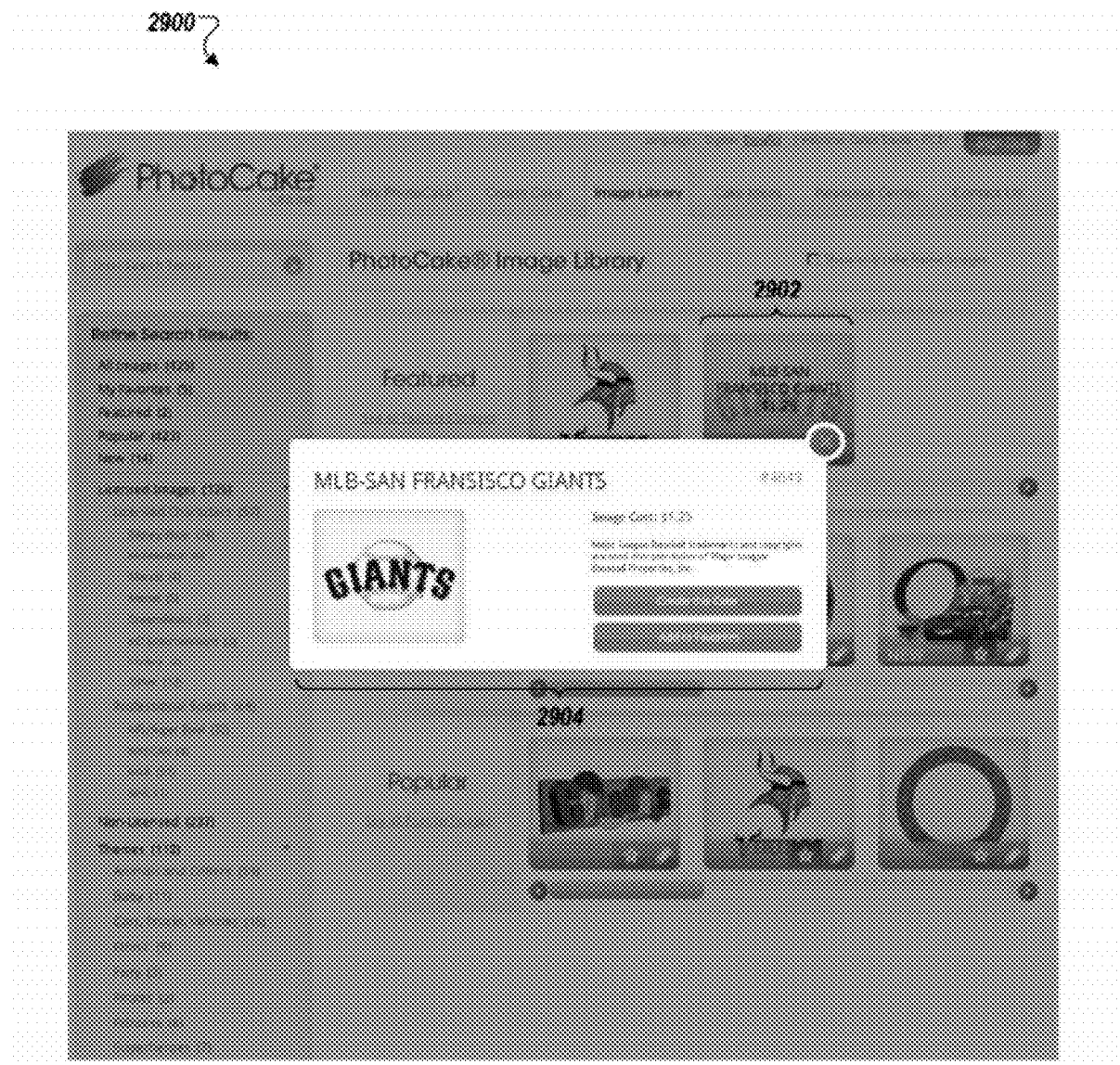

For each thumbnail, when the user performs a mouseover, the thumbnail is overlaid with details, such as an image title and/or price, as shown in region 2902 of FIG. 29. When the user performs a click action on a thumbnail, a pop-up window appears, providing ever further information on the selected image, such as copyright information, and the option to Add to Favorites, or Create this Cake corresponding to the clicked image, as shown in region 2904 of FIG. 29. The Create this Cake option in FIG. 29 takes the user to the User Interface 2300, as depicted by the converging branches on node 1052 in FIG. 10.

Figure 30:

FIG. 30 depicts an example User Interface 3000, corresponding to node 1014 of User Interface Tree 1000, for the Cake Ideas webpage. FIG. 30 provides a region 3002 with a plurality of navigation choices to other webpages. FIG. 30 also depicts a User Interface region for signing out of a user account 3004.

Region 3008 provides to the user a searchable and browsable library of exemplary cake designs available to the user. The user may search through the cake designs, using word searching, or alternatively by browsing through design categories and viewing all cake designs in a category. Prior to entering a search term or category selection, region 3006 provides separate scrollable row regions displaying thumbnails of cake designs corresponding to Featured and New designs available to the user. Following entering a search term or category selection, region 3006 is replaced with a single scrollable region displaying a matrix of thumbnails corresponding to search or category selection results. New cake designs are labeled with a NEW marker on the respective thumbnails.

Similar to the Create Cake webpage, for each thumbnail, when the user performs a mouse-over, the thumbnail is overlaid with details, such as a descriptive title. When the user performs a click action on a thumbnail, a pop-up window appears, providing ever further information on the selected image, such as the item number and the image used, and the option to Create Cake corresponding to the clicked image. The Create Cake option takes the user to the User Interface 2300, as depicted by the converging branches on node 1052 in FIG. 10.

Figure 31:

FIG. 31 depicts an example User Interface 3100, corresponding to node 1015 of User Interface Tree 1000, for the Resource Center webpage. FIG. 31 provides a region 3102 with a plurality of navigation choices to other webpages. FIG. 31 also depicts a User Interface region 3104 for signing out of a user account 3104. FIG. 31 further provides a drop down menu region 3106 containing a plurality of navigation choices to other webpages, such as Frequently Asked Questions or Technical Requirements. FIG. 31 also depicts a User Interface region for signing out of a user account 3104. Region 3108 provides a preview of common questions, such as how to create and save favorites, and upload images, in this example. A region 3110 provides alternative navigation options to either Frequently Asked Questions or Technical Requirements, with additional explanation of each link.

Figure 32:
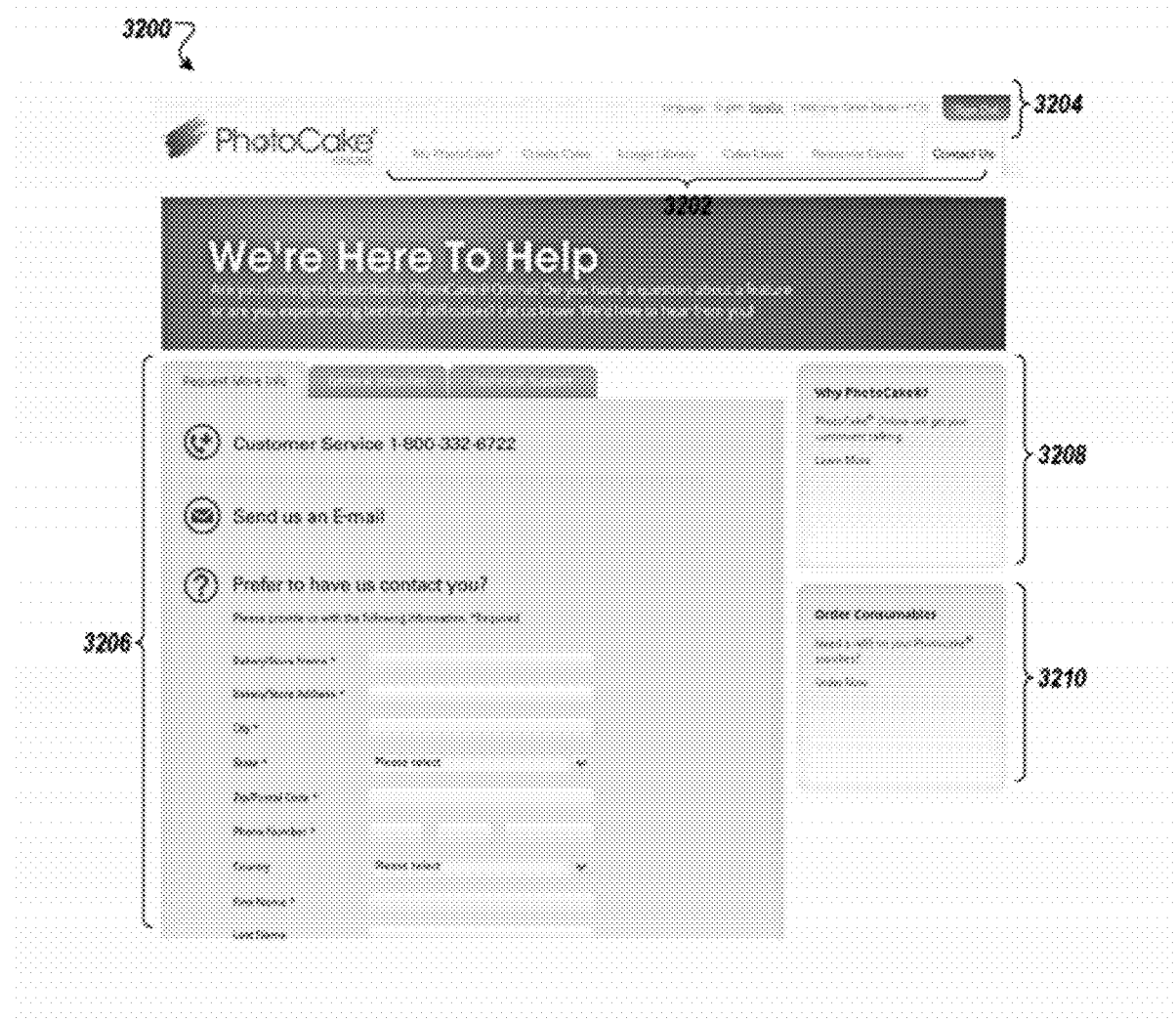

FIG. 32 depicts an example User Interface 3200, corresponding to node 1016 of User Interface Tree 1000, for the Contact Us webpage. FIG. 32 provides a region 3202 with a plurality of navigation choices to other webpages. FIG. 32 also depicts a User Interface region 3204 for signing out of a user account. FIG. 32 further provides a region 3206 with a user entry form for providing contact information at which operators of the online system for decorating edible media may contact the user. Region 3206 also provides for similar user entry form for providing contact information relating to general inquiries, and for technical support. FIG. 32 also includes a region 3208 for accessing a Why PhotoCake webpage, a webpage relating to an overview of services of the system for decorating edible media. FIG. 32 additionally may include a region 3210 for accessing a webpage for ordering inventory items for a system owner (e.g., a bakery owner, store owner), such as edible media, edible ink, replacement parts, printheads, and other system supplies.

Figure 33:
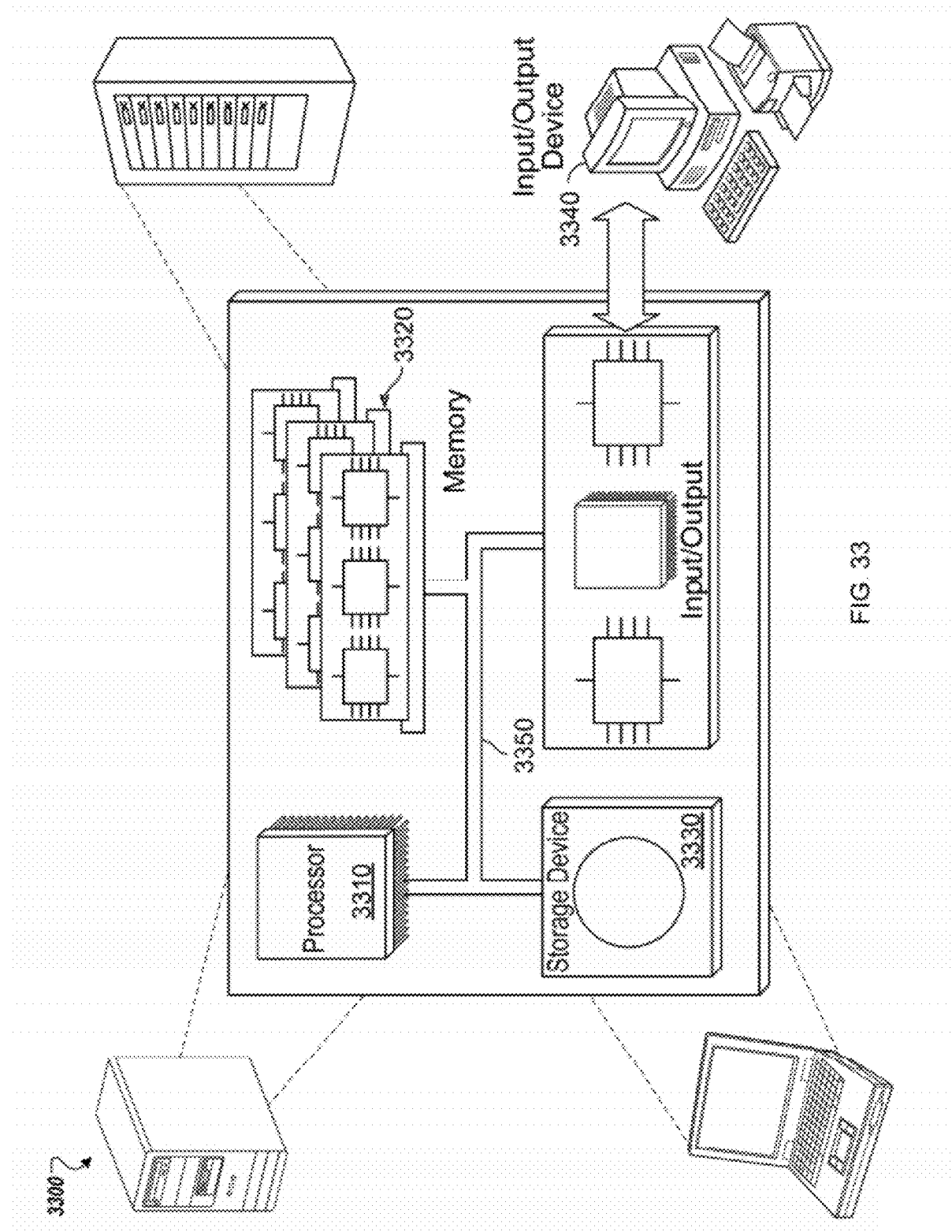
FIG. 33 is a block diagram of an example computer system.

FIG. 33 is a schematic diagram of a generic computer system 3300. The system 3300 is optionally used for the operations described in association with any of the computer-implement methods described previously, according to one implementation. The system 3300 includes a processor 3310, a memory 3320, a storage device 3330, and an input/output device 3340. Each of the components 3310, 3320, 3330, and 3340 are interconnected using a system bus 3350. The processor 3310 is capable of processing instructions for execution within the system 3300. In one implementation, the processor 3310 is a single-threaded processor. In another implementation, the processor 3310 is a multi-threaded processor. The processor 3310 is capable of processing instructions stored in the memory 3320 or on the storage device 3330 to display graphical information for a User Interface on the input/output device 3340.

The memory 3320 stores information within the system 3300. In one implementation, the memory 3320 is a computer-readable medium. In one implementation, the memory 3320 is a volatile memory unit. In another implementation, the memory 3320 is a non-volatile memory unit.

The storage device 3330 is capable of providing mass storage for the system 3300. In one implementation, the storage device 3330 is a computer-readable medium. In various different implementations, the storage device 3330 is optionally a floppy disk device, a hard disk device, an optical disk device, or a tape device.

The input/output device 3340 provides input/output operations for the system 3300. In one implementation, the input/output device 3340 includes a keyboard and/or pointing device. In another implementation, the input/output device 3340 includes a display unit for displaying Graphical User Interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a Graphical User Interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications are optionally made without departing from the spirit and scope of this disclosure. Accordingly, other embodiments are within the scope of the following claims.

What is claimed is:

1. A non-transitory machine-readable medium having a plurality of instructions tangibly stored thereon comprising data representing a software application, which when executed on processing circuitry of a printing system, causes the processing circuitry to perform operations comprising:
    establishing a connection between the printing system and a server;
    limiting licensed images shown to a user according to a geographic location of the user;
    retrieving at least one licensed image, of the licensed images shown to the user, from the server through the connection;
    retrieving an unlicensed image from a source selected from a local storage device, an online account, and an external device;
    determining, after the at least one licensed image has been purchased, whether a license restriction on modifying a first licensed image of the at least one licensed image exists;
    allowing modifying, with the software application, of the unlicensed image and disallowing modifying of the first licensed image, in response to determining that the license restriction does exist;
    generating, with the software application, a data stream for transmission to a printer spooler without using default operating system print drivers, said data stream representing the first licensed image and the modified unlicensed image; and
    causing a printer to render said data stream upon an edible medium using edible inks, wherein, prior to the generating, the server accesses a unique code to determine if the edible medium is an authorized edible media by determining if the user has exceeded an allocated number of prints corresponding to purchased edible media.

2. The machine-readable medium of claim 1, wherein modifying the unlicensed image comprises converting color information associated with the unlicensed image into color information in an International Commission on Illumination (CIE) color space.

3. The machine-readable medium of claim 2, wherein the modifying the unlicensed image comprises converting the color information in the CIE color space into color information in a printer color space.

4. The machine-readable medium of claim 1, wherein:
    said connection is a secure connection; and
    the instructions, when executed on the processing circuitry, cause the processing circuitry to establish a second connection, wherein limiting the licensed images shown to the user comprises presenting a plurality of licensed images to the user via the second connection.

5. The machine-readable medium of claim 4, wherein the connection and the second connection are configured for parallel transmission of data between the server and the printing system.

6. The machine-readable medium of claim 5, wherein the software application comprises a standalone software application that prevents the at least one licensed image from unauthorized re-use.

7. The machine-readable medium of claim 6, wherein:
    presenting the plurality of licensed images to the user comprises presenting the plurality of licensed images via a web browser;
    the software application is operated through a first set of user interface displays; and
    the software web browser is operated through a second set of user interface displays, wherein said first set of user interface displays can be invoked from said second set of user interface displays, and said second set of user interface displays can be invoked from said first set of user interface displays.

8. The machine-readable medium of claim 7, wherein the software web browser does not reside on said machine-readable medium.

9. The machine-readable medium of claim 1, further comprising identifying the geographic location of the user.

10. The machine-readable medium of claim 1, further comprising, after allowing modifying, performing at least one color management function upon the unlicensed image to create a color corrected image, wherein the at least one color management function is configured to maintain color consistency between various types of edible media printers.

11. The machine-readable medium of claim 1, wherein, prior to causing the printer to render the data stream performing at least one color management function upon the first licensed image or the unlicensed image, wherein the at least one color management function is configured to maintain color consistency between various types of local edible media printers connected to a plurality of local controllers.

12. The machine-readable medium of claim 1, wherein the data stream includes a color corrected print file which accounts for the use of at least one of the edible inks and the edible medium.

13. A method comprising:
establishing, via a network, a connection to a server;
limiting, by processing circuitry, licensed images for presentation to a user;
causing presentation, to the user via a display device, of the limited licensed images;
receiving, by the processing circuitry, selection by the user of at least one licensed image of the limited licensed images for purchase;
retrieving, by the processing circuitry, the at least one licensed image from the server through the connection;
retrieving at least one unlicensed image from a source selected from a local storage device, an online account, and an external device;
determining, by the processing circuitry after the at least one licensed image has been purchased, whether a license restriction on modifying the at least one licensed image exists;
causing presentation, by the processing circuitry to the user via the display device, of an editing graphical user interface for creating a topping design including the at least one licensed image and the at least one unlicensed image;
disallowing modifying, by the processing circuitry within the editing graphical user interface, the at least one licensed image having a license restriction;
allowing modifying, by the processing circuitry within the editing graphical user interface, of the at least one unlicensed image;
generating, by the processing circuitry, a data stream for transmission directly to a printer spooler while bypassing default operating system print drivers, said data stream representing the topping design including a representation of the at least one licensed image and a modified version of the unlicensed image; and
causing, by the processing circuitry, a printer to render said data stream upon an edible medium using edible inks, wherein, prior to the generating, the server accesses a unique code to determine if the edible medium is an authorized edible media by determining if the user has exceeded an allocated number of prints corresponding to purchased edible media.

14. The method of claim 13, wherein limiting the licensed images comprises limiting the licensed images according to a selection previously performed by another user such that the user is only shown the licensed images previously selected by the another user.

15. The method of claim 13, wherein modifying comprises brightening or darkening the unlicensed image.

16. The method of claim 13, wherein modifying comprises re-touching or cropping the unlicensed image.

17. The method of claim 13, wherein modifying comprises stretching to a width of the edible medium or stretching to a height of the edible medium the unlicensed image.

18. An apparatus comprising:
processing circuitry; and
a non-transitory computer readable medium having instructions stored thereon, wherein the instructions, when executed by the processing circuitry, cause the processing circuitry to
establish, with a server via a network, a network connection,
limit licensed images shown to a user within a software browser according to a geographic location of the user,
retrieve a licensed image, of the licensed images shown to the user, from the server through the network connection,
allow the user to purchase the retrieved licensed image,
retrieve an unlicensed image from a local storage device, an online account, or an external device,
determine, after the licensed image has been purchased, whether a respective license restriction on modifying the licensed image exists,
allow modifying, within the software browser, of the unlicensed image, wherein
modifying generates an edited version of the unlicensed image,
disallow modifying, within the software browser, the licensed image, in response to determining that the license restriction does exist for the licensed image,
generate a data stream for transmission directly to a printer spooler while bypassing default operating system print drivers, said data stream representing a design including the licensed image and the edited unlicensed image, and
cause a printer to render said data stream upon the edible medium using edible inks, wherein, prior to the generating, the server accesses a unique code to determine if the edible medium is an authorized edible media by determining if the user has exceeded an allocated number of prints corresponding to purchased edible media.

19. The apparatus of claim 18, wherein modifying comprises performing at least one color management function upon the unlicensed image to create a color corrected image to maintain color consistency between various types of edible media printers.

20. The apparatus of claim 19, wherein performing a first color management function of the at least one color management function comprises applying a color profile derived from color spectography measurements performed on printed outputs of the respective edible media printer.

* * * * *